(12) United States Patent
Norimatsu et al.

(10) Patent No.: US 8,528,391 B2
(45) Date of Patent: Sep. 10, 2013

(54) WHEEL BEARING WITH SENSOR

(75) Inventors: Takayuki Norimatsu, Iwata (JP); Makoto Okasaka, Iwata (JP); Hiroshi Kawamura, Iwata (JP); Kentarou Nishikawa, Iwata (JP); Kiyotake Shibata, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/442,392

(22) Filed: Apr. 9, 2012

(65) Prior Publication Data

US 2012/0192636 A1 Aug. 2, 2012

Related U.S. Application Data

(63) Continuation of application No. PCT/JP2010/067829, filed on Oct. 12, 2010.

(30) Foreign Application Priority Data

| Oct. 14, 2009 | (JP) | 2009-237081 |
| Oct. 23, 2009 | (JP) | 2009-244303 |
| Dec. 25, 2009 | (JP) | 2009-293815 |

(51) Int. Cl.
*G01M 15/00* (2006.01)

(52) U.S. Cl.
USPC .................. 73/115.07; 73/115.01

(58) Field of Classification Search
None
See application file for complete search history.

(56) References Cited

U.S. PATENT DOCUMENTS

| 6,619,102 | B2  |   | 9/2003  | Salou et al. |
| 6,634,208 | B2  |   | 10/2003 | Salou et al. |
| 7,178,413 | B2  | * | 2/2007  | Hofmann et al. ........ 73/862.541 |
| 7,249,528 | B2  | * | 7/2007  | Inoue ....................... 73/862.392 |
| 7,604,413 | B2  | * | 10/2009 | Koike et al. ................... 384/448 |
| 7,628,540 | B2  | * | 12/2009 | Iwamoto et al. ............. 384/448 |
| 7,631,553 | B2  | * | 12/2009 | Heim et al. ................ 73/115.07 |
| 7,762,128 | B2  |   | 7/2010  | Ozaki et al. |

(Continued)

FOREIGN PATENT DOCUMENTS

| JP | 2002-98138 | 4/2002 |
| JP | 2003-530565 | 10/2003 |

(Continued)

OTHER PUBLICATIONS

International Search Report for PCT/JP2010/067829 mailed Jan. 18, 2011.

(Continued)

*Primary Examiner* — Lisa Caputo
*Assistant Examiner* — Jermaine Jenkins

(57) ABSTRACT

A sensor equipped wheel support bearing assembly, in which detection error is relieved to accurately estimate load is provided. A vehicle body fitting flange of an outer member of the bearing assembly has a front elevational shape of line symmetry or of point symmetry. A sensor unit including a strain generating member having two or more contact fixing segments to be fixed to the outer member and a strain sensor is provided at an arcuately sectioned portion lying from the flange to the outer member, or an outer peripheral surface portion of the outer member adjoining to the outboard side thereof, or a position crossing a line segment passing through a center of a rolling element or a position adjoining thereto. Alternatively, a plurality of sensor units are provided on the outer periphery of the outer member in a fashion spaced circumferentially equidistantly.

15 Claims, 40 Drawing Sheets

(56) References Cited

U.S. PATENT DOCUMENTS

| | | |
|---|---|---|
| 2002/0012484 A1 | 1/2002 | Salou et al. |
| 2002/0061148 A1 | 5/2002 | Salou et al. |
| 2009/0114004 A1 | 5/2009 | Ozaki et al. |
| 2009/0324152 A1 | 12/2009 | Ozaki et al. |
| 2010/0135604 A1 | 6/2010 | Ozaki et al. |
| 2010/0310202 A1 | 12/2010 | Takahashi et al. |

FOREIGN PATENT DOCUMENTS

| | | |
|---|---|---|
| JP | 2007-57299 | 3/2007 |
| JP | 2007-239848 | 9/2007 |
| JP | 2008-51239 | 3/2008 |
| JP | 2009-192392 | 8/2009 |
| WO | WO 01/77634 A2 | 10/2001 |
| WO | WO 2009/119068 A1 | 10/2009 |

OTHER PUBLICATIONS

International Preliminary Report on Patentability dated May 24, 2012 issued in corresponding International Patent Application No. PCT/JP2010/067829.

* cited by examiner

← OUTBOARD SIDE    INBOARD SIDE →

OUTBOARD SIDE ← → INBOARD SIDE

Fig. 10
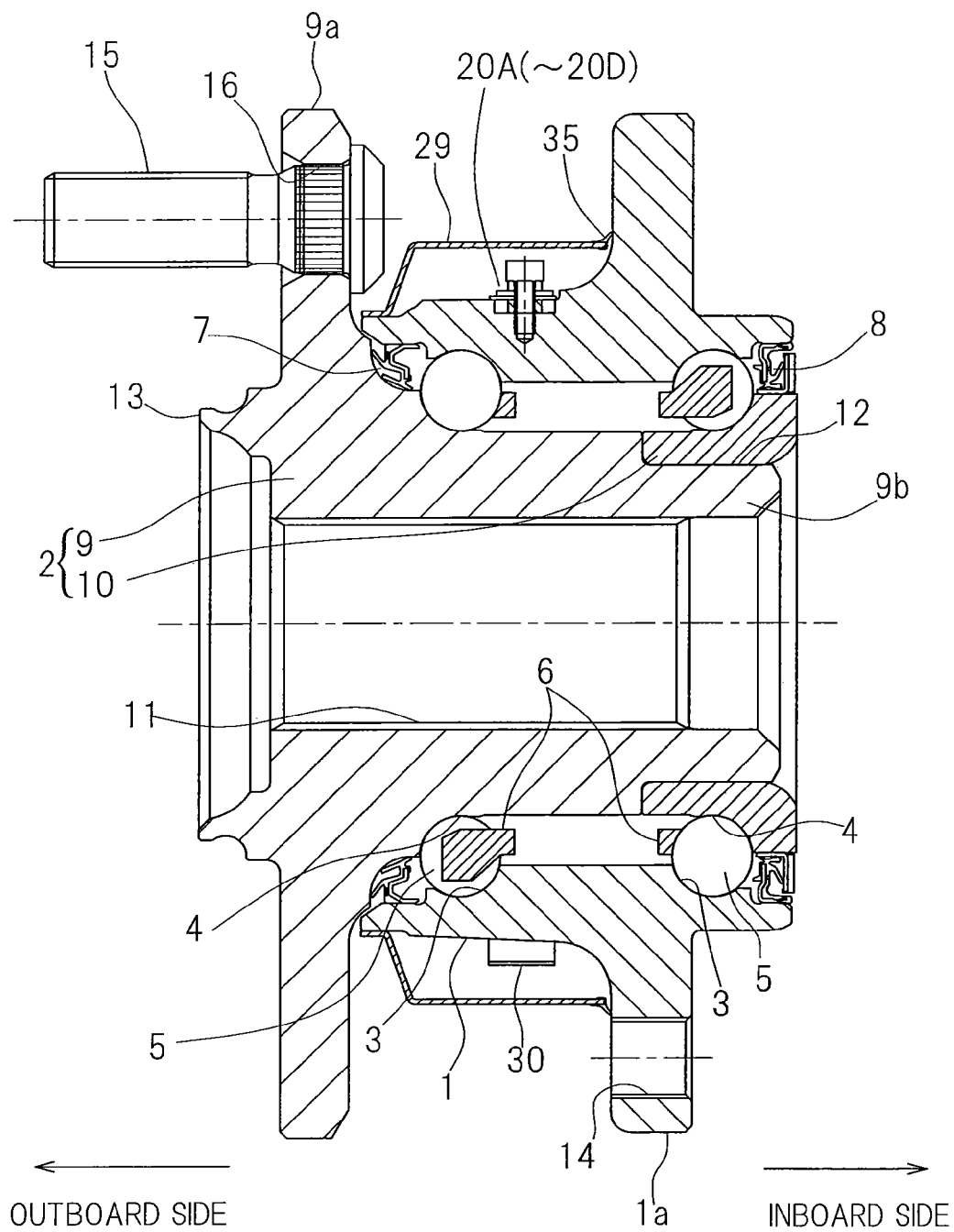
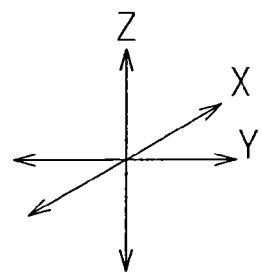

Fig. 11
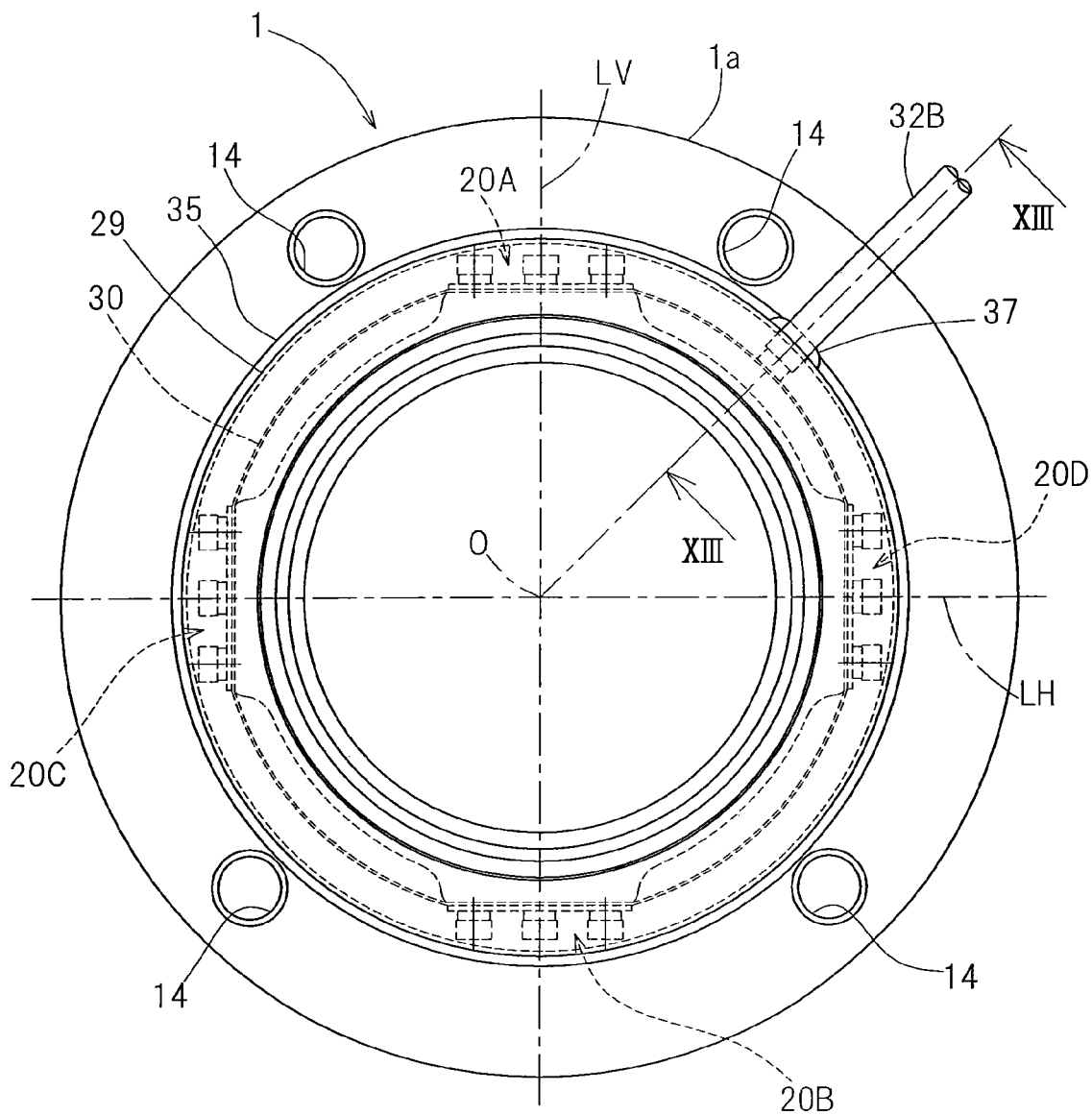
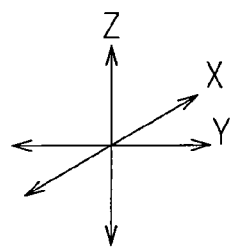

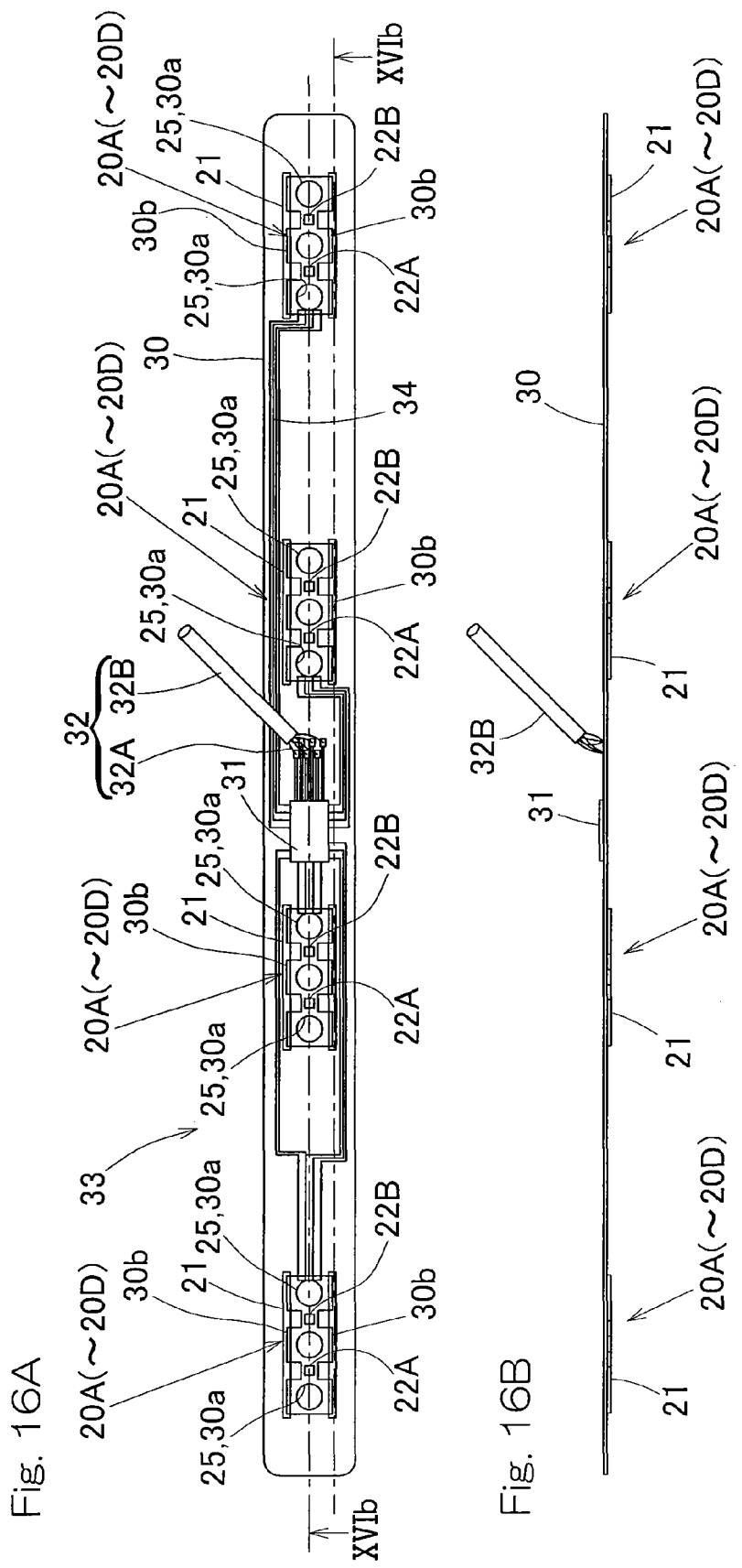

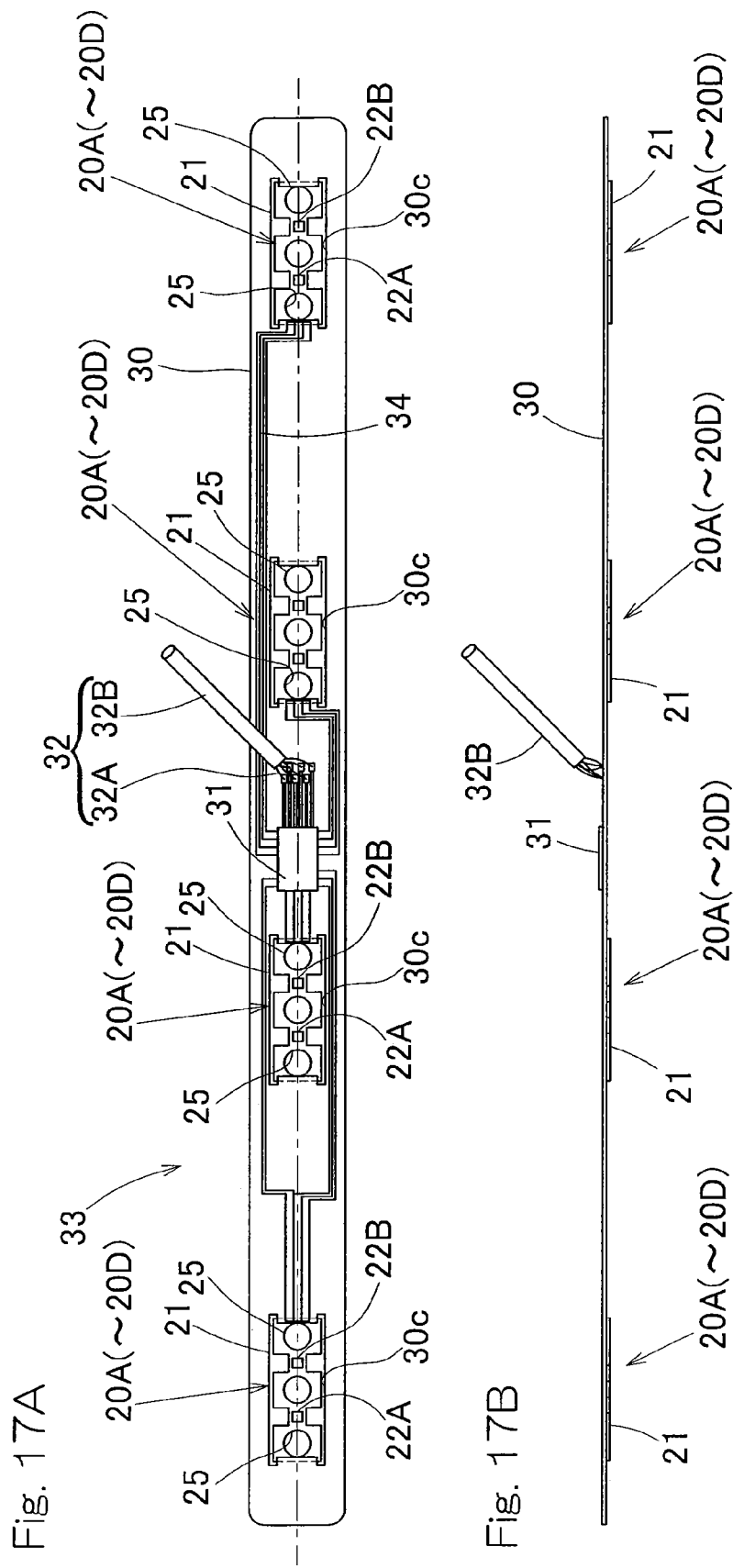

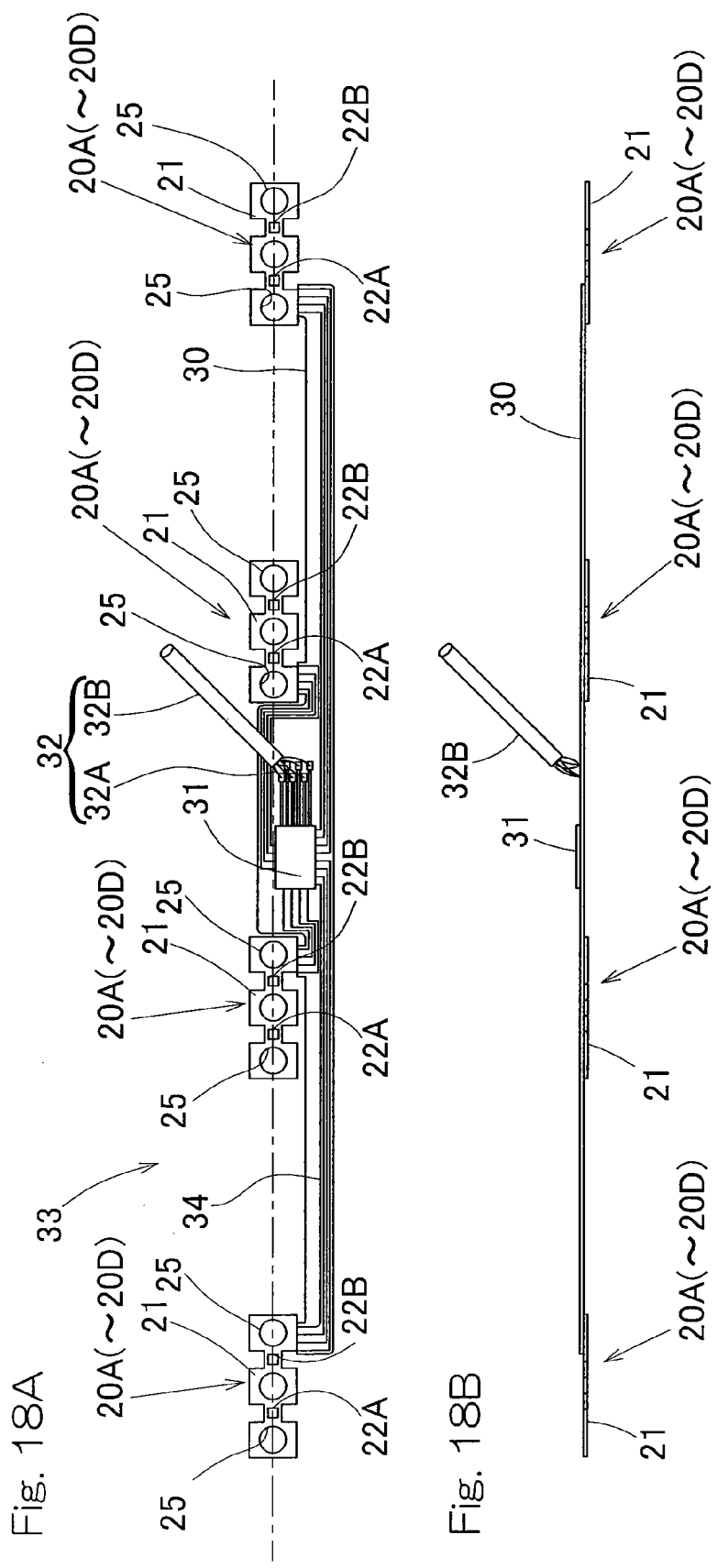

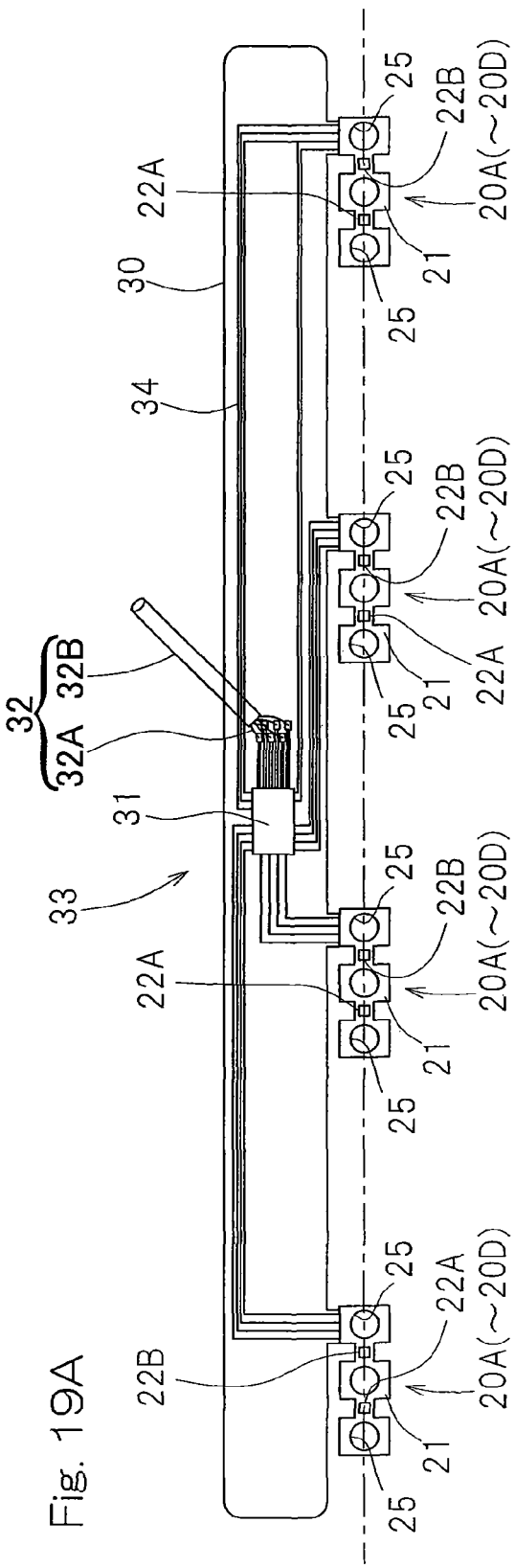

OUTBOARD SIDE    INBOARD SIDE

← OUTBOARD SIDE        INBOARD SIDE →

Fig. 30
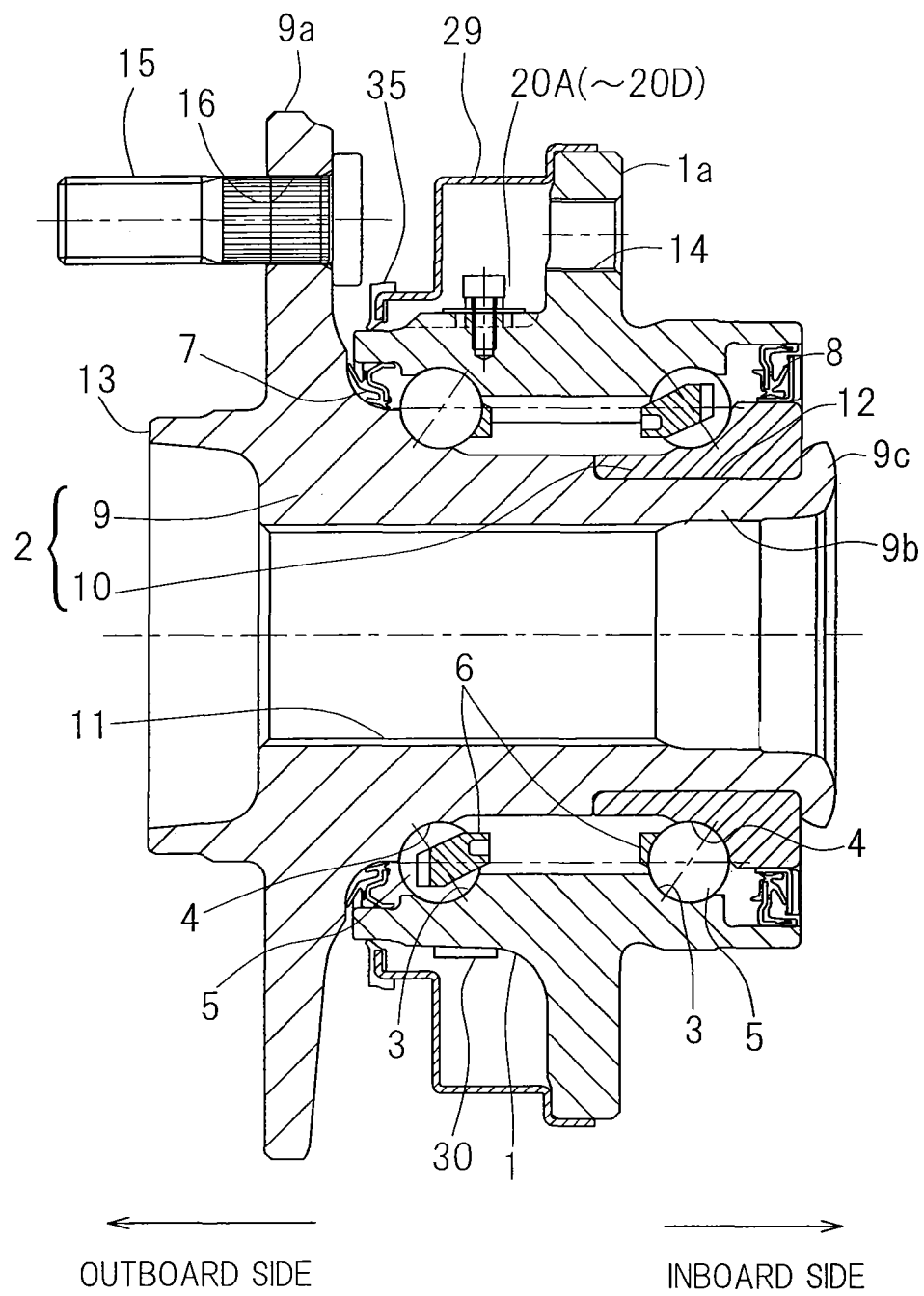
OUTBOARD SIDE → ← INBOARD SIDE
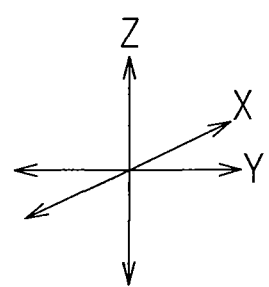

Fig. 31
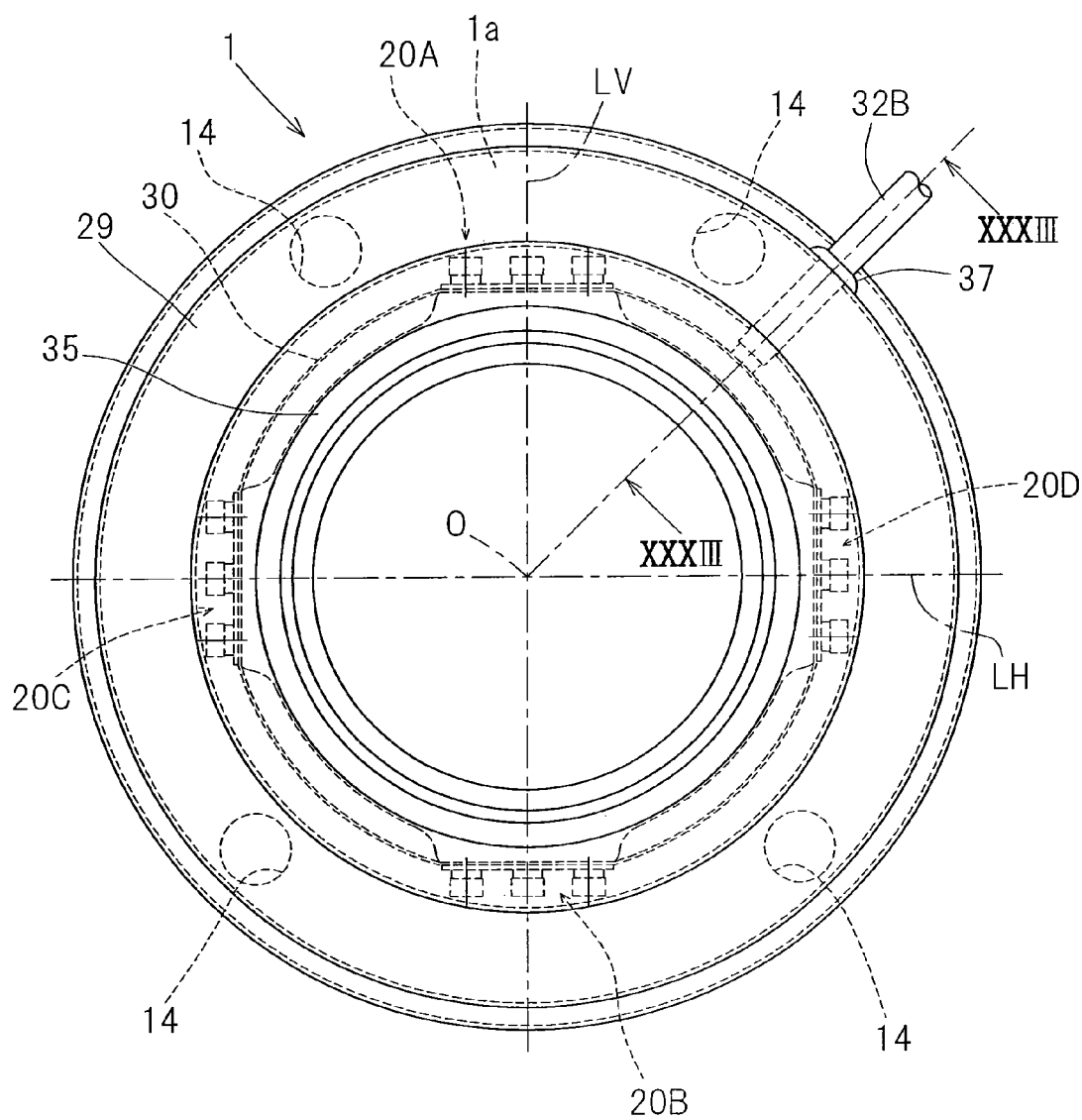
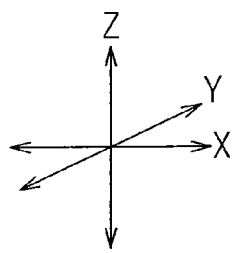

OUTBOARD SIDE  INBOARD SIDE

← OUTBOARD SIDE

INBOARD SIDE →

OUTBOARD SIDE ← → INBOARD SIDE

Fig. 45A
52
57
Fig. 45B
52
W
57
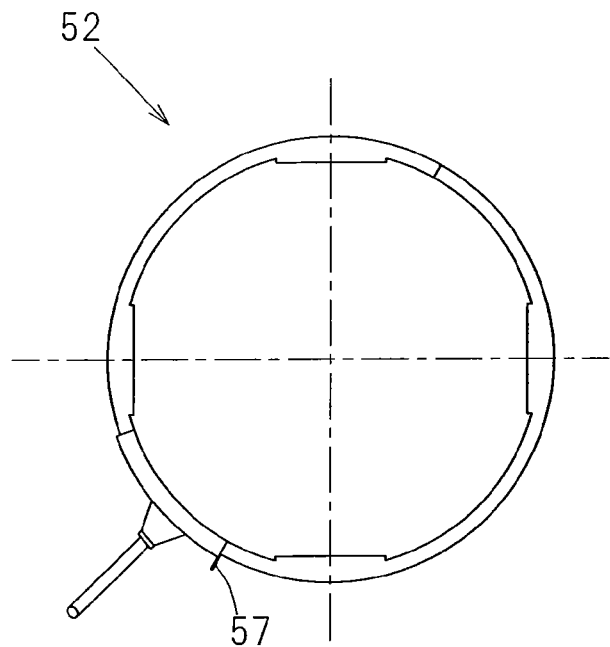
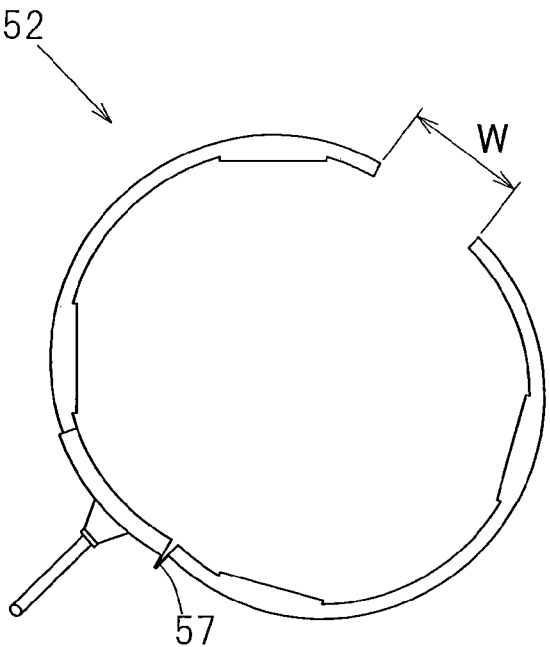
Fig. 46
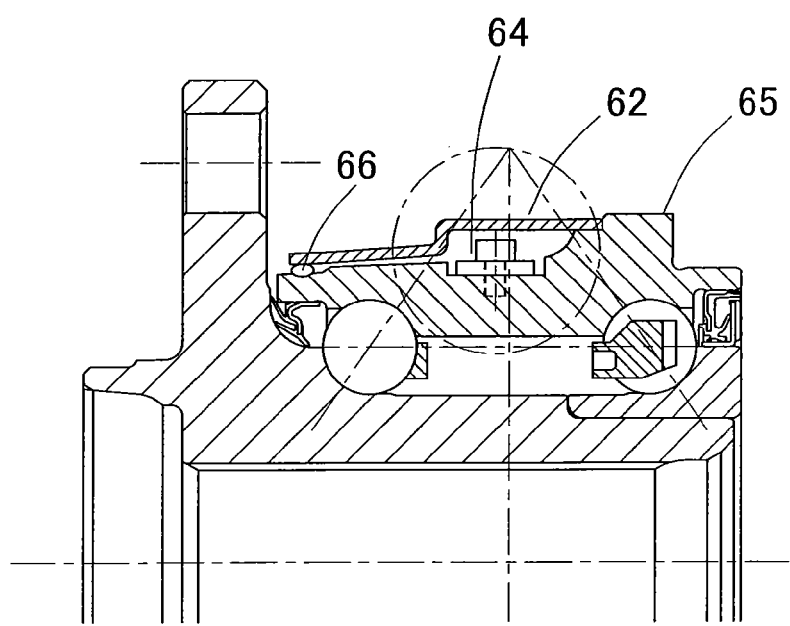

WHEEL BEARING WITH SENSOR

CROSS REFERENCE TO THE RELATED APPLICATIONS

This application is a continuation application, under 35 U.S.C. §111(a), of international application No. PCT/JP2010/067829, filed Oct. 12, 2010, which claims priority to Japanese patent applications No. 2009-237081, filed Oct. 14, 2009, No. 2009-244303, filed Oct. 23, 2009 and No. 2009-293815, filed Dec. 25, 2009, the disclosure of which are incorporated by reference in their entirety into this application.

BACKGROUND OF THE INVENTION

1. Field of the Invention

The present invention relates to a sensor equipped wheel support bearing assembly having a load sensor built therein for detecting a load acting on a bearing unit of a vehicle wheel.

2. Description of Related Art

As a technique to detect a load acting on any one of vehicle wheels of an automotive vehicle, a sensor equipped wheel support bearing assembly has been suggested in, for example, the patent document 1 listed below, in which detection is made of strains occurring in a flange portion outer diametric surface of an outer ring (an outer member), forming a stationary ring, of the wheel support bearing assembly. In addition, such a wheel support bearing assembly as shown in FIG. 43 has also been suggested in, for example, the patent document 2 listed below, in which a strain gauge 51 is pasted to an outer ring 50 of the wheel support bearing assembly for the purpose of detecting strains.

Yet, the inventors of the present invention has ever suggested a sensor equipped wheel support bearing assembly of a structure, in which a sensor unit, comprised of a strain generating member and a strain sensor fitted to this strain generating member, is fitted to a stationary ring of the bearing assembly, which strain generating member has at least two contact fixing segments relative to the stationary ring and also has at least one cutout portion defined between the neighboring contact fixing segments with the strain sensor arranged in this cutout portion. In this respect, see, for example, the patent document 3 listed below.

According to the sensor equipped wheel support bearing assembly disclosed in the patent document 3 listed below, since when a load acts on a rotatable ring then rotating incident to travel of the automotive vehicle, the stationary ring is deformed through rolling elements, such deformation leads to a strain induced in the sensor unit. The strain sensor provided in the sensor unit detects the strain induced in the sensor unit. If a relation between the strain and the load is determined by means of a series of experiments and/or simulations beforehand, the load, for example, which has been imposed on the vehicle wheel may be detected from an output of the strain sensor.

PRIOR ART DOCUMENTS

[Patent Document 1] JP Laid-open Patent Publication No. 2002-098138
[Patent Document 2] JP Laid-open Patent Publication No. 2003-530565
[Patent Document 3] JP Laid-open Patent Publication No. 2007-057299

SUMMARY OF THE INVENTION

According to the technique disclosed in the patent document 1 listed above, the strain generated as a result of deformation of a flange portion of the stationary ring is detected. It has, however, been found involving such a problem that since the deformation of the flange portion of the stationary ring is accompanied by a slippage in the event that a force exceeding the static frictional force between a flange surface and a knuckle, repeated application of the load may results in generation of a hysteresis in an output signal.

On the other hand, according to the sensor equipped wheel support bearing assembly disclosed in the patent document 2 listed above, if the structure is employed in which the strain gauge 51 is pasted to the outer ring 50 of the wheel support bearing assembly as shown in FIG. 43, the sensor cannot be protected from an external environment. Because of that, there is a possibility that gravel stones, for example, bounced during the travel of the automotive vehicle, may collide against the sensor to impair the latter or the sensor may be wetted with a muddy saline water to such an extent as to result in a corrosion of the sensor. In addition, it has a problem in assemblability.

In order to alleviate the foregoing problems and inconveniences inherent in the prior art wheel support bearing assemblies discussed above, the inventors of the present invention have suggested such respective structures as shown in FIGS. 44 and 46. Specifically, in the sensor equipped wheel support bearing assembly of the structure shown in FIG. 44, an annular sensor assembly 54, made up of electronic component parts including a plurality of sensor units 53 for load detection purpose, a signal processing IC for processing an output signal of each of those sensor units 53 and a signal cable for withdrawing the processed output signals of the respective sensor units 53 to the outside of the bearing assembly, which electronic component parts are arranged inside an annular protective shroud 52, are fitted coaxially to an outer peripheral surface of, for example, an outer ring 56, forming a stationary member of the wheel support bearing assembly, through a sealing member 55.

On the other hand, in the sensor equipped wheel support bearing assembly of the structure shown in FIG. 46, the electronic component parts employed in the sensor equipped wheel support bearing assembly of the structure shown in FIG. 44 are connected together in a ring form to complete a sensor assembly 64, which is in turn fitted, in a coaxial relation with, for example, an outer ring 65 forming a stationary member of the wheel support bearing assembly, to an outer peripheral surface of the outer ring 65 and is also covered with a tubular protective shroud 62 of a shape having its inner diameter increasing towards an inboard side with its inboard end portion mounted around the outer peripheral surface of the outer ring 65 whereas an outboard end portion of the protective shroud 62 is fitted to the outer peripheral surface of the outer ring 65 through a sealing member 66 made of an elastic material.

The structure shown in and described with reference to FIG. 44 has been found involving a problem in sealability, assemblability and cost since the sensor assembly 54 has a complicated shape and since the protective shroud 52 is generally made up of split two members that are connected together through a hinge 57 as shown in FIGS. 45A and 45B.

The structure shown in and described with reference to FIG. 46 has been found involving a problem in assemblability and cost since the sealing member 66, which is a member separate from the protective shroud 62, need be engaged in a groove defined in the outer peripheral surface of the outer ring 65 forming the stationary member.

In the sensor equipped wheel support bearing assembly disclosed in the patent document 3 listed above, a problem has been found that since if the stationary ring, on which the sensor unit is to be mounted, is an outer ring of the wheel support bearing assembly of, for example, the third generation type, a knuckle fitting flange of such outer ring comes to have a complicated shape, the output of the sensor unit tends to have a detection error as affected by its complicated shape.

More specifically, the flange of the outer ring referred to above has bolt insertion holes or tap holes defined therein for securing corresponding bolts therethrough to a knuckle. However, in order to reduce the weight, those bolt insertion holes or tap holes are generally designed to have varying diameters over the entire periphery of each hole and, instead, to have a projection at a certain peripheral portion of each bolt insertion hole or tap hole while the remaining peripheral portion of each bolt insertion or tap hole is generally designed to represent a flower petal shape, when viewed from front, that is delimited by a non-projecting portion or a portion of a minimized length of projection. Accordingly, in the event that during the use of the bearing assembly an expansion • contraction strain other than the load occurs as a result of a temperature rise or cooling, the expansion • contraction amount and the temperature distribution of various parts of the outer ring will no longer uniform because of the complicated shape of the outer ring flange as hereinbefore discussed, and, if the sensor unit is fitted to an irregular site, influences brought about by the expansion • contraction amount or the temperature distribution of a detection signal occur and, therefore, the process will become difficult to cancel such influences. By way of example, in the outer ring of the kind referred to above, if the sensor unit is disposed on a relatively highly rigid portion, where even when a load of an equal magnitude is loaded, the strain amount becomes low, the amount of change of the strain is also small at such portion as affected by a loaded load influence and, therefore, the sensor unit tends to output the detection signal having a large error.

The present invention has its first object to provide a sensor equipped wheel support bearing assembly of a kind, in which the detection error resulting from the shape of the outer member is relieved to allow the load, acting on the vehicle wheel, to be accurately estimated.

The present invention also has its second object to provide a sensor equipped wheel support bearing assembly of a kind, in which the load acting on the wheel support bearing assembly or a tire contact ground surface can be accurately detected for an extended period of time while any trouble occurring in the sensor by the effect of an influence brought about by an external environment is prevented and, also, in which wiring procedures of signal cables and sensor assemblage, fitting of a protective shroud and any other sealing element can be facilitated at a reduced cost.

The first aspect of sensor equipped wheel support bearing assembly of the present invention is a wheel support bearing assembly for rotatably supporting a vehicle wheel relative to a vehicle body, which comprises an outer member having an inner periphery formed with a plurality of rolling surfaces; an inner member having an outer periphery formed with rolling surfaces held in face-to-face relation with the above described rolling surface; a plurality of rows of rolling elements interposed between the rolling surface of the outer member and the rolling surface of the inner member; a vehicle body fitting flange to be fitted to a knuckle provided in an outer periphery of the outer member; and one or more sensor units including a strain generating member having two or more contact fixing segments adapted to be fixed to the outer periphery of the outer member in contact therewith, and a sensor fitted to the strain generating member and operable to detect a strain induced in the strain generating member, provided at an arcuately sectioned portion, formed to continue from a base end of an outboard oriented side face of the flange to the outer periphery of the outer member, or an outer peripheral surface portion of the outer member adjoining the articulately sectioned portion on an outboard side; the flange having a front elevational shape of a line symmetry with respect to a line segment perpendicular to a bearing axis or of a point symmetry about the bearing axis.

In one embodiment of the present invention, each of the one or more sensor units may be provided at a position at which a line segment containing a center of each of the rolling elements on the outboard side and defining a rolling element contact angle intersects the outer periphery of the outer member or a position adjoining thereto.

The sensor unit referred to above is employed in a plural number and those sensor units are preferably provided equidistantly in a circumferential direction of the outer periphery of the outer member.

In the construction described above, when a load acts between the wheel tire and the road surface, the load is applied also to the outer member of the wheel support bearing assembly, resulting in deformation. Since in the present invention the two or more contact fixing segments of the strain generating member in the sensor unit are fixed to the outer periphery of the outer member in contact therewith, the strain induced in the outer member is easily transmitted to the strain generating member after having been amplified and such strain is detected with a high sensitivity. In particular, since as hereinabove described, the front elevational shape of the flange is of a line symmetry with respect to a line segment perpendicular to a bearing axis or of a point symmetry about the bearing axis, the shape of the outer member is simplified and the temperature distribution, resulting from complication of the shape of the outer member, and variation of the expansion • contraction amount can be reduced. Accordingly, by sufficiently reducing the influences brought about by the variation of the expansion • contraction amount and the temperature distribution in the outer member, the sensor unit can be allowed to detect the amount of the strain brought about by the load.

Also, since in addition to the simplification of the shape of the outer member as described above, the strain at the site of installation of the sensor unit becomes large particularly where the sensor unit is provided at the arcuate sectioned area of the flange, which is formed in the outer periphery of the outer member so as to extend from a base end of one side of the flange, oriented towards the outboard side, towards the outer periphery of the outer member or the outer peripheral surface portion adjoining the arcuately sectioned portion on the outboard side, even when the temperature distribution of the outer ring and the variation of the expansion • contraction amount occur, the influence thereof can be minimized to allow the sensor unit to detect the strain amount brought about by the load. Accordingly, the load imposed on the vehicle wheel can be accurately estimated by relieving the detection error resulting from the shape of the outer member.

Also, since in addition to the simplification of the shape of the outer member as described above, the sensor unit is provided at respective positions crossing the line segment, which extends through the center of each of the rolling elements of the outboard row in that direction required to form the rolling element contact angle, or respective positions adjacent to those crossing positions, the strain induced at the sites of installation of the sensor unit will become large and, even when the temperature distribution of the outer member and the variation of the expansion • contraction amount occur, the influence thereof can be minimized to allow the sensor unit to detect the strain amount brought about by the load. Accordingly, the load imposed on the vehicle wheel can be accurately estimated by relieving the detection error resulting from the shape of the outer member.

In one embodiment of the present invention, the sensor unit may be provided in an outer peripheral surface portion of the outer member within a region spaced within 5 mm from a terminating end of the arcuately sectioned portion in the outboard oriented side face of the flange. Where the sensor unit is provided in the outer peripheral surface portion of the outer member adjoining the outboard side of the articulately sectioned portion that is formed so as to continue from the base end of the outboard oriented side face of the flange to the outer periphery of the outer member, provided that it be within the region spaced within 5 mm from the terminating end of the arcuately sectioned portion in the outboard oriented side face of the flange as described above, if the temperature variation and the variation of the expansion • contraction amount somewhat occur, the influences thereof can be sufficiently reduced to allow the sensor unit to detect the amount of the strain brought about by the load.

In one embodiment of the present invention, the one or more sensor units may be enclosed within a tubular protective shroud that encloses an outer periphery of the outer member, with an outboard end of the protective shroud mounted on the outer peripheral surface of the outer member, in which case a lip member made of an annular elastic element and provided along an open edge of an inboard end of the flange is held in contact with the outboard oriented side face of the flange or the outer peripheral surface of the outer member.

According to this construction described above, the plurality of the sensor units for the detection of the load that are fixed to the outer peripheral surface of the outer member are provided and those plural sensor units are covered with the tubular protective shroud. Since the lip member made of an annular elastic element and provided along an open edge of an inboard end of the flange is held in contact with the outboard oriented side face of the flange or the outer peripheral surface of the outer member, the sensor units can be covered with the protective shroud and, by preventing any trouble from occurring in the sensor under the influence of the external environment, the load acting on the wheel support bearing assembly or the wheel tire ground surface can be accurately detected for a prolonged period of time. By way of example, the sensor units can be assuredly protected from gravel stones, bounced from the outside, and muddy water and/or saline water splashed from the outside. Also, wiring of the signal cable and assemblage of the sensor units are easy to achieve and the cost can also be reduced. Although the protective shroud is fitted to the outer peripheral surface of the outer member, the protective shroud in such case can be made easy to fit and protection of the sensor units by means of the protective shroud is also easy to achieve.

In one embodiment of the present invention, the one or more sensor units are enclosed within a tubular protective shroud that encloses an outer periphery of the outer member, with an inboard end of the protective shroud mounted on the outer peripheral surface of the outer member, in which case a lip member made of an annular elastic element and provided along an open edge of an outboard end of the flange is held in contact with the outer peripheral surface of the outer member or a surface of the inner member.

According to the construction described above, the plurality of the sensor units for the detection of the load that are fixed to the outer peripheral surface of the outer member are provided and those plural sensor units are covered with the tubular protective shroud. Since the protective shroud has the inboard end mounted on an outer diametric surface of the flange of the outer member and the lip member made of an annular elastic element and provided along an open edge of an inboard end of the flange is held in contact with the outboard oriented side face of the flange or the outer peripheral surface of the outer member, the sensor units can be covered with the protective shroud and, by preventing any trouble from occurring in the sensor under the influence of the external environment, the load acting on the wheel support bearing assembly or the wheel tire ground surface can be accurately detected for a prolonged period of time. By way of example, the sensor units can be assuredly protected from gravel stones, bounced from the outside, and muddy water and/or saline water splashed from the outside.

Also, wiring of the signal cable and assemblage of the sensor units are easy to achieve and the cost can also be reduced. Since the protective shroud is fitted with the inboard end thereof mounted on the outer diametric surface of the flange of the outer member, a fitting work of the protective shroud is easy to achieve. Moreover, the lip member held in contact with the outer peripheral surface of the outer member is integrally fitted to the protective shroud, there is no need to fit any sealing member such as, for example and a sealing member comprised of the lip member can be fitted upon fitting of the protective shroud and, therefore, a fitting work of the sealing member can be relieved. In addition, although the protective shroud is fitted to the outer periphery of the outer member, the protective shroud in such case can be made further easy to fit and protection of the sensor units by means of the protective shroud is also easy to achieve.

The provision may be made of a sensor assembly fitted to the outer peripheral surface of the outer member in a fashion coaxial with the outer member and enclosed within the protective shroud, the sensor assembly comprising electronic component parts including the sensor unit, a signal processing IC for processing an output signal of this sensor unit, and a signal cable for drawing the output signal, which has been processed, to the outside of a bearing unit, which parts are connected in a ring form. In the case of this construction, the sensor assembly of the kind, in which the electronic component parts inclusive of the sensor unit are connected in the ring form, can be covered with the protective shroud.

In one embodiment of the present invention, the sensor unit may be fitted to a flexible substrate, in which case a sensor assembly, which includes electronic component parts including the sensor unit, a signal processing IC for processing an output signal of this sensor unit, and a signal cable for drawing the output signal, which has been processed, to the outside of a bearing unit, which parts are connected in a ring form, with the signal processing IC and the signal cable being fitted to the flexible substrate, is fitted to the outer peripheral surface of the outer member in a fashion coaxial with the outer member and enclosed within the protective shroud. When as hereinabove described the sensor unit is fitted to the flexible substrate, fitting of the sensor unit is facilitated. Also, fitting of the sensor unit, the signal processing IC and the signal cable on the flexible substrate facilitate a connection among the sensor unit, the signal processing IC and the signal cable by forming a pattern of a wiring circuit on the flexible substrate.

In one embodiment of the present invention, the outboard end of the protective shroud may be extended towards the outboard side beyond the outer member and further comprising a non-contact sealing gap formed between the outboard end thereof and the inner member. In the case of this construction, the seal between the protective shroud and the outer member is also assured on the outboard side and, therefore, the load detection can be accomplished accurately by further assuredly avoiding any undesirable trouble under the influence of the environment from occurring.

In one embodiment of the present invention, the lip member may be of a shape flaring outwardly towards the inboard side. In the case of this construction, an undesirable ingress of muddy water and/or saline water from the inboard end into the protective shroud can be assuredly avoided.

In one embodiment of the present invention, the lip member may be of a shape diametrically decreasing towards the outboard side and is held in contact with the outer peripheral surface of the outer member. In the case of this construction, an undesirable ingress of muddy water and/or saline water from the outboard end into the protective shroud can be assuredly avoided.

In one embodiment of the present invention, the lip member referred to above may have a portion extended to a portion of the outer peripheral surface of the protective shroud to define a shroud outer peripheral surface covering portion. The shroud outer peripheral surface covering portion referred to above is, where the lip member is fitted to the outer peripheral surface of the protective shroud, provided having been extended further towards the inboard side beyond the range, in which it is positioned on the protective shroud, in order to secure a required fitting strength. In the case of this construction, at the outboard end of the outer peripheral surface of the protective shroud, a wall comprised of the shroud outer peripheral surface covering portion protrudes radially outwardly and, in the presence of this wall, an undesirable flow of muddy water and/or saline water into an area, where the lip member is held in contact with the outer peripheral surface of the outer member, can be avoided to assuredly avoid an undesirable ingress of the muddy water and/or saline water into the protective shroud.

In one embodiment of the present invention, the inner member may have a vehicle wheel mounting hub flange and the lip member is held in contact with the inboard oriented side face of this hub flange. In the case of this construction, since seal is accomplished between the hub flange of the rotating member and the outboard end of the protective shroud, an undesirable ingress of the muddy water and/or saline water into the protective shroud can be avoided assuredly.

In one embodiment of the present invention, the sensor unit may be four in number, in which case the four sensor units being equidistantly arranged at upper, lower, left and right surface portions of the outer peripheral surface of the outer member, which assumes top, bottom, left and right position relative to a wheel tire contact ground surface, in a phase difference of 90° in a circumferential direction. In the case of this construction, the load can be accurately estimated under any loading condition. In other words, if the load increases in a certain direction, a portion, where the rolling elements contact the rolling surfaces, and a portion, where the rolling elements do not contact the rolling surfaces, appear in a phase difference of 180° and, therefore, if in compliance with that direction the sensor units are positioned spaced 180° in phase difference, the load to be applied to the outer member through the rolling elements can be transmitted to any of the sensor units and such load can be detected by the sensor.

In one embodiment of the present invention, the sensor unit may have three or more contact fixing segments and two sensors, the two sensors being fitted between the neighboring first and second contact fixing segments and between the neighboring second and third contact fixing segments, respectively, in which case the interval between the neighboring contact fixing segment or the neighboring sensors in the circumferential direction of the outer member is chosen to be (1/2+n), wherein n represents an integer, in which case a load is estimated with the sum of respective output signals of the two sensors being used as an average value. In the case of this construction, the respective output signals of the two sensors have a phase difference of about 180° relative to each other and, therefore, the average value thereof represents a value from which a component of change resulting from the passage of the rolling elements has been cancelled. In view of this, the load estimation with the use of the average value becomes further accurate.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 10 is a longitudinal sectional view of the sensor equipped wheel support bearing assembly designed according to a fourth embodiment of the present invention;

FIG. 11 is a front elevational view of the outer ring of the sensor equipped wheel support bearing assembly as viewed from the outboard side;

FIG. 16A is a developed plan view showing one example of arrangement of electronic component parts disposed in a sensor assembly;

FIG. 16B is a cross sectional view taken along the line XVIb-XVIb in

FIG. 16A;

FIG. 17A is a developed plan view showing another example of arrangement of the electronic component parts disposed in the sensor assembly;

FIG. 17B is a sectional view of FIG. 17A;

FIG. 18A is a developed plan view showing a further example of arrangement of the electronic component parts disposed in the sensor assembly;

FIG. 18B is a sectional view of FIG. 18A;

FIG. 19A is a developed plan view showing a still further example of arrangement of the electronic component parts disposed in the sensor assembly;

FIG. 19B is a sectional view of FIG. 19A;

FIG. 30 is a longitudinal sectional view of the sensor equipped wheel support bearing assembly designed according to a tenth embodiment of the present invention;

FIG. 31 is a front elevational view of the outer ring of the sensor equipped wheel support bearing assembly as viewed from the outboard side;

FIG. 45A is an explanatory diagram used to explain a protective shroud employed in the suggested example;

FIG. 45B is an explanatory diagram used to explain a protective shroud employed in the suggested example; and FIG. 46 is a sectional view showing a different conventional example.

DESCRIPTION OF THE PREFERRED EMBODIMENTS

A first embodiment of the present invention will be described in detail with particular reference to FIG. 1 to FIGS. 6A to 6C. The embodiment shown in FIG. 1 to FIGS. 6A to 6C is an inner ring rotating model of the third generation type and is applied to a wheel support bearing assembly for the support of a drive wheel. It is to be noted that in the description set forth hereinabove and hereinafter, the terms "outboard" and "inboard" are to be understood as meaning one side of the vehicle body away from the longitudinal center of the vehicle body and the other side of the vehicle body close to the longitudinal center of the vehicle body, respectively, when assembled in the vehicle body.

Figure 1:
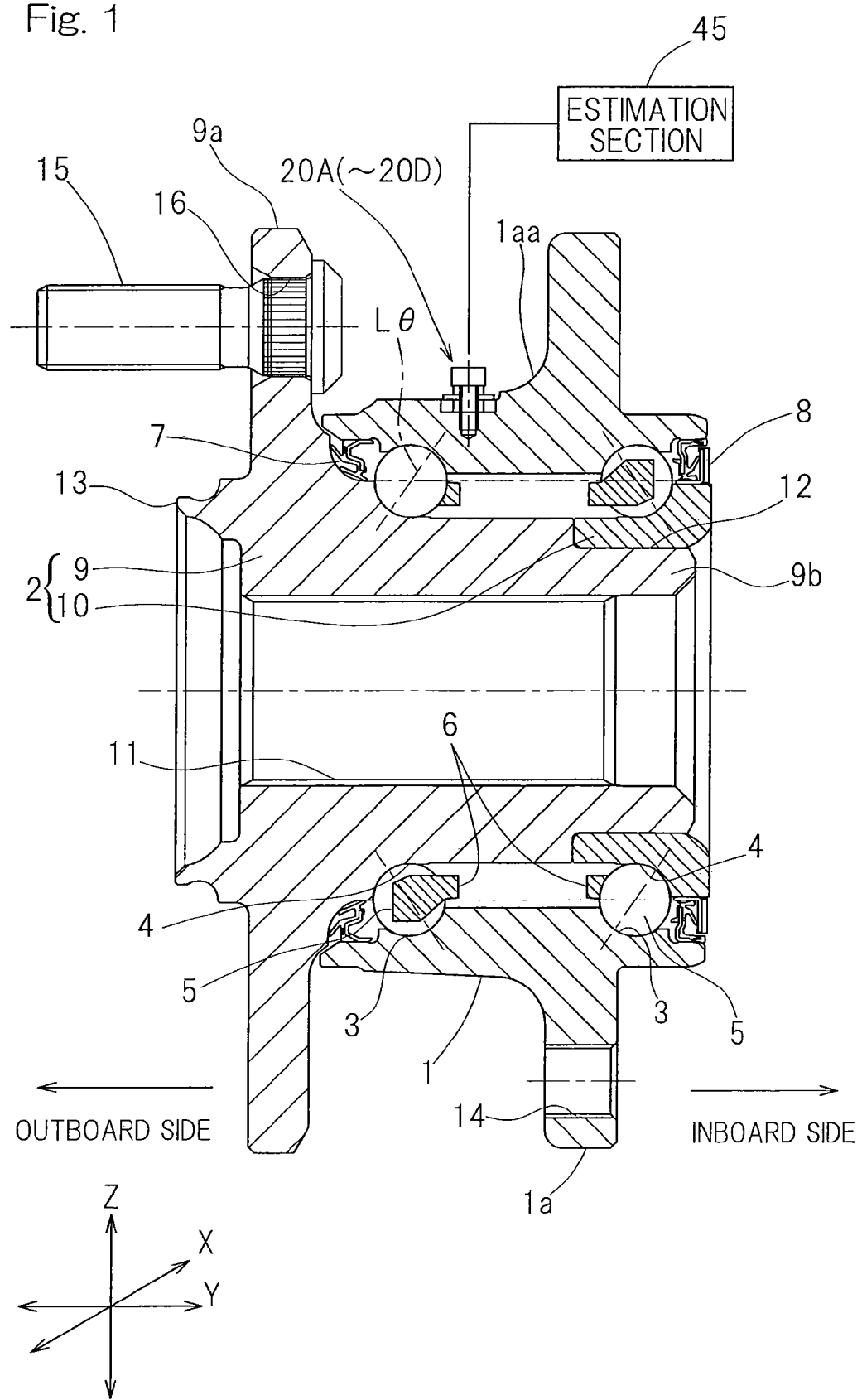
FIG. 1 is a diagram illustrating a longitudinal sectional view of a sensor equipped wheel support bearing assembly, designed according to a first embodiment of the present invention, shown together with a block diagram of a conceptual structure of a detecting system employed therein.

A bearing unit in this sensor equipped wheel support bearing assembly includes, as shown in a longitudinal sectional representation in FIG. 1, an outer ring 1 forming an outer member having an inner periphery formed with a plurality of rolling surfaces 3, an inner member 2 having an outer periphery formed with rolling surfaces 4 defined in face-to-face relation with the respective rolling surfaces 3, and a plurality of rows of rolling elements 5 interposed between the rolling surfaces 3 of the outer ring 1 and the rolling surfaces 4 of the inner member 2. This wheel support bearing assembly is rendered to be a double row angular contact ball bearing type, in which the rolling elements 5 are in the form of balls and are retained by a retainer 6 employed for each row. The rolling surfaces 3 and 4 have respective arcuate shapes in section and are so formed as to permit the respective ball contact angles held in back-to-back relation with each other. Opposite ends of an bearing space delimited between the outer ring 1 and the inner member 2 are sealed by respective sealing members 7 and 8.

The outer ring 1 serves as a stationary member and has its outer periphery formed with a vehicle body fitting flange 1a adapted to be connected with a knuckle in a suspension system of an automotive vehicle body, the outer ring 1 in its entirety being of one piece construction. The flange 1a is provided with a screw hole 14 for knuckle fitting, which hole 14 is defined at a plurality of circumferential locations, and, by engaging a knuckle bolt (not shown), inserted into a bolt insertion hole in the knuckle from the inboard side, in the screw hole 14 referred to above, the vehicle body fitting flange 1a is fitted to the knuckle. Also, a side face of the flange 1a oriented towards the outboard side is formed with an arcuately sectioned portion 1aa continuing from its base end to the outer periphery of the outer ring 1.

The inner member 2 serves as a rotating member and is made up of a hub axle 9, having a wheel mounting hub flange 9a, and an inner ring 10 mounted on an outer periphery of an inboard end portion of a axle portion 9b of the hub axle 9. The rows of the rolling surfaces 4 referred to above are formed in the hub axle 9 and the inner ring 10, respectively. A portion of the outer periphery of the inboard end portion of the hub axle 9 has a diameter radially inwardly reduced to define an inner ring mounting surface 12, and the inner ring 10 referred to above is mounted on this inner ring mounting surface 12. The hub axle 9 has a through hole 11 defined at a center thereof. The hub flange 9a is provided with a plurality of press-fitting holes 16 defined at respective circumferential locations each for receiving a corresponding hub bolt 15 engaged therein under interference fit. A portion of the hub axle 9 adjacent the root of the hub flange 9a has a cylindrical pilot portion 13 defined therein so as to protrude towards the outboard side for guiding the vehicle wheel and a brake component (not shown).

Figure 2:
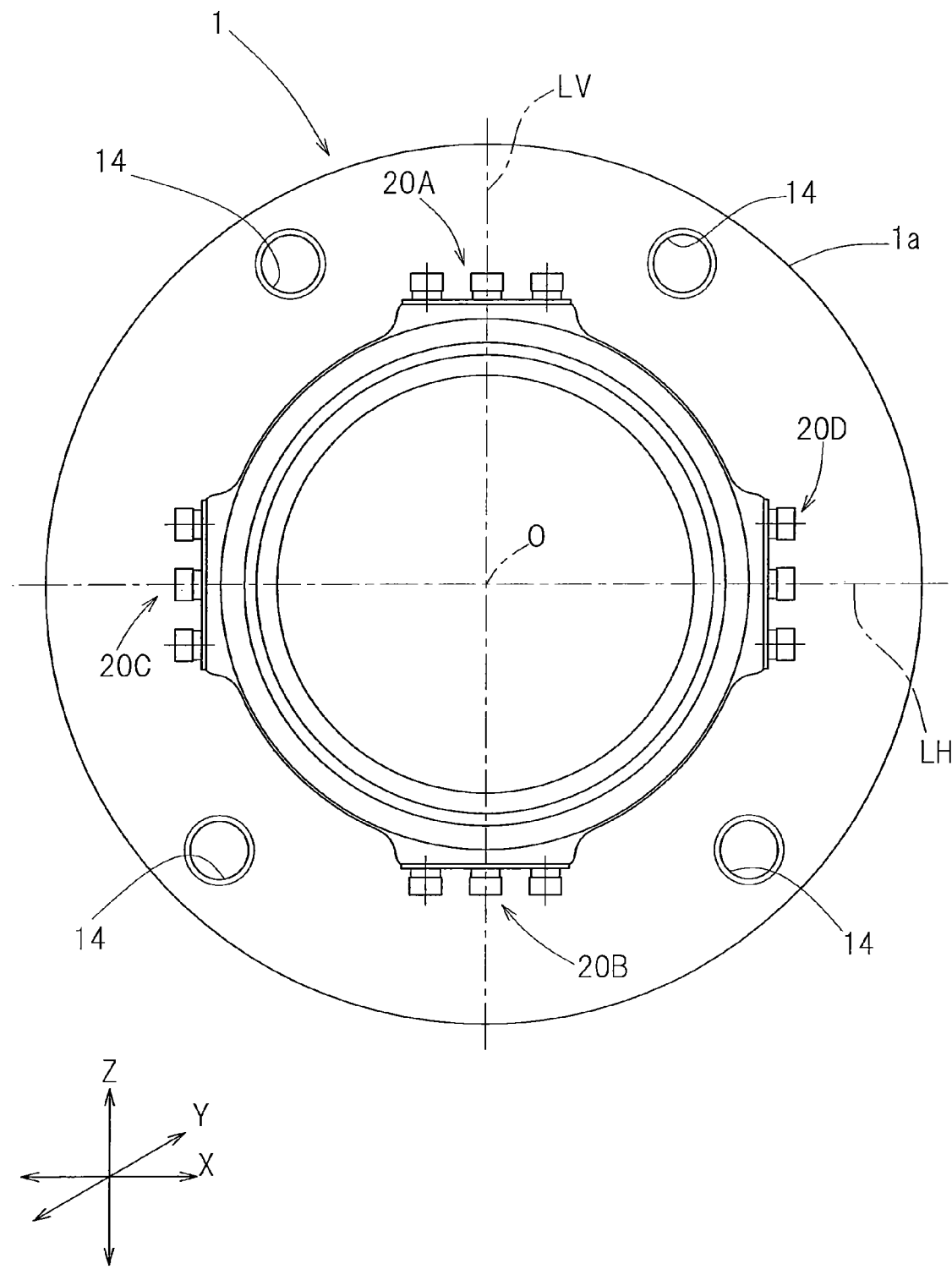
FIG. 2 is a front elevational view of an outer ring, employed in the sensor equipped wheel support bearing assembly, as viewed from an outboard side.

FIG. 2 illustrates a front elevational view showing the outer ring 1 of the wheel support bearing assembly as viewed from the outboard side. The vehicle body fitting flange 1a has its front elevational shape which is of line symmetry with respect to a line segment perpendicular to a bearing axis (for example, a longitudinal line segment LV or a transverse line segment LH as shown in FIG. 2), or of a point symmetry about a bearing axis O. More specifically, in the instance as shown, the front elevational shape thereof is rendered to be a round shape which is of a line symmetry with respect to the transverse line segment LH.

An outer diametric surface of the outer ring 1, which is the stationary member, is provided with four sensor units 20 (20A, 20B, 20C and 20D). In the instance as shown, those sensor units 20A to 20D are provided at respective outer ring outer peripheral surface portions of the arcuate sectioned area 1aa of the vehicle body fitting flange 1a in the outer ring 1 on the outboard side in a fashion equidistantly spaced from each other in a direction circumferentially thereof. More specifically, two of the sensor units 20A and 20B are provided at upper and lower surface portions of the outer diametric surface of the outer ring 1, which correspond respectively to top and bottom position with respect to the tire contact ground surface, whereas the remaining two of those sensor units 20C and 20D are provided at left and right surface portions of the outer diametric surface of the outer ring 1, which correspond respectively to left and right positions with respect to the tire contact ground surface. Although not shown, those sensor units 20A and 20B may be provided on the articulately sectioned portion 1aa of the flange 1a referred to above.

Also, the sensor units 20A and 20B may be provided at respective positions at which a line segment L θ containing a center of each of the rolling elements on the outboard side and defining a rolling element contact angle intersects the outer periphery of the outer member or a position adjoining to those positions as shown in FIG. 1. In the embodiment now under discussion, respective mounting positions of the sensor units 20A and 20B are assumed to lie on respective outer ring outer peripheral surface portions adjacent the outboard side of the articulately sectioned portion 1aa of the flange 1a and, also, at the position crossing the line segment L θ referred to above or the position adjacent to those crossing positions, the crossing positions referred to above or the positions adjacent to those crossing positions may be positions separate from the respective outer ring outer peripheral surface portions adjacent the outboard side of the articulately sectioned portion 1aa.

Figure 3:
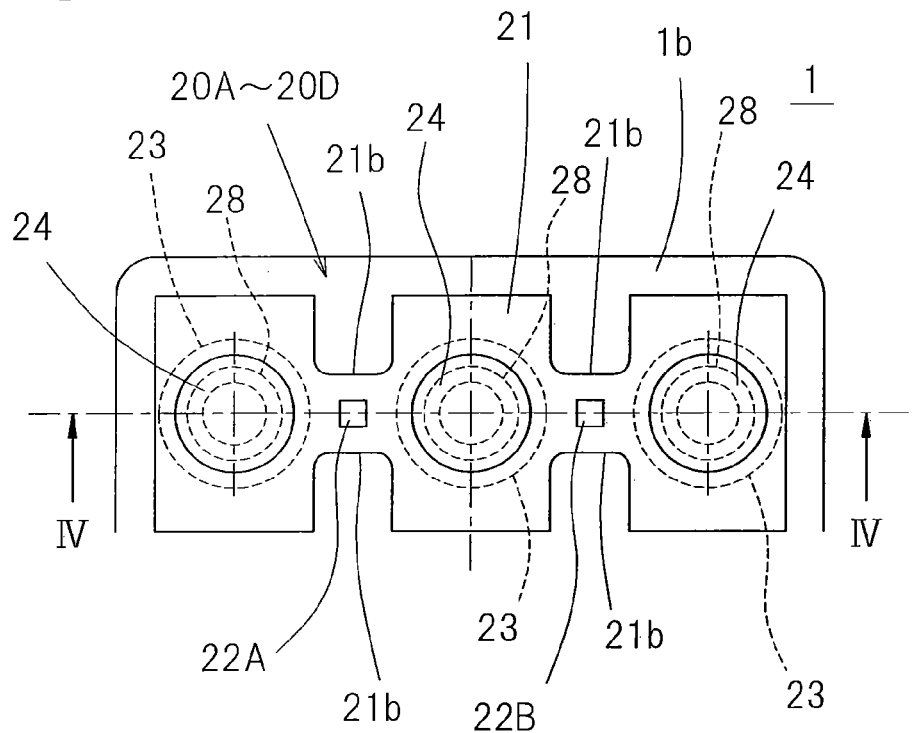
FIG. 3 is an enlarged top plan view of a sensor unit employed in the sensor equipped wheel support bearing assembly.
Figure 4:
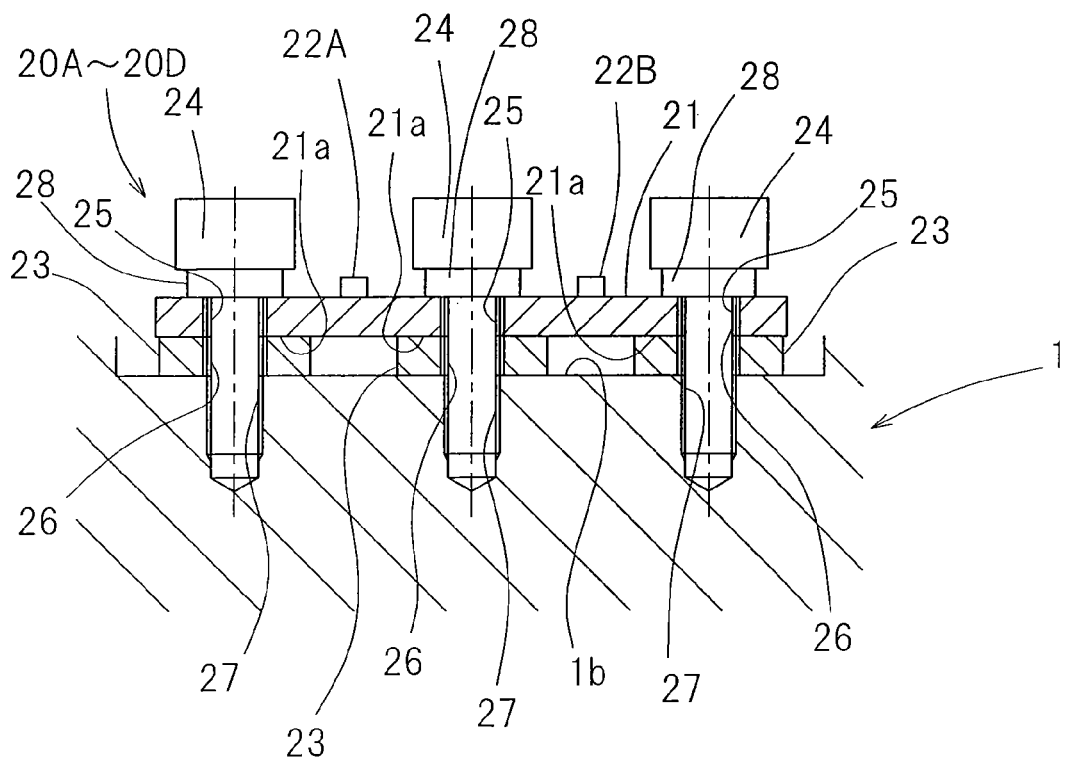
FIG. 4 is a cross sectional view taken along the line Iv-Iv in FIG. 3.

Each of those sensor units 20A to 20D is, as best shown in an enlarged top plan view in FIGS. 3 and 4, made up of a strain generating member 21 and two or more, for example, two in the instance as shown, strain sensors 22 (22A and 22B) fitted to the strain generating member 21 for detecting a strain induced in the strain generating member 21. The strain generating member 21 is in the form of a thin plate member made of an elastically deformable metal such as, for example, a steel material and having a thickness not greater than 2 mm and represents a band shape of uniform width over the entire length thereof when viewed from top, with cutout portions 21b formed in each of the opposite side edge portions of such strain generating member 21. Each of the cutout portions 21b has a pair of corner areas rendered to represent an arcuately sectioned shape. Also, the strain generating member 21 has two or more, for example, three in the instance as shown, contact fixing segments 21a that are fixed to the outer diametric surface of the outer ring 1 in contact therewith through respective spacers 23 then intervening between the contact fixing segments 21a and the outer diametric surface of the outer ring 1. Those three contact fixing segments 21a are arranged in a row in a direction along the lengthwise direction of the strain generating member 21.

In other words, referring particularly to FIG. 4, one strain sensor 22A of the strain sensors is disposed between the left contact fixing segment 21a and the intermediate contact fixing segment 21a and the other strain sensor 22B of the strain sensors is disposed between the intermediate contact fixing segment 21a and the right contact fixing segment 21a. As shown in FIG. 3, the cutout portions 21b are defined at respective two positions each corresponding to a site where each of the strain sensors 22 are arranged. Accordingly, the strain sensors 22 detects lengthwise strains in the vicinity of the cutout portions 21b in the strain generating member 21. It is to be noted that the strain generating member 21 is preferably of a type incapable of plastically deforming even in a condition in which the maximum expected force is applied thereto as an external force acting on the outer ring, which is the stationary member, or a working force acting between a wheel tire and a road surface. Once the plastic deformation occurs, deformation of the outer ring 1 will not be transmitted to the sensor units 20A to 20D and, hence, the measurement of the strains will be adversely affected.

Each of the sensor units 20 is so arranged that the three contact fixing segments 21a of the corresponding strain generating member 21 assume the same position with respect to an axial direction of the outer ring 1 while held at respective positions spaced from each other in a direction circumferentially of the outer ring 1, with those contact fixing segments 21a secured to the outer peripheral surface of the outer ring 1 by means of associated bolts 24 that extend through the associated spacers 23 then intervening between the outer peripheral surface of the outer ring 1 and the contact fixing segments 21a. Each of the bolts 24 referred to above extends from a bolt insertion hole 25, defined in the respective contact fixing segment 21a so as to extend completely therethrough in a radial direction of the outer ring 1, and then through a bolt insertion hole 26, defined in the associated spacer 23, into a corresponding screw hole 27 defined in the outer peripheral portion of the outer ring 1. A washer 28 is interposed between a head portion of each of the bolts 24 and the strain generating member 21. With the contact fixing segments 21a fixed to the outer diametric surface of the outer ring 1 through the spacers 23 in this way, portions of the strain generating member 21 of a thin plate-like configuration, where the cutout portions 21b are formed, are in a condition separate from the outer diametric surface of the outer ring 1 and, accordingly, a strain induced deformation in the vicinity of the cutout portions 21b is facilitated. For enabling the sensor units 20A to 20D to be stably fixed onto the outer diametric surface of the outer ring 1, a flat area 1b is formed at a location of the outer diametric surface of the outer ring 1, where each of the spacers 23 is fixed to the outer diametric surface of the outer ring 1 in contact therewith.

Figure 5:
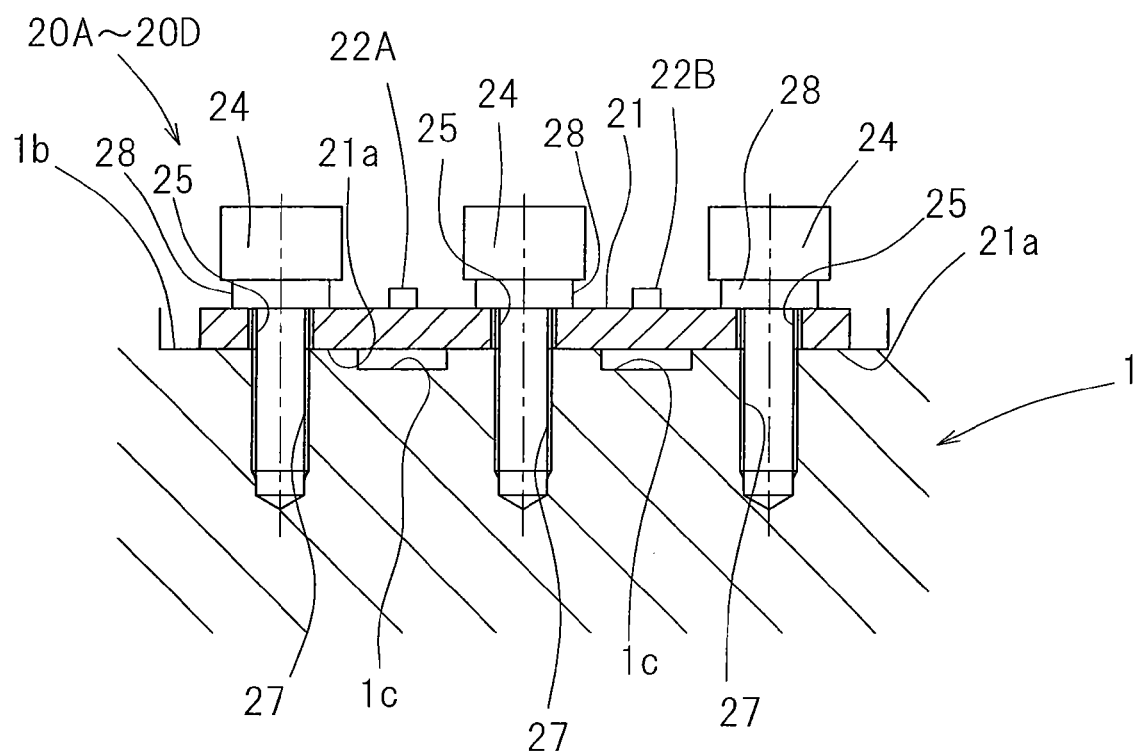
FIG. 5 is a sectional view showing another example of installation of the sensor unit.

Alternatively, as shown in an enlarged sectional view in FIG. 5, a groove 1c may be provided in the outer diametric surface of the outer ring 1 at each position intermediate between the three sites where the three contact fixing segments 21a of the strain generating member 21 are fixed to the outer diametric surface of the outer ring 1, so that the use of the spacers 23 can be eliminated, but those portion of the strain generating member 21, where the cutout portions 21b are positioned, can be separated from the outer diametric surface of the outer ring 1.

For each of the strain sensors 22, any of various types may be employed. For example, the respective strain sensor may be in the form of a metal foil strain gauge. In such case, fixture thereof to the strain generating member 21 is generally accomplished by means of bonding. Also, each of the strain sensors 22 can be in the form of a thick film resistance formed on the strain generating member 21.

The two strain sensors 22A and 22B in each of the sensor units 20A to 20D are connected with an estimation section 45 shown in FIG. 1. This estimation section 45 calculates and estimates a force F (for example, a vertically acting load Fz), which acts on the wheel support bearing assembly or between the vehicle wheel and the road surface (tire contact road surface), from respective sensor output signals from the sensor units 20A to 20D.

Hereinafter, one example of the load calculation and estimation performed by the estimation section 45 will be described. In general, the relationship between the load vector F, acting on the wheel support bearing assembly, and an output signal vector S of the plural strain sensors can be expressed by the following equation, provided that an offset component is excepted within a linear range:

$$F = M1 \times S \tag{1}$$

and from the relational equation (1) above, the load F can be estimated. It is to be noted that the parameter M1 in the equation (1) above represents a predetermined correction coefficient matrix.

In the estimation section 45, as a calculating process in the front stage thereof, the sum of and the difference between the respective output signals of the two strain sensors 22A and 22B in each of the sensor units 20A to 20D are calculated and the sum thereof is drawn as an average value A. Also, a variable component is drawn from the difference thereof to thereby determine the amplitude value B.

In the calculating process in the subsequent stage in the estimation section 45, as a first load estimating process, using an average value vector A, corresponding to the average value signal from the plural sensor units from which the offset component has been removed, the load F is calculated and estimated from the following linear equation, in which this variable is multiplied by a predetermined correction coefficient M1:

$$F = M1 \times A \tag{2}$$

Also, in the calculating process in the subsequent stage of the estimation section 45, as a second load estimating process, using the previously described average value vector A and the previously described amplitude value vector B as respective input variables, the load F is calculated and estimated from the following linear equation, in which those variables are multiplied by predetermined correction coefficients M2 and M3:

$$F = M2 \times A + M3 \times B \tag{3}$$

With the two variables employed in this way, the accuracy with which the load is estimated can be further increased.

A specific value of each of the correction coefficients employed in the various calculating equations referred to above is established by means of a series of experiments and/or simulations that are to be performed beforehand. The first load estimating process and the second load estimating process are carried out collaterally with each other. It is to be noted that in the equation (3) above, the average value A, which is a variable, may be eliminated. In other words, in the second load estimating process, the load F can be calculated and estimated using only the amplitude value B as a variable.

Figure 6A:
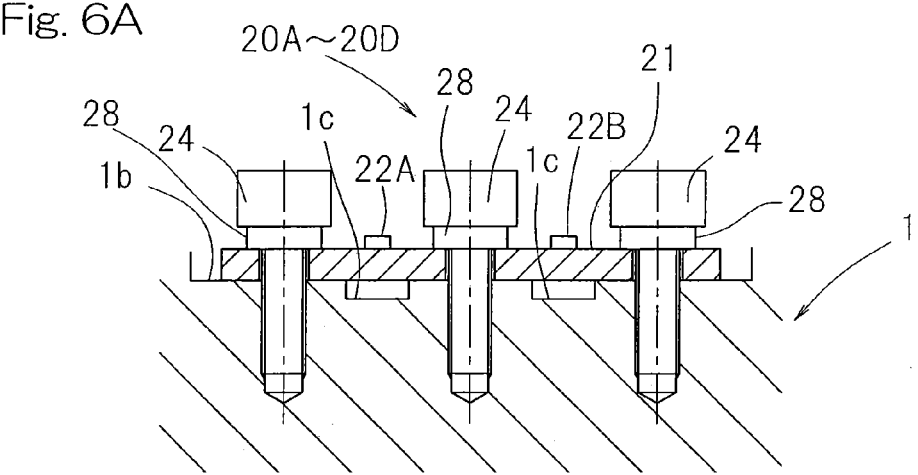
FIG. 6A is an explanatory diagram showing how influences brought about by rolling element positions affect on an output signal of the sensor unit.
Figure 6B:
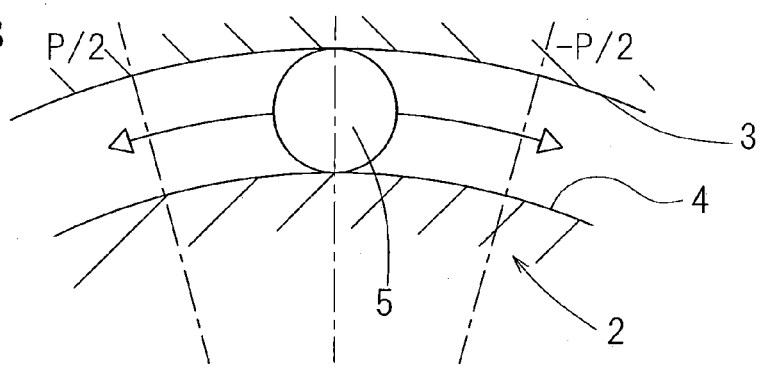
FIG. 6B is an explanatory diagram showing how influences brought about by rolling element positions affect on an output signal of the sensor unit.
Figure 6C:
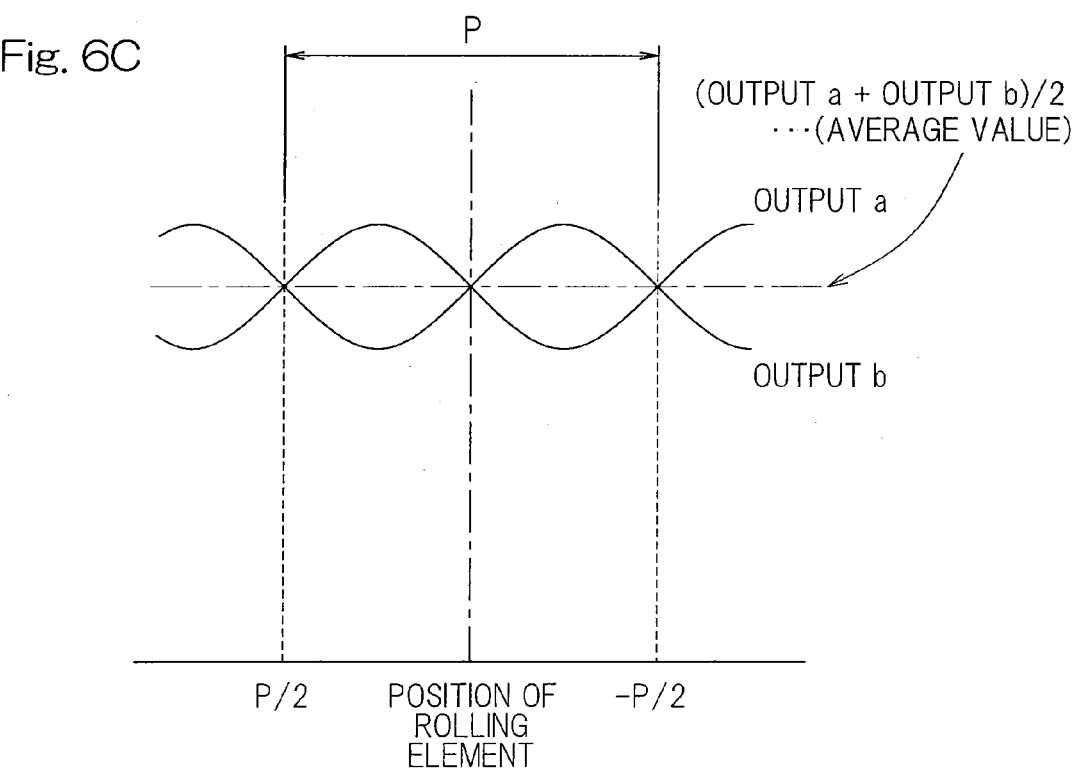
FIG. 6C is an explanatory diagram showing how influences brought about by rolling element positions affect on an output signal of the sensor unit.

Respective output signals a and b of the strain sensors 22A and 22B, shown in FIG. 6C, are affected by an influence of each of the rolling elements 5 successively passing in the vicinity of the site of installation of each of the sensor units 20 as shown in FIG. 6B. In other words, the influence of the rolling element 5 acts as the previously described offset component. Also, even at the halt of the bearing unit, the output signals a and b of those strain sensors 22A and 22B are affected by an influence of the position of each of the rolling elements 5. That is to say, when each of the rolling elements 5 moves past the position closest to the strain sensors 22A and 22B in the sensor unit 20 (or, when each of the rolling elements 5 is held at a position closest to the strain sensors 22A and 22B in the sensor unit 20), the respective output signals a and b of the strain sensors 22A and 22B attain the maximum value, and the respective output signals a and b of the strain sensors 22A and 22B decrease as each of the rolling element moves away from that position (or as each of the rolling elements 5 remains at a position away from that position) as shown in FIGS. 6A and 6B. During the rotation of the bearing unit, each of the rolling elements 5 successively moves past the periphery of the site of installation of the sensor unit 20 at intervals of a predetermined arrangement pitch P of the rolling elements 5 and, therefore, each of the respective output signals a and b of the strain sensors 22A and 22B represents a waveform similar to the sinusoidal waveform, in which as shown by the solid line in FIG. 6C the amplitude of each of the output signals a and b periodically changes at a cycle equal to the arrangement pitch P of the rolling elements 5.

In the instance now under discussion, the sum of the output signals a and b of the two strain sensors 22A and 22B is assumed to be the previously described average value A and as the previously described amplitude value B by determining the amplitude from the difference (absolute value) of the amplitudes. Accordingly, the average value A becomes a value from which a change component brought about by the passage of each of the rolling elements 5 has been cancelled. Also, the amplitude value is less sensitive to an influence of temperature and is therefore stable and, also, the detecting accuracy can be increased since the two signals are utilized.

As the sensor unit 20, in FIGS. 6A to 6C illustrating one example of construction shown in FIG. 5, of the circumferentially juxtaposed three contact fixing segments 21a on the outer diametric surface of the outer ring 1 which is the stationary member, the two contact fixing segments 21a positioned on opposite extremities of a circumferentially extending row of those contact fixing segments 21a are spaced a distance or interval that is equal to the arrangement pitch P of the rolling elements 5. In such case, the circumferential distance or interval between the two strain sensors 22A and 22B held at respective positions intermediate between the neighboring contact fixing segments 21a becomes about one half the arrangement pitch P of the rolling elements 5. As a result, the respective output signals a and b of those two strain sensors 22A and 22B have a phase difference of about 180° from each other and the average value A, which can be determined as the sum thereof, will be the one from which the component of change brought about by the passage of the rolling elements 5 has been cancelled. Also, the difference thereof is stable because it is insensitive to the influence of temperature, and, also, since the two signals are utilized, the detecting signal can be increased.

It is to be noted that in FIGS. 6A and 6B, the interval between the contact fixing segments 21a has been shown and described as equal to the arrangement pitch P of the rolling elements 5 and each of the sensors 22A and 22B has been shown and described as positioned at a respective position intermediate between the neighboring contact fixing segments 21a so that the interval between the two strain sensors 22A and 22B in the circumferential direction may be equal to about one half of the arrangement pitch P of the rolling element 5. However, separate therefrom, the interval between the two strain sensors 22A and 22B in the circumferential direction may be directly chosen to be equal to one half of the arrangement pitch P of the rolling elements 5. In such case, the interval between the two strain sensors 22A and 22B in the circumferential direction may be chosen to be a value equal to (1/2+n) times the arrangement pitch P of the rolling elements 5 or a value approximating to such value. Even in this case, the average value A, which is determined as the sum of the output signals a and b of the associated strain sensors 22A and 22B will represent a value from which the component of change brought about by the passage of the rolling elements 5 has been cancelled, and the amplitude value B that can be determined from the difference thereof is stable because it is insensitive to the influence of temperature, and, also, since the two signals are utilized, the detecting signal can be increased.

In the process that takes place in the subsequent stage of the estimation section 45, a selection and output process is carried out, in which the estimated load value, which can be determined through either of the previously described first and second load estimating processes, is selected in dependence also on a vehicle wheel rotating speed. More specifically, in the event that the vehicle wheel rotating speed is lower than a predetermined lower limit speed, the estimated load value resulting from the first load estimating process is selected and outputted. The predetermined lower limit speed referred to above may be chosen to be any arbitrarily chosen value, and is preferably chosen to be a value equal to or lower than the walking pace of a person (4 Km per hour). At the low speed rotation of the vehicle wheel, a processing time required to detect the amplitude of the sensor output signal tends to be prolonged and, at the time of halt, the detection of the amplitude itself becomes impossible. Accordingly, in the event that the vehicle wheel rotating speed is lower than the predetermined lower limit speed, the estimated load value resulting from the first load estimating process, in which only the average value A is utilized, is selected and outputted in the manner described above, so that a load signal detected can be outputted with no delay.

In the embodiment now under discussion, as shown in FIG. 2, the four sensor units 20A to 20D are disposed at the upper surface portion, the lower surface portion, the left surface portion and the right surface portion of the outer diametric surface of the outer ring 1 serving as the stationary member referred to previously, which portions correspond to the top and bottom and left and right positions relative to the wheel tire contact ground surface, and equidistantly spaced a phase difference of 90° relative to each other in the circumferential direction, and, therefore, the vertically acting load Fz acting on the wheel support bearing assembly, a load Fx, which correspond to a driving force or a braking force, and an axially acting load Fy can be estimated.

When the load acts between the vehicle wheel tire and the road surface, that load is also applied to the outer ring 1, which is the stationary member of the wheel support bearing assembly, accompanied by a deformation. In the instance as shown, since the two or more contact fixing segments 21a of the strain generating member 21 in each of the sensor units 20A to 20D are fixed to the outer ring 1 in contact therewith, the strain induced in the outer ring 1 is easy to be transmitted to the strain generating member 21 after having been amplified, and such strain can hence be detected by the strain sensors 22A and 22B with high sensitivity.

In particular, since the vehicle body fitting flange 1a has its front elevational shape which is of line symmetry with respect to the line segment perpendicular to the bearing axis or of a point symmetry about the bearing axis, the shape of the outer ring is simplified and the temperature distribution resulting from complication of the outer ring shape and variation of the expansion • contraction amount can be reduced. Thereby, the sensor units 20A to 20D can be allowed to detect the strain amount resulting from the load, while the influence brought about by the temperature distribution in the outer ring 1 and the variation of the expansion • contraction amount are sufficiently reduced. Also, since in addition to the simplification of the outer ring shape as described above, the sensor units 20A to 20D are provided at the arcuate sectioned area 1aa of the flange 1a, which is formed in the outer periphery of the outer ring 1 so as to extend from a base end of one side of the flange 1a, oriented towards the outboard side, towards the outer periphery of the outer ring 1 or an outer ring outer peripheral surface portion adjoining the arcuately sectioned portion 1aa on the outboard side, the strain induced at the sites of installation of the sensor units 20A to 20D will become large and, even when variation occurs in the temperature distribution of the outer ring 1 and the expansion • contraction amount, the influence thereof can be minimized to allow the sensor units 20A to 20D to detect the strain amount brought about by the load. Accordingly, the load imposed on the vehicle wheel can be accurately estimated by relieving the detection error resulting from the outer ring shape.

Figure 7:
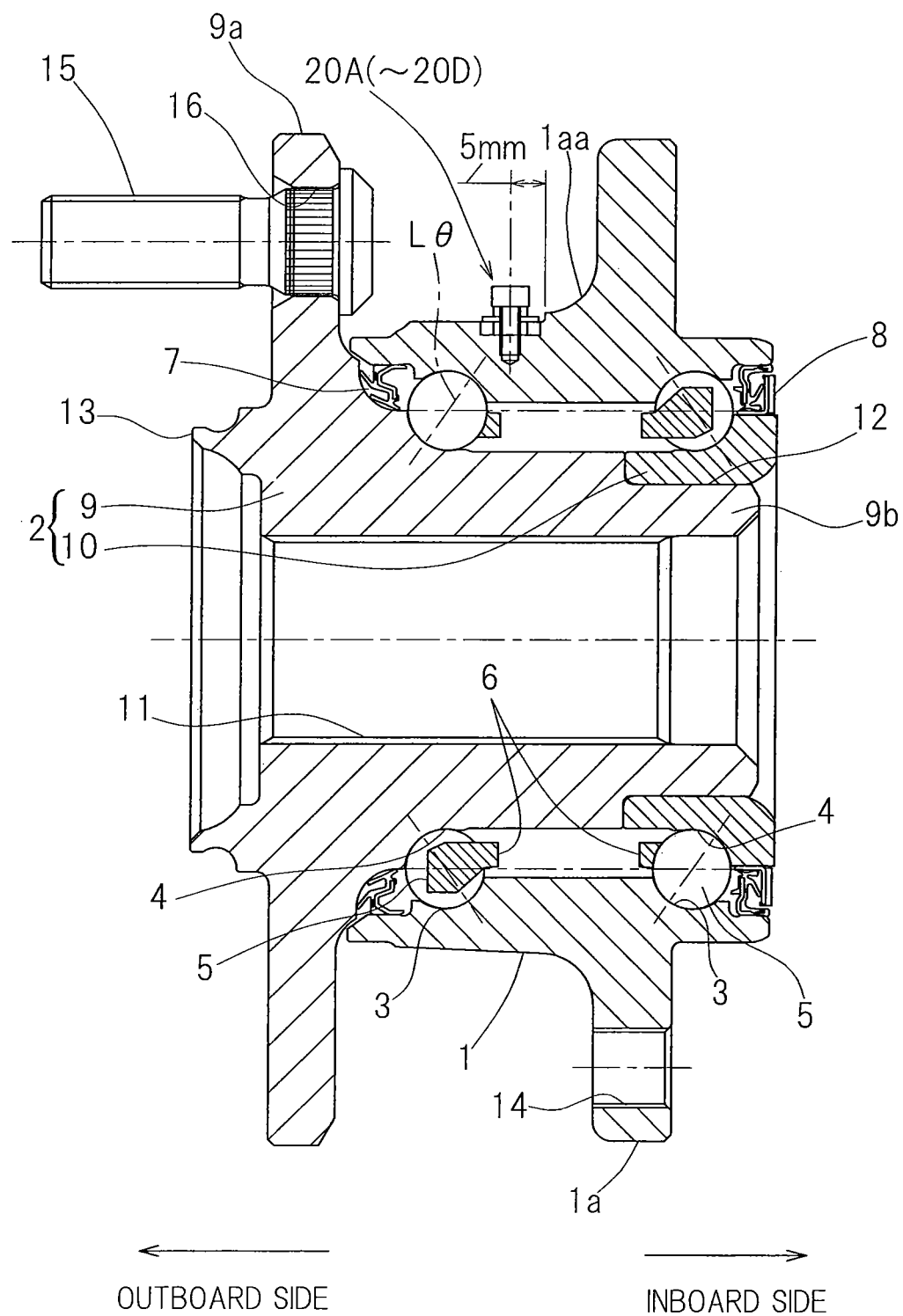
FIG. 7 is a longitudinal sectional view of the sensor equipped wheel support bearing assembly designed according to a second embodiment of the present invention.

In that case, as the outer ring outer peripheral surface portion adjoining the arcuately sectioned portion 1aa on the outboard side, which area 1aa is formed in the outer periphery of the outer ring 1 so as to extend from a base end of one side of the flange 1a oriented towards the outboard side to the outer periphery of the outer ring 1, the sensor units 20A to 20D may be provided at the outer ring outer peripheral surface portion within a region axially spaced within 5 mm from a terminating end of the articulately sectioned portion 1aa such as employed in the practice of a second embodiment shown in FIG. 7. When the sites of installation of the sensor units 20A to 20D are chosen within the range spaced within 5 mm in the axial direction from the terminating end of the articulately sectioned portion 1aa in the manner described above, even when variation occurs in the temperature distribution of the outer ring 1 and the expansion • contraction amount, the influence thereof can be minimized to allow the sensor units 20A to 20D to detect the strain amount brought about by the load.

Also, since in addition to the simplification of the outer ring shape as described above, the sensor units 20A to 20D are provided at respective positions crossing the line segment L θ, which extends through the center of each of the rolling elements of the outboard row in that direction required to form the rolling element contact angle, or respective positions adjacent to those crossing positions, the strain induced at the sites of installation of the sensor units 20A to 20D will become large and, even when variation occurs in the temperature distribution of the outer ring 1 and the expansion • contraction amount, the influence thereof can be minimized to allow the sensor units 20A to 20D to detect the strain amount brought about by the load. Accordingly, the load imposed on the vehicle wheel can be accurately estimated by relieving the detection error resulting from the outer ring shape.

Also, since the sensor units 20A to 20D are employed in a plural number (four, in the instance as shown) and those sensor units 20A to 20D are equidistantly provided in the circumferential direction of the outer periphery of the outer ring 1, the sensor units 20A to 20D can be disposed at respective portions, which are common in temperature distribution and expansion • contraction amount to each other, and the sensor units 20A to 20D can be allowed to detect the strain amount brought about by the load while the influence of the temperature distribution and the variation of the expansion • contraction amount are minimized. Accordingly, by relieving the detection error resulting from the outer ring shape, the load imposed on the vehicle wheel can be accurately estimated.

It is to be noted that in describing the embodiment referred to above, as the sites of installation of the sensor units 20A to 20D, a plurality of conditions, which the site of installation of each of the sensor units 20A to 20D, must satisfy have been shown and specified. However, in addition to the simplification of the outer ring shape, the site of installation of each of the sensor units 20A to 20D may satisfy at least one of the conditions for the installation of the sensor unit and, by so doing, the load acting on the vehicle wheel can be accurately estimated by relieving the detection error resulting from the outer ring shape. Also, in this embodiment, the use of the four sensor units 20A to 20D has been shown and described, but the number of the sensor unit 20 that may be employed may be only one.

Figure 8:
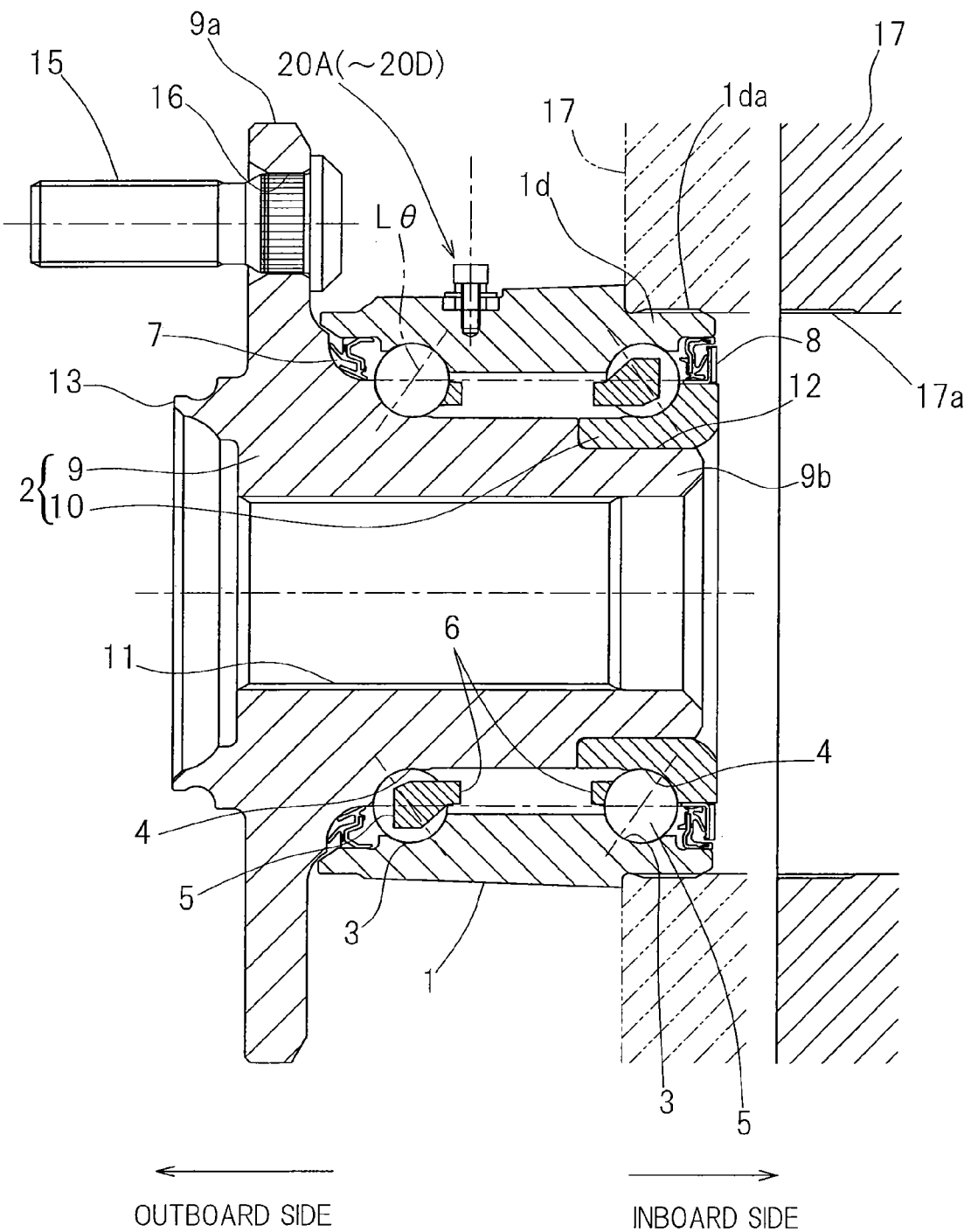
FIG. 8 is a longitudinal sectional view of the sensor equipped wheel support bearing assembly designed according to a third embodiment of the present invention.
Figure 9:
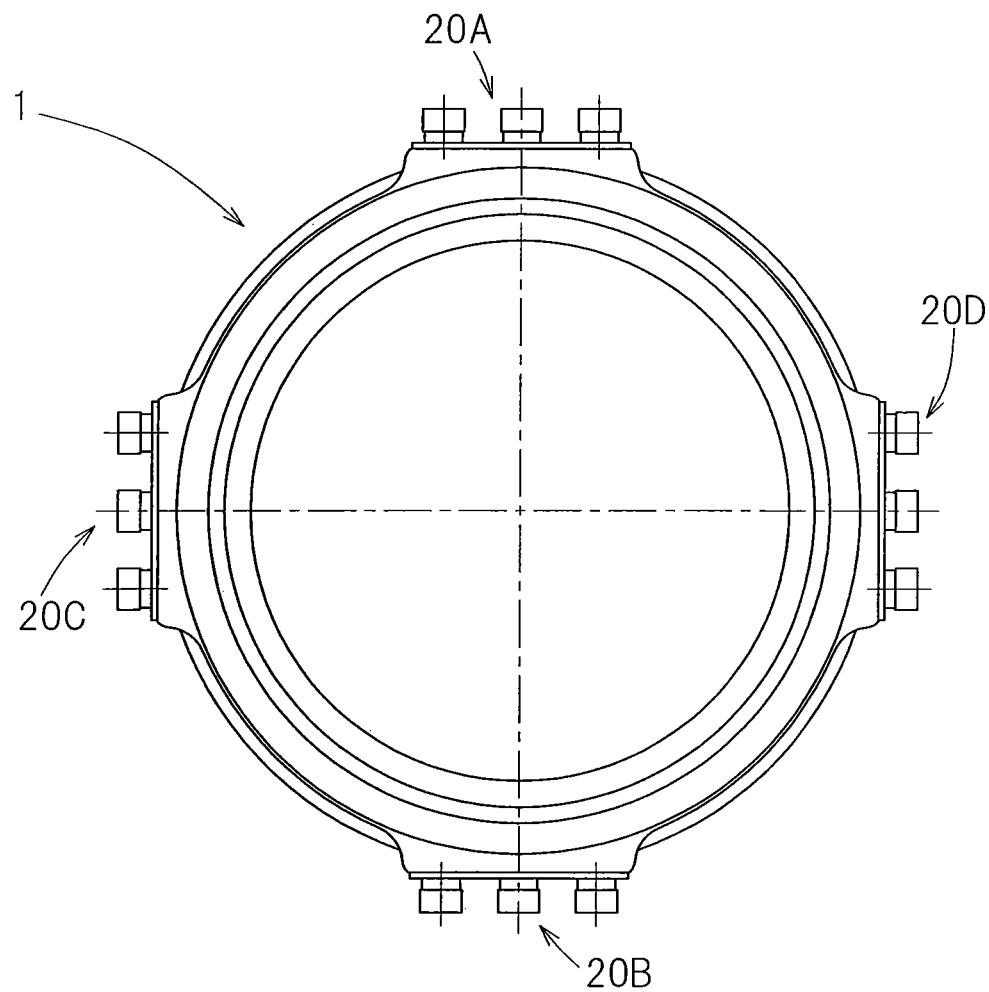
FIG. 9 is a front elevational view of the outer ring of the sensor equipped wheel support bearing assembly as viewed from the outboard side.

FIG. 8 illustrates a longitudinal sectional view of a third embodiment of the sensor equipped wheel support bearing assembly designed according to the present invention and FIG. 9 is a front elevational view showing the outer ring thereof as viewed from the outboard side. In this third embodiment, the vehicle body fitting flange 1a of the outer ring 1, which is employed in the practice of any of the previously described embodiments, is dispensed with and, instead thereof, the inboard end portion of the outer ring 1 is provided with a radially inwardly depressed portion 1d having an outer periphery formed with a male threaded area 1da for securement to the knuckle. With the male threaded area 1da in the radially inwardly depressed portion 1d threadingly engaged with a female threaded area 17a in an inner periphery of the knuckle 17, the outer ting 1 can be fixed to the knuckle 17. Other structural features than those described above are similar to those employed in any one of the previously described embodiments of the present invention.

That is to say, regarding the conditions that the site of installation of each of the sensor units 20A to 20D should satisfy, since no vehicle body fitting flange exist in the outer ring 1, the condition that each sensor unit 20A to 20D should be installed at the articulately sectioned portion 1aa or the outer ring outer peripheral surface portion adjoining the articulately sectioned portion 1aa on the outboard side does no longer exist, but the other conditions for installation remains the same as in any one of the previously described embodiments.

As hereinabove described, in this embodiment, since the use of the vehicle body fitting flange is dispensed with from the outer ring 1 and, instead thereof, the inboard end portion of the outer ring 1 is provided with the radially inwardly depressed portion 1d with the male threaded area 1da formed on the outer periphery thereof for securement to the knuckle, wherefore the outer ring 1 can be fixed to the knuckle 16 with the male threaded portion 1da threadingly engaged in the female threaded area 16a defined in the inner periphery of the knuckle 16, the outer ring shape can be simplified and the temperature distribution, brought about by the complication of the outer ring shape, and variation of the expansion • contraction amount can be reduced. Accordingly, the sensor units 20A to 20D can be allowed to detect the strain amount brought about by the load while the temperature distribution in the outer ring and the influence brought about by the variation of the expansion • contraction are sufficiently reduced. Also, since in addition to the simplification of the outer ring shape, the sensor units 20A to 20D are provided at the respective positions crossing the line segment L θ, which extends through the center of each of the rolling elements of the outboard row in that direction required to form the rolling element contact angle, or respective positions adjacent to those crossing positions, the strain induced at the sites of installation of the sensor units 20A to 20D will become large and, even when variation occurs in the temperature distribution of the outer ring 1 and the expansion • contraction amount, the influence thereof can be minimized to allow the sensor units 20A to 20D to detect the strain amount brought about by the load. Accordingly, the load imposed on the vehicle wheel can be accurately estimated by relieving the detection error resulting from the outer ring shape.

Also, since the sensor units 20A to 20D are employed in a plural number (four, in the instance as shown) and those sensor units 20A to 20D are equidistantly provided in the circumferential direction of the outer periphery of the outer ring 1, the sensor units 20A to 20D can be disposed at respective portions, which are common in temperature distribution and expansion • contraction amount to each other, and the sensor units 20A to 20D can be allowed to detect the strain amount brought about by the load while the influence of the temperature distribution and the variation of the expansion • contraction amount are minimized. Accordingly, with the detection error resulting from the outer ring shape having been relieved, the load imposed on the vehicle wheel can be accurately estimated.

A fourth embodiment of the present invention will now be described with particular reference to FIG. 10 to FIGS. 20A to 20C. It is to be noted that in those figures, component parts similar to those shown in and described with reference to FIG. 1 to FIG. 6A to FIG. 6C in connection with the previously described first embodiment of the present invention are designated by like references and, therefore, the details thereof are not reiterated for the sake of brevity. In this fourth embodiment, the plurality of the sensor units 20A to 20D are enclosed with a protective shroud 29 for enclosing the outer periphery of the outer ring 1 and this aspect of the feature differentiates the fourth embodiment from the previously described first embodiment.

FIG. 11 corresponds to FIG. 2 pertaining to the previously described first embodiment and is a front elevational view showing the outer ring 1 of the wheel support bearing assembly according to the fourth embodiment as viewed from the outboard side. Component parts similar to those shown in FIG. 2 are designated by like reference numeral and, therefore, the details thereof are not reiterated for the sake of brevity. As compared with FIG. 2, FIG. 11 differs from FIG. 2 in respect of the use of a signal drawing portion 32B as will be described later.

Figure 14:
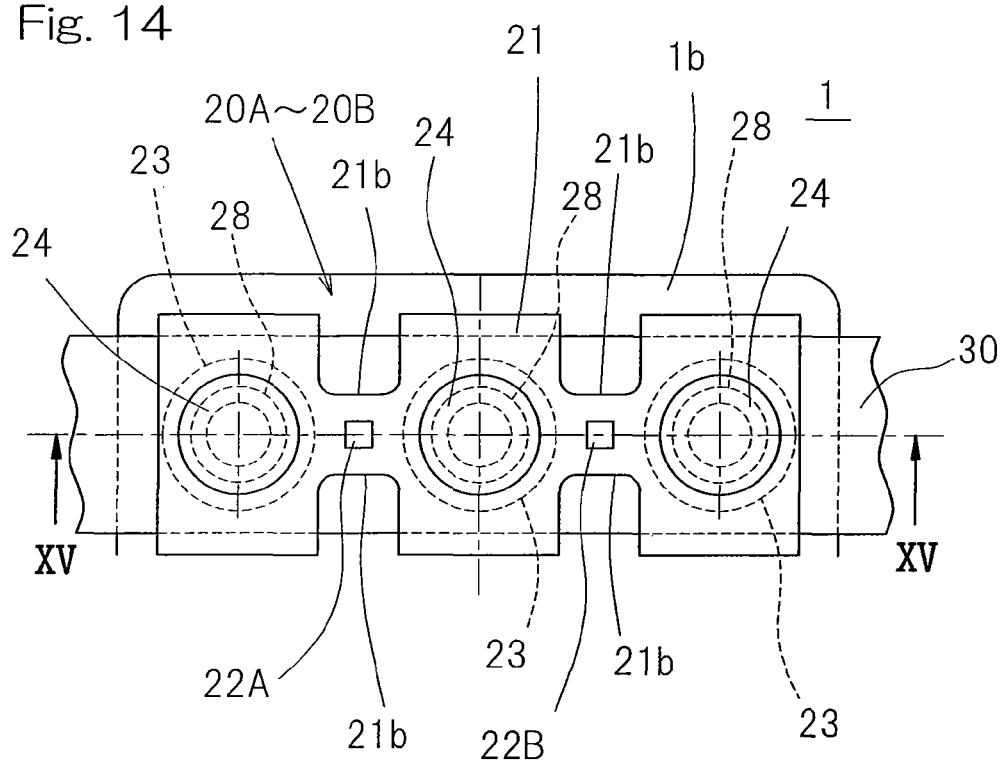
FIG. 14 is an enlarged top plan view of the sensor unit employed in the sensor equipped wheel support bearing assembly.
Figure 15:
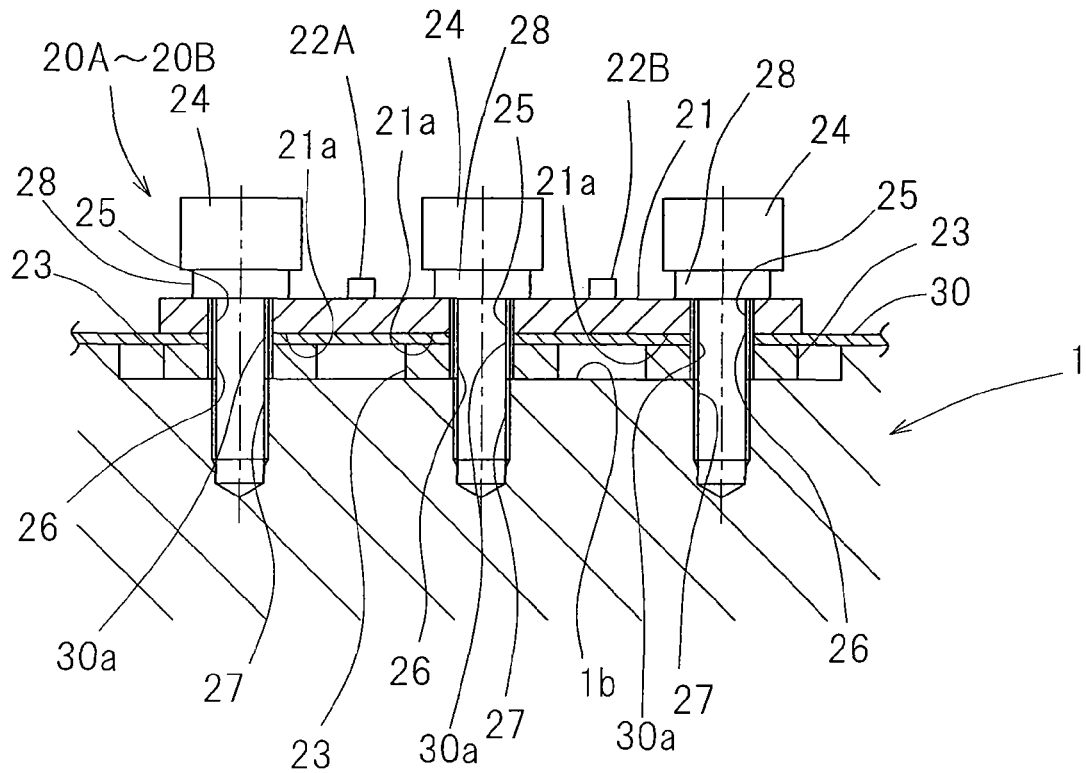
FIG. 15 is a cross sectional view taken along the line XV-XV in FIG. 14.

FIGS. 14 and 15 correspond respectively to FIGS. 3 and 4 pertaining to the previously described first embodiment and component parts similar to those shown in FIGS. 3 and 4 are designated by like reference numeral and, therefore, the details thereof are not reiterated for the sake of brevity. However, each of the sensor units 20A to 20D shown in FIGS. 14 and 15 differs from that shown in FIGS. 3 and 4 in respect of the use of a flexible substrate 30 on a rear surface side of the strain generating member 21 as will be detailed later.

Each of the sensor units 20A to 20D is so arranged that the three contact fixing segments 21a of the corresponding strain generating member 21 assume the same position with respect to the axial direction of the outer ring 1, which is an outer member, while those three contact fixing segments 21a are held at respective positions spaced from each other in a direction circumferentially of the outer ring 1, with those contact fixing segments 21a being secured to the outer peripheral surface of the outer ring 1 through the flexible substrate 30 and spacers 23 by means of associated bolts 24. The flexible substrate 30 is a single plate-like substrate to be arranged in a ring form along the outer peripheral surface of the outer member 1. In other words, the four sensor units 20A to 20D are mounted on the single flexible substrate 30 and are in turn fixed to the outer peripheral surface of the outer ring 1 together with the flexible substrate 30. Each of the bolts 24 is inserted into the corresponding bolt insertion hole 25 defined in each of the contact fixing segments 21a so as to extend in the radial direction and then through a corresponding bolt insertion hole 30a, defined in the flexible substrate 30, and a similarly corresponding bolt insertion hole 26 defined in the respective spacer 23 and is in turn firmly threaded into the screw hole 27 defined in the outer peripheral portion of the outer ring 1. With the sensor units 20A to 20D fitted to the flexible substrate 30 in the manner described above, the fitting of the sensor unit 20A to 20D can be facilitated.

The four sensor units 20A to 20D referred to above are connected in a ring form with electronic component parts, including, inter alia, a signal processing IC 31 and a signal cable 32 (best shown in FIGS. 16A, 16B) for drawing the processed output signal to the outside of the bearing unit to thereby form a sensor assembly 33, and the sensor assembly 33 rendered to be in the ring form is in turn fitted to the outer peripheral surface of the outer ring 1 in coaxial relation therewith. Since at this time the flexible substrate 30 is arranged in a ring form so as to extend along the outer peripheral surface of the outer ring 1, polyimide is a preferred base material therefor. Where polyimide is chosen to be the base material for the flexible substrate 30, the flexible substrate 30 can have a sufficient flexibility and a heat resistance and it is easy to make the flexible substrate 30 extend in the circumferential direction of the outer ring 1.

FIGS. 16A and 16B illustrate one example of arrangement of the electronic component parts in the sensor assembly 33 in a developed plan view and a sectional view, respectively. In this example of arrangement, the signal processing IC 31 and a wiring portion 32A of the signal cable 32 are fitted directly to the flexible substrate 30 together with the four sensor units 20A to 20D. The sensor units 20A to 20D are fitted to a rear surface (a surface confronting the outer peripheral surface of the outer ring 1) of the flexible substrate 30 and the signal processing IC 31 is fitted to a front surface of the flexible substrate 30. By fitting the sensor units 20A to 20D, the signal processing IC 31 and the signal cable 32 to the flexible substrate 30 in the manner described above, by forming a pattern of a wiring circuit on the flexible substrate 30, connection among the sensor units 20A to 20D, the signal processing IC 31 and the signal cable 32 can be facilitated.

Also, a wiring circuit 34 connecting among each of the sensor units 20A to 20D, the signal processing IC 31 and the signal cable wiring portion 32A is printed on the flexible substrate 30 as a circuit pattern. The sensor units 20A to 20D and the signal processing IC 31 are connected with the wiring circuit 34 by means of, for example, soldering and the signal drawing portion 32B for drawing the signal cable 32 towards the vehicle body side is connected with the signal cable wiring portion 32A by means of, for example, soldering. The sensor units 20A to 20D are such that respective surfaces of the strain generating members 21 opposite to the surfaces thereof, which are in contact with the outer ring 1, are rendered to be circuit printed surfaces and those circuit printed surfaces are fitted to the flexible substrate 30 so as to confront a printed surfaces of the wiring circuit 34 of the flexible substrate 30. In the instance as shown, portions of the flexible substrate 30, which correspond to opposite side portions of the sensor units 20A to 20D in a site of installation of the sensor units 20 are formed with band-shaped openings 30b extending in a lengthwise direction of the flexible substrate 30. Accordingly, cohesive surfaces of the sensor units 20A to 20D with the outer ring 1 becomes flat surface where neither circuit printed surface nor soldering is present, and the sensor units 20A to 20D can be cohesively fitted to the outer ring 1.

The signal processing IC 31 may serve as an estimation section for estimating, in reference to the respective output signals of the strain sensors 22A and 22B, a force (a vertically acting load Fz, a load Fx due to become a driving force or a braking force, an axially acting load Fy) acting on the wheel support bearing assembly or between the vehicle wheel and the road surface (tire contact ground surface), and may include a signal processing circuit for performing a processing of the strain signal and a correcting circuit. This signal processing IC 31 has a relation setting segment (not shown), in which relations between the previously described force and the respective output signals of the strain sensors 22A and 22B are set in, for example, calculating equations or tables, and outputs a working force from the output signals of the sensor units 20A to 20D with the utilization of the relation setting segment. Contents of the relation setting segment are determined and set beforehand by means of a series of experiments and/or simulations.

One example of load estimation in the signal processing IC 31 will now be described in detail. In the signal processing IC 31, as a process in the front stage, the sum of the output signals of the two strain sensors 22A and 22B of the sensor units 20A to 20D are calculated and is subsequently drawn as an average value A. Also, by calculating the difference between the respective output signals of the two strain sensors 22A and 22B and then drawing a component of change, the amplitude value B is determined.

As the process in the subsequent stage, the signal processing IC 31 makes use of the average value A and the amplitude value B, both referred to above, to calculate and estimate the load F acting on the wheel support bearing assembly in the following manner. In the description that follows, since the load estimation in the signal processing IC 31 is basically similar to that performed by the previously described estimation section 45, the details thereof are not reiterated for the sake of brevity.

Figure 20A:
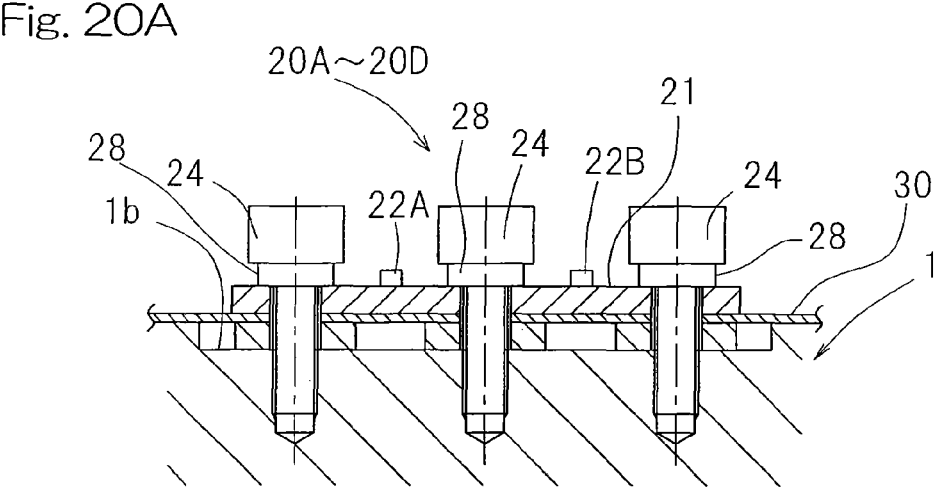
FIG. 20A is an explanatory diagram showing how the influences brought about by the rolling element positions affect on the output signal of the sensor unit.
Figure 20B:
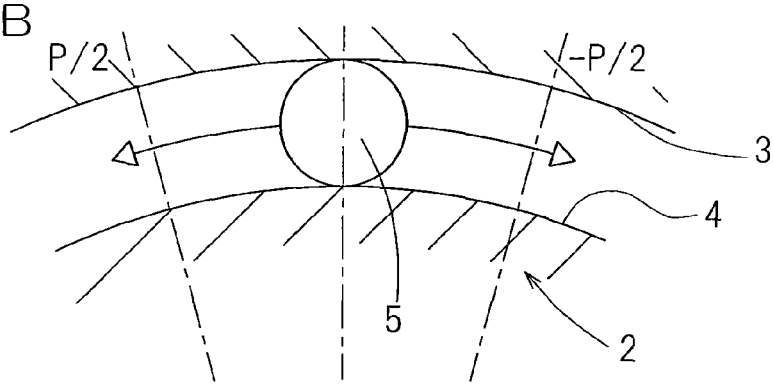
FIG. 20B is an explanatory diagram showing how the influences brought about by the rolling element positions affect on the output signal of the sensor unit.
Figure 20C:
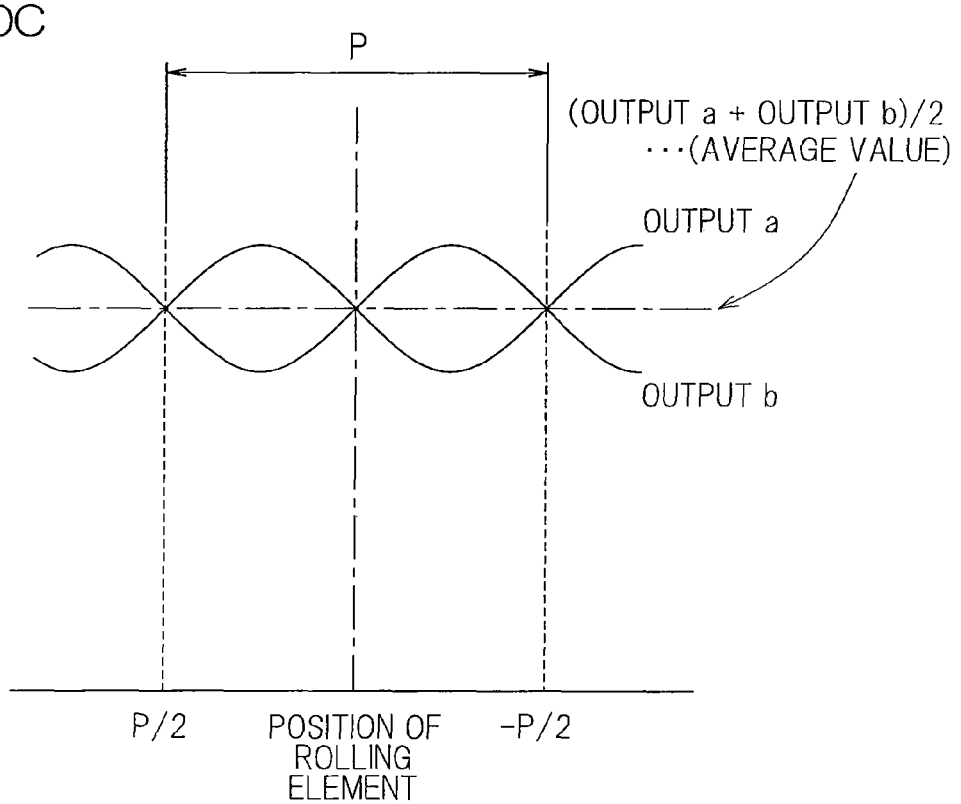
FIG. 20C is an explanatory diagram showing how the influences brought about by the rolling element positions affect on the output signal of the sensor unit.

For the description concerning the influence brought about by the rolling elements 5 on the output signals of the sensor units 20A to 20D in FIGS. 20A to 20C, the description made with reference to FIGS. 6A to 6C in connection with the previously described first embodiment of the present invention equally applied with no change and, therefore, the details thereof are not reiterated for the sake of brevity. It is, however, to be noted that the difference between FIGS. 20A to 20C and FIGS. 6A to 6C lies only in the use of the flexible substrate 30 is employed as shown in FIG. 20A against FIG. 6A. The sensor units are fitted to the flexible substrate, and the sensor assembly formed by connecting the electronic component parts, which includes the sensor units 20A to 20D, the signal processing IC for processing the respective output signals of the sensor units 20A to 20D and the signal cable for drawing the processed output signals to the outside of the bearing unit, in the ring form is fitted to the outer peripheral surface of the outer ring in a fashion coaxial with the outer ring, and the electronic component parts inclusive of the sensor units 20A to 20D, and this sensor assembly may be enclosed with the protective shroud. In the case of this construction, the sensor assembly, in which the electronic component parts inclusive of the sensor units 20A to 20D are connected in the ring form, can be covered with the protective shroud 29.

The estimated load value determined by the signal processing IC 31 in accordance with the first and second load estimating processes is outputted by switching and selecting in dependence on the vehicle wheel rotating speed. More specifically, in the event that the vehicle wheel rotating speed is lower than a predetermined lower limit speed, the estimated load value resulting from the first load estimating process is selected and outputted. The predetermined lower limit speed referred to above may be chosen to be any arbitrarily chosen value, but is preferably chosen to be a value equal to or lower than the walking pace of a person (4 Km per hour). At the low speed rotation of the vehicle wheel, a processing time required to detect the amplitude of the sensor output signal tends to be prolonged and, at the time of halt, the detection of the amplitude itself becomes impossible. Accordingly, in the event that the vehicle wheel rotating speed is lower than the predetermined lower limit speed, the estimated load value resulting from the first load estimating process, in which only the average value A is utilized, is selected and outputted in the manner described above, so that a load signal detected can be outputted with no delay.

In the embodiment now under discussion, as shown in FIG. 11, the four sensor units 20A to 20D are disposed at the upper surface portion, the lower surface portion, the left surface portion and the right surface portion of the outer diametric surface of the outer ring 1, which portions correspond to the top and bottom and left and right positions relative to the wheel tire contact ground surface, and equidistantly spaced a phase difference of 90° relative to each other in the circumferential direction. Therefore, the vertically acting load Fz acting on the wheel support bearing assembly, the load Fx, which will become a driving force or a braking force, and the axially acting load Fy can be estimated.

The sensor assembly 33 fitted to the outer peripheral surface of the outer ring 1 is covered with the protective shroud 29 in a manner as best shown in FIG. 10. The protective shroud 29 is a tubular member enclosing the outer periphery of the outer member 1 and has an outboard end portion mounted on or fitted to the outer peripheral surface of the outer ring 1. An inboard end portion of the protective shroud 29, opposite to the outboard end portion thereof, is provided with a lip member 35 made of an annular elastic member and extending along an open edge thereof, which lip member 35 is held in contact with an outboard oriented side face of the vehicle body fitting flange 1a of the outer ring 1. Accordingly, tight seal is made between the outboard and inboard end portions of the protective shroud and the outer peripheral surface. The lip member 35 may be held in contact with the outer peripheral surface of the flange 1a referred to above.

Figure 12:
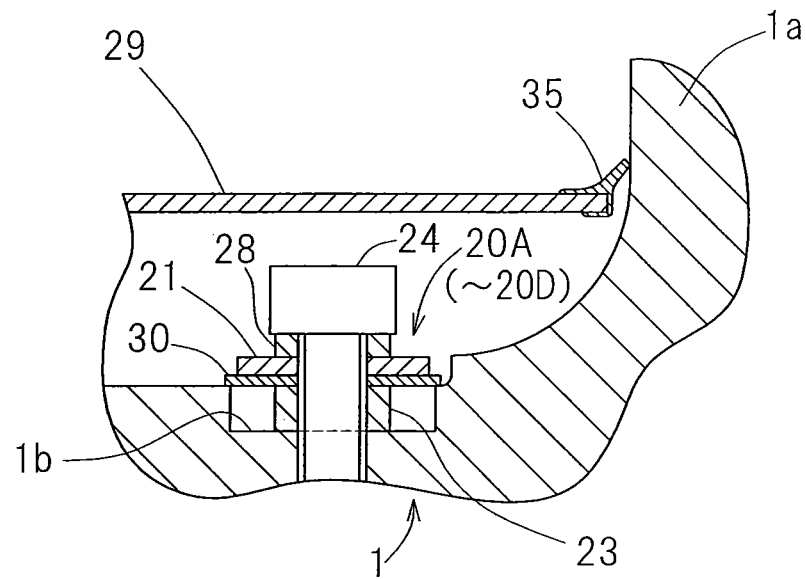
FIG. 12 is a fragmentary enlarged sectional view of a portion of FIG. 10.

The elastic material forming the lip member 35 is preferably employed in the form of a rubber material. By so choosing, the sealability between the lip member 35 and the inboard end portion of the protective shroud 29 can be secured. Other than that, the lip member 35 may be formed integrally with the protective shroud 29. In the instance as shown, however, as best shown in FIG. 12 in an enlarged sectional representation, the lip member 35 is of a shape flaring outwardly towards the inboard end portion thereof. Accordingly, an undesirable ingress of, for example, muddy water or saline water from the inboard end portion of the protective shroud 29 into inside of the protective shroud 29 can be assuredly avoided.

The protective shroud 29 is shaped from, for example, a steel plate, having a corrosion resistance, by means of a press work. Accordingly, the protective shroud 29 can be prevented from corroding under the influence of an external environment. Other than that, the protective shroud 29 may be shaped from the steel plate by means of a press work with a metal plating or a painting process applied to its surface. Even in this case, an undesirable corrosion of the protective shroud 29 under the influence of the external environment can be avoided. Material for the protective shroud 29 may be, other than the steel material, plastics or rubber.

Figure 13:
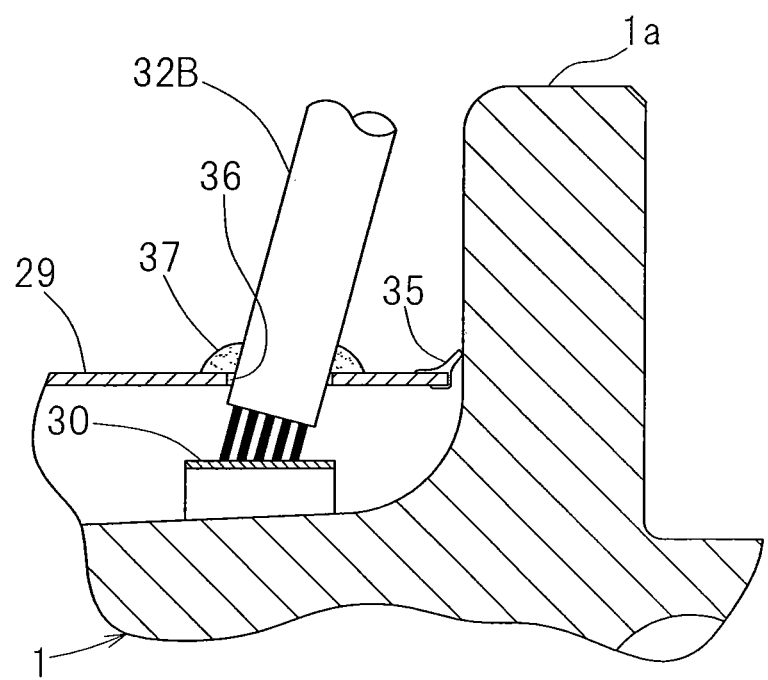
FIG. 13 is a cross sectional view taken along the line XIII-XIII in FIG. 11.

As illustrated in FIG. 13 showing a cross sectional view taken along the line XIII-XIII in FIG. 11, the inboard end portion of the protective shroud 29 is provided with a draw hole 36 through which the signal cable drawing portion 32B of the signal cable 32 in the sensor assembly 33 is drawn outwardly, and a sealing material 37 is applied around the portion of the signal cable drawing portion 32B which extends through the draw hole 36. Accordingly, it is possible to assuredly secure the sealability of that portion of the signal cable drawing portion 32B that is drawn outwardly from the protective shroud 29.

FIGS. 17A and 17B illustrate another example of arrangement of the electronic component parts in the sensor assembly 33, that is enclosed with the protective shroud 29, in a developed plan view and a sectional view, respectively. Even in this example of arrangement of the electronic component parts, all of the sensor units 20A to 20D, the signal processing IC 31 and the signal cable wiring portion 32A are mounted on the flexible substrate 30. In this example of arrangement, at the site of arrangement of the sensor unit 20 on the flexible substrate 30, a rectangular opening 30c, through which a substantially entire body of the sensor unit 20 is exposed, is formed. By forming the rectangular openings 30c, through which substantially entire bodies of the sensor units 20A to 20D are exposed, at the sites of installation of the sensor units 20A to 20B on the flexible substrate 30, it is possible to avoid the possibility that the deformation of the strain generating members 21 in the sensor units 20A to 20D may be regulated by the flexible substrate 30, and, therefore, the detecting accuracy of the load can be correspondingly increased. Other structural features than those described above are similar to those in the example of arrangement shown in FIGS. 16A and 16B.

FIGS. 18A and 18B illustrate a further example of arrangement of the electronic component parts in the sensor assembly 33, that is enclosed with the protective shroud 29, in a developed plan view and a sectional view, respectively. In this example of arrangement of the electronic component parts, the sensor units 20A to 20D, except for respective portions thereof that are connected with the wiring circuit 34 on the flexible substrate 30, are separated from the flexible substrate 30. Also, a portion of the flexible substrate 30, on which the signal processing IC 31 is fitted, is made to have a large width portion, leaving the remaining portion of the flexible substrate 30 representing a narrow width portion on which the sensor units 20A to 20D are arranged, thereby avoiding an increase of the width of the entire structure so arranged. Accordingly, the sensor assembly 33 can be constructed compactly. Other structural features than those described above are similar to those in the example of arrangement shown in FIGS. 16A and 16B.

FIGS. 19A and 19B illustrate a still further example of arrangement of the electronic component parts in the sensor assembly 33, that is enclosed with the protective shroud 29, in a developed plan view and a sectional view, respectively. Even in this example of arrangement of the electronic components, as is the case with the example of arrangement shown in and described with reference to FIGS. 18A and 18B, the sensor units 20A to 20D, except for respective portions thereof that are connected with the wiring circuit 34 on the flexible substrate 30, are separated from the flexible substrate 30. However, in this example of arrangement, the flexible substrate 30 is in the form of a band shape having a uniform width over the entire length thereof, and the sensor units 20A and 20D are arranged at one side portion of such flexible substrate 30 along the flexible substrate 30. Other structural features than those described above are similar to those in the example of arrangement shown in FIGS. 16A and 16B.

Assemblage of the sensor equipped wheel support bearing assembly is performed in the following sequence. At the outset, while the outer ring 1 is in a condition of a simple body or the rolling elements 5 have been assembled onto the outer ring 1, the sensor assembly 33 comprised of the electronic component parts including the sensor units 20A to 20D is fitted to the outer peripheral surface of the outer ring 1. Then, the tubular protective shroud 29 is press fitted from the outboard side of the outer ring 1 onto the outer peripheral surface of the outer ring 1 with the outboard end thereof mounted on the outer peripheral surface of the outer ring 1 and the lip member 35 at the inboard end of the protective shroud 29 is brought into contact with the outboard side face of the vehicle body fitting flange 1a of the outer ring 1 or the outer peripheral surface thereof, thereby allow sensor assembly 33, made up of the electronic component parts inclusive of the sensor units 20A to 20D, to be enclosed with the protective shroud 29. Thereafter, the entirety of the bearing unit is assembled. By so assembling in the manner described above, the sensor equipped wheel support bearing assembly, including the sensor units 20A to 20D are fitted to the outer ring 1 or the sensor assembly 33 including the sensor units 20A to 20D is enclosed with the protective shroud 29, can be easily assembled.

The load detecting operation performed by the sensor equipped wheel support bearing assembly of the construction described above is basically similar to that afforded by the sensor equipped wheel support bearing assembly designed according to the previously described first embodiment and, therefore, the details thereof are not reiterated for the sake of brevity. However, since in the case of the embodiment now under discussion, in particular, the plural sensor units 20A to 20D are enclosed with the tubular protective shroud 29 for enclosing the outer periphery of the outer member 1, which is the stationary member, the outboard end of this protective shroud 29 is mounted on the outer peripheral surface of the outer ring 1, and the lip member 35 made of the annular elastic element and provided along the open edge of the inboard end portion of the protective shroud 29 is held in contact with the outboard side face of the vehicle body fitting flange 1a of the outer ring 1 or the outer peripheral surface thereof, not only can any undesirable trouble (damages caused by bounced gravel stones and/or corrosion caused by a muddy water or a saline water) be avoided from occurring in some or all of the sensor units 20A to 20D under the influence of the external environment, but the load can also be detected accurately over a prolonged period of time and, therefore, assemblage of the sensor units 20A to 20D and wiring of the signal cable 32 can be accomplished easily and at a reduced cost.

In the description made hereinabove, reference has been made to the detection of the working force developed between the vehicle wheel tire and the road surface, but not only the working force developed between the vehicle wheel tire and the road surface, but also the force acting on the wheel support bearing assembly (for example, a preload amount) may be detected. If the detected load obtained from this sensor equipped wheel support bearing assembly is used in a vehicle control, contribution can be made to a stabilized travel of the automotive vehicle. Also, when this sensor equipped wheel support bearing assembly is used, the load sensor can be compactly installed in the automotive vehicle, the mass productivity can be made excellent, and the cost reduction can be accomplished.

Also, since in this embodiment, the electronic component parts including the sensor units 20A to 20D, the signal processing IC 31 for processing the respective output signals of the sensor units 20A to 20D and the signal cable 32 for drawing the processed output signals to the outside of the wheel support bearing assembly are connected in the ring form to complete the sensor assembly 33 and since this sensor assembly 33 is fitted on the outer peripheral surface of the outer member 1, which is the stationary member, in a fashion coaxial with the outer ring 1 and is covered with the protective shroud 29, not only the sensor units 20A to 20D, but also the remaining electronic component parts such as, for example, the signal processing IC 31 forming the sensor assembly 33 and the signal cable 32 can be protected from any trouble which will be caused by the effect of the external environment.

Figure 21:
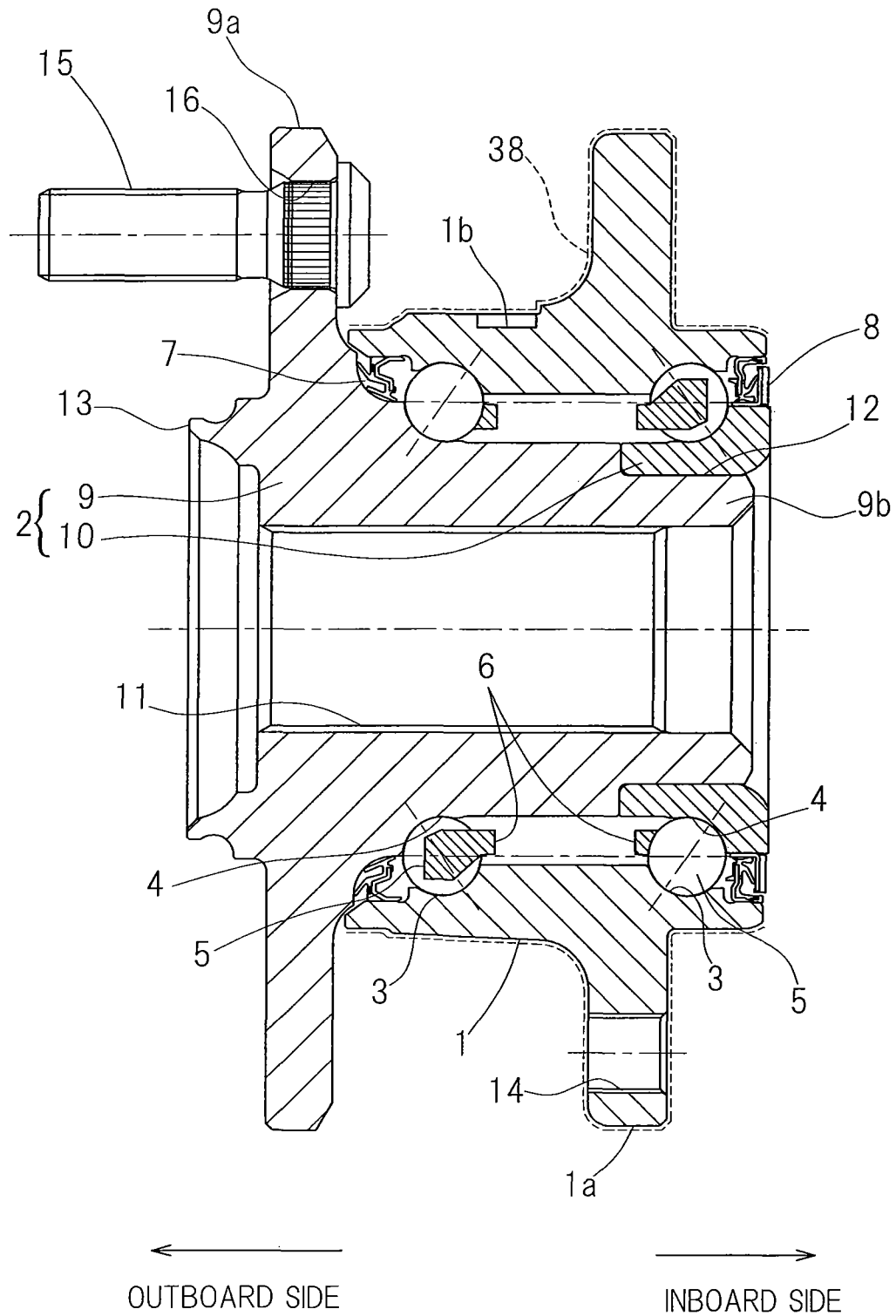
FIG. 21 is a longitudinal sectional view of the sensor equipped wheel support bearing assembly designed according to a fifth embodiment of the present invention.

FIG. 21 illustrates a fifth embodiment of the present invention. The sensor equipped wheel support bearing assembly designed according to this fifth embodiment is similar to that designed according to the fourth embodiment and shown in and described with particular reference to FIG. 10 to FIGS. 20A to 20C, but differs therefrom in that at least a portion of the outer peripheral surface of the outer ring 1 to which the sensor units 20A to 20D are fitted, which portion is in contact with at least the sensor units 20A to 20D, is formed with a surface treated layer 38 having a corrosion resistance or an anticorrosive property. However, in the instance as shown, the surface treated layer 38 is formed over the entire region of the outer peripheral surface of the outer ring 1, but the surface treated layer 38 may be formed on only an area of the outer peripheral surface on the outboard side of the vehicle body fitting flange 1a.

Examples of the surface treated layer 38 having the corrosion resistance or the anticorrosive property include, for example, a plated layer formed by means of a metal plating treatment, a painted film formed by a painting technique and a coated layer formed by a coating technique. In the practice of the metal plating technique, any plating process such as, for example, zinc plating, uni-chromium plating, chromate plating, nickel plating, chromium plating, electroless nickel plating, Kanigen plating (electroless plating), ferric tetroxide film (black oxide finish) may be employed. In the practice of the painting technique, any electrodeposition coating such as, for example, cation electrodeposition coating, anion electrodeposition coating or fluorine-based electrodeposition coating may be employed. In the practice of the coating technique, any coating process such as, for example, ceramic coating of, for example, silicon nitride may be employed.

As hereinabove described, by forming the surface treated layer 38 of a kind having a corrosion resistance or an anticorrosive property on at least the sensor units 20A to 20D contact portions of the outer peripheral surface of the outer ring 1, which is the stationary member, a buildup of the sites of installation of the sensor units 20A to 20D, which may be caused by rusting occurring in the outer peripheral surface of the outer ring 1, and an undesirable development of a adopted rusting in some or all of the sensor units 20A to 20D can be avoided, an erroneous operation of some or all of the strain sensors 22A and 22B, which may result from the rusting, can be eliminated, and the load detection can be carried out accurately for a prolonged period of time. Also, where the outer peripheral surface of the outer member 1, where the sensor assembly 33 inclusive of the sensor units 20A to 20D is fitted, is formed with the previously described surface treated layer 38, an undesirable buildup of the sites of installation of the sensor assembly 33 caused by the rusting can be avoided and an erroneous operation of the strain sensors 22A and 22B caused by the rusting can be further eliminated.

Also, where formation of the surface treated layer 38 is limited to only that portion of the outer peripheral surface of the outer ring 1 on the outboard side of the vehicle body fitting flange 1a, a surface untreated portion on a portion of the outer peripheral surface of the outer ring on the inboard end portion can be held during the grinding of the rolling surfaces of the outer ring 1 and, therefore, the rolling surfaces 3 can be ground highly accurately.

Figure 22:
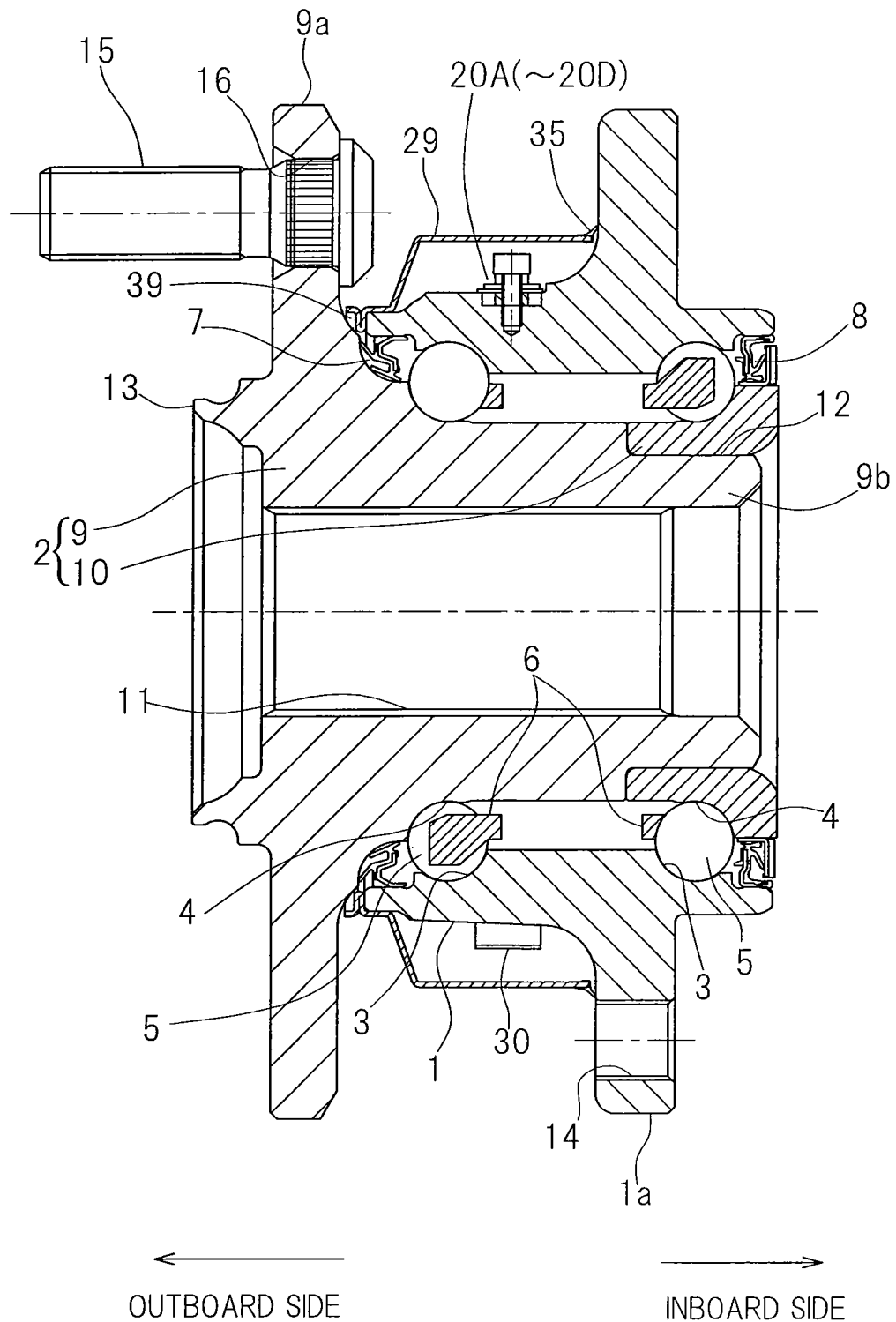
FIG. 22 is a longitudinal sectional view of the sensor equipped wheel support bearing assembly designed according to a sixth embodiment of the present invention.
Figure 23:
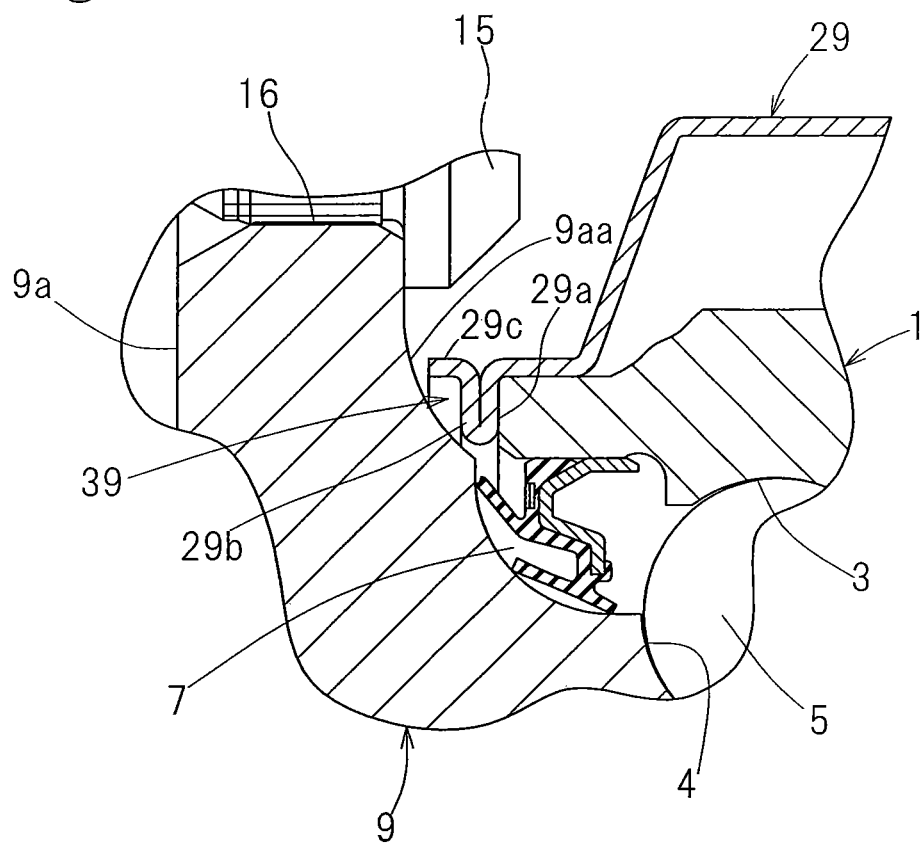
FIG. 23 is a fragmentary enlarged sectional view of the sensor equipped wheel support bearing assembly.

FIGS. 22 and 23 illustrate a sixth embodiment of the present invention. The sensor equipped wheel support bearing assembly designed according to the sixth embodiment is similar to that designed according to the fourth embodiment shown in and described with reference to FIG. 10 to FIGS. 20A to 20C, but differs therefrom in that the outboard end of the protective shroud 29 is exposed towards the outboard side of the outer ring 1 and a non-contact gap 39 that forms a labyrinth seal is formed between such outboard end and the inner member 2 which is the rotating member. More particularly, in the instance as shown, as best shown in FIG. 23 in an enlarged sectional representation, the outboard end of the protective shroud 29 is formed with an inwardly bent portion 29a, which is radially inwardly bent so as to extend along the outboard end of the outer ring 1, is then radially outwardly bent from a tip of the inwardly bent portion 29a to form an outwardly bent portion 29b that overlap the inwardly bent portion 29a, and is further formed with a tubular portion 29c that extends from a tip of the outwardly bent portion 29b towards a curved portion 9aa at a base portion of the hub flange 9a of the inner member 2. Accordingly, between a portion, ranging from the outwardly bent portion 29b to the tubular portion 29c, and the curved portion 9aa at the base portion of the hub flange 9a, a non-contact sealing gap 39 of a narrow width is formed. Other structural features than those described above are similar to those employed in the practice of the fourth embodiment shown in and described with reference to FIG. 10 to FIGS. 20A to 20C.

When as hereinabove described, the non-contact sealing gap 39 is formed between the outboard end of the protective shroud 29 and the inner member 2, the sealability of the protective shroud 29 at the outboard end is increased to enable any trouble in the sensor, which would be caused by the influence of the external environment, to be assuredly avoided and, therefore, the load detection can be performed accurately.

Figure 24:
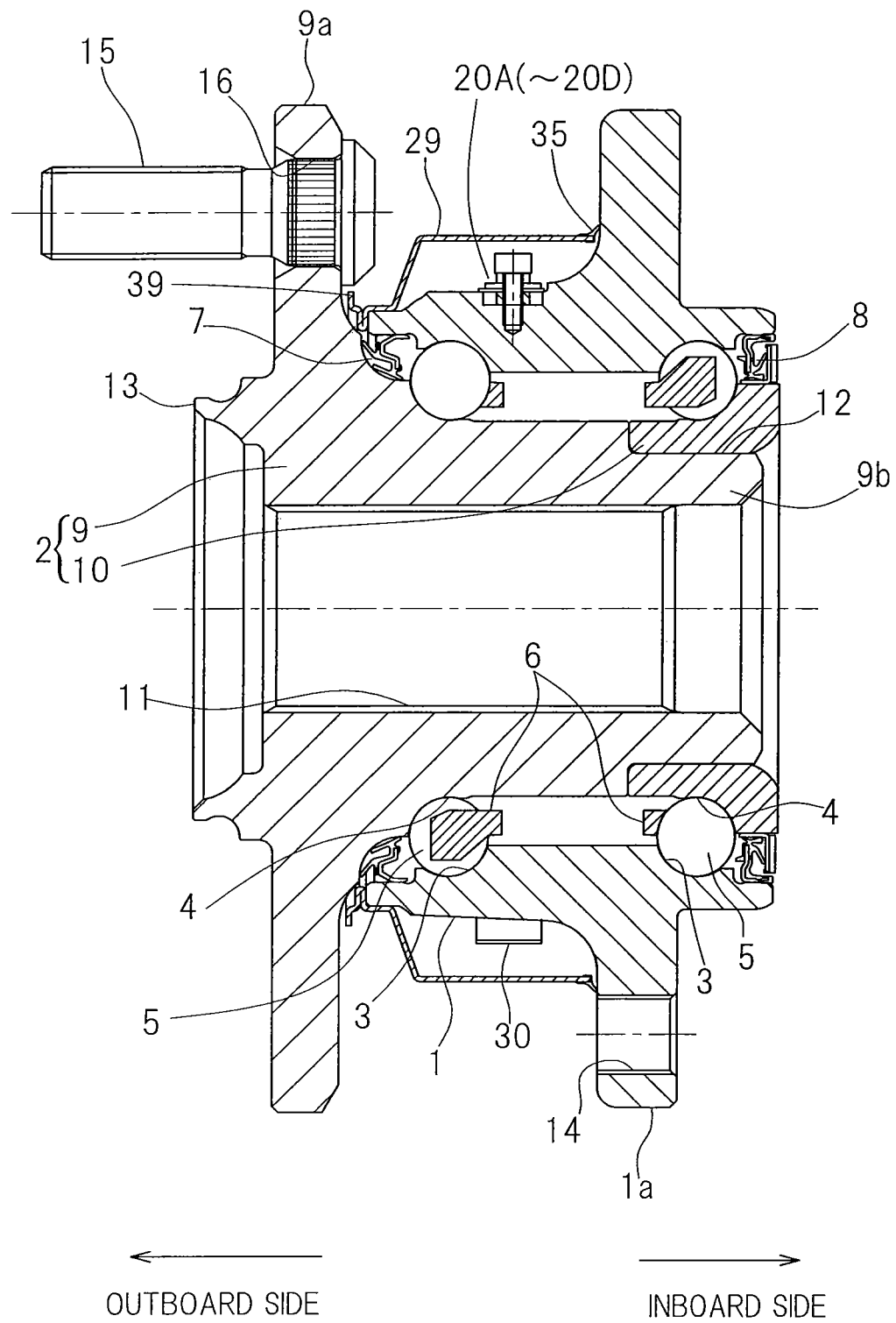
FIG. 24 is a longitudinal sectional view of the sensor equipped wheel support bearing assembly designed according to a seventh embodiment of the present invention.
Figure 25:
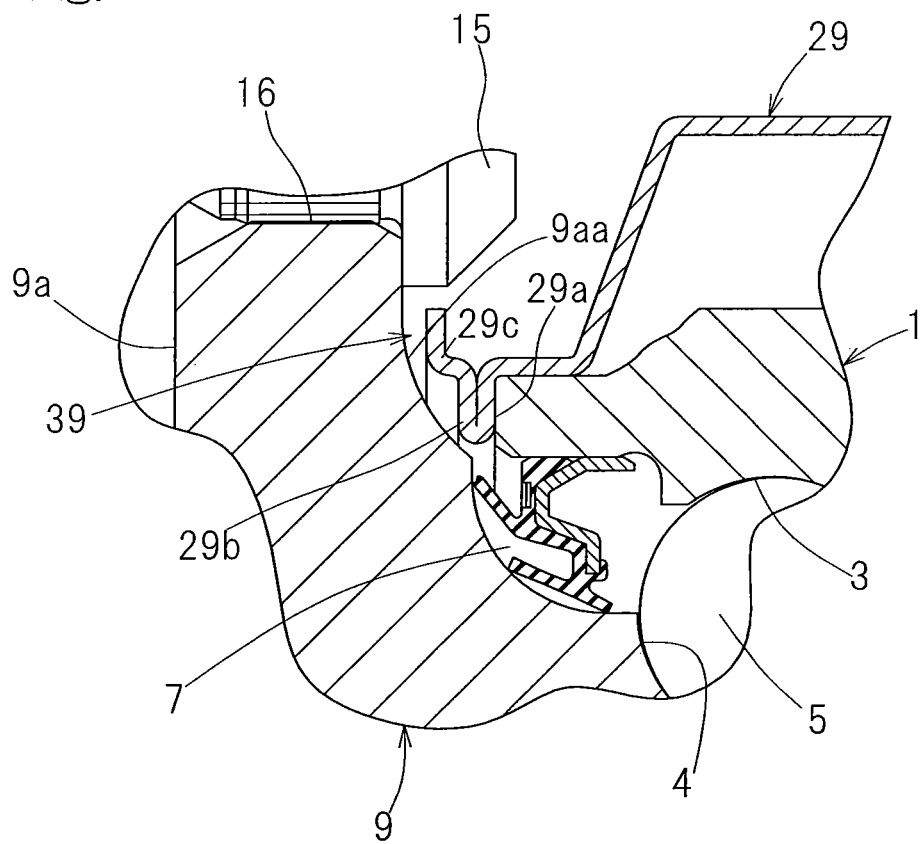
FIG. 25 is a fragmentary enlarged sectional view of the sensor equipped wheel support bearing assembly.

FIGS. 24 and 25 illustrate a seventh embodiment of the present invention. The sensor equipped wheel support bearing assembly designed according to the seventh embodiment is similar to the sensor equipped wheel support bearing assembly according to the sixth embodiment shown in and described with reference to FIGS. 22 and 23, but differs therefrom in that a tubular portion 29c at the tip of the outwardly bent portion 29b at the outboard end of the protective shroud 29 is formed so as to represent an L-sectioned shape extending along a side face of the hub flange 9a as best shown in FIG. 25 in an enlarged sectional representation. Other structural features than those described above are similar to those employed in the practice of the sixth embodiment shown in and described with reference to FIGS. 22 and 23.

When as described hereinabove the tubular portion 29c at the tip of the outwardly bent portion 29b at the outboard end of the protective shroud 29 is formed in the L-sectioned shape so as to extend along the side face of the hub flange 9a, a non-contact sealing gap 39 formed between a portion, ranging from the outwardly bent portion 29b to the tubular portion 29c, and the base portion curved portion 9aa of the hub flange 9a represents such a shape as to extend along the side face of the hub flange 9a. Accordingly, at the outboard side of the protective shroud 29, flow of an intruding muddy water or the like is facilitated from the noon-contact sealing gap 39, extending along the side face of the hub flange 9a, towards the outside and, hence, the sealability of the protective shroud 29 at the outboard end is further increased.

Figure 26:
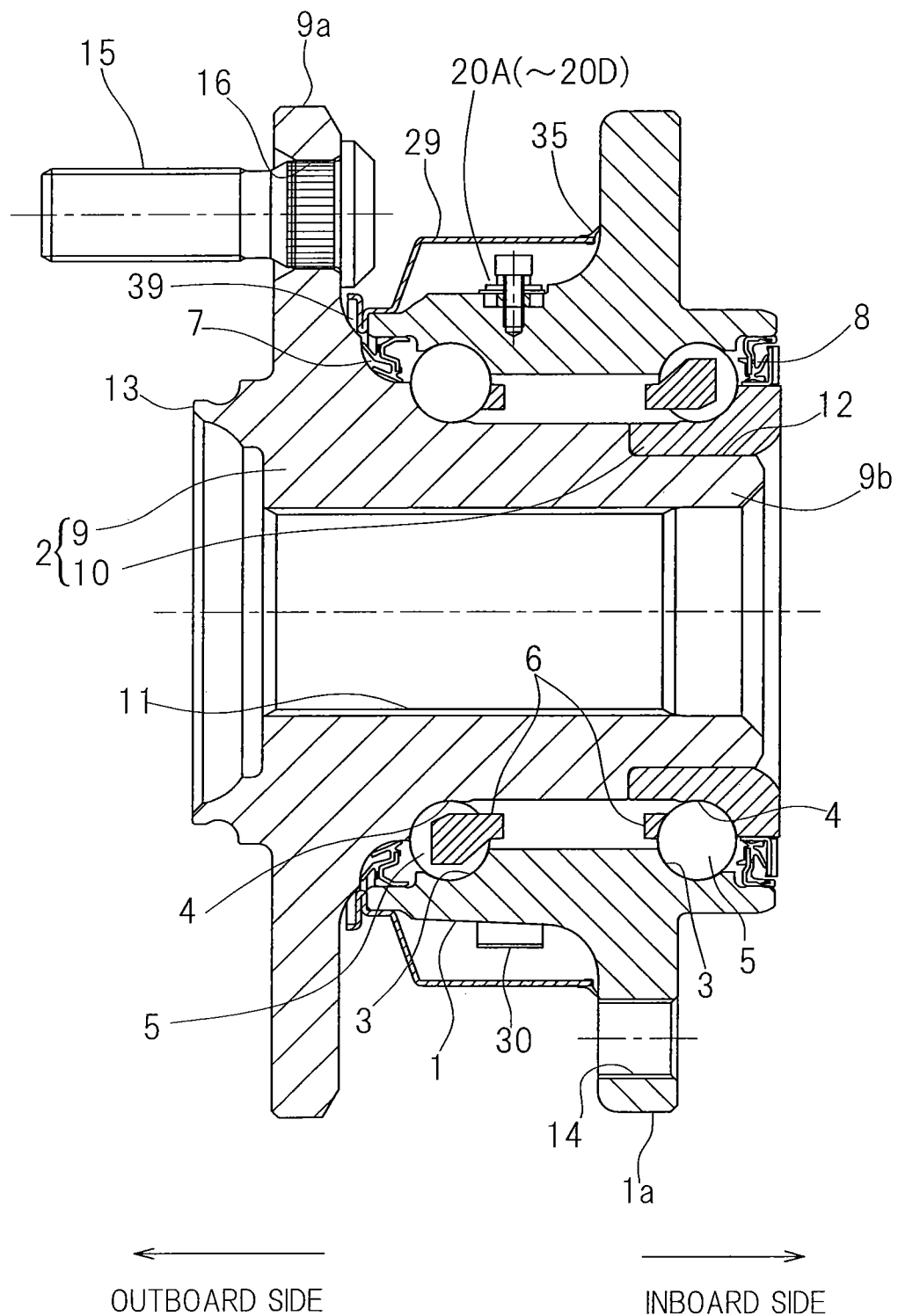
FIG. 26 is a longitudinal sectional view of the sensor equipped wheel support bearing assembly designed according to an eighth embodiment of the present invention.
Figure 27:
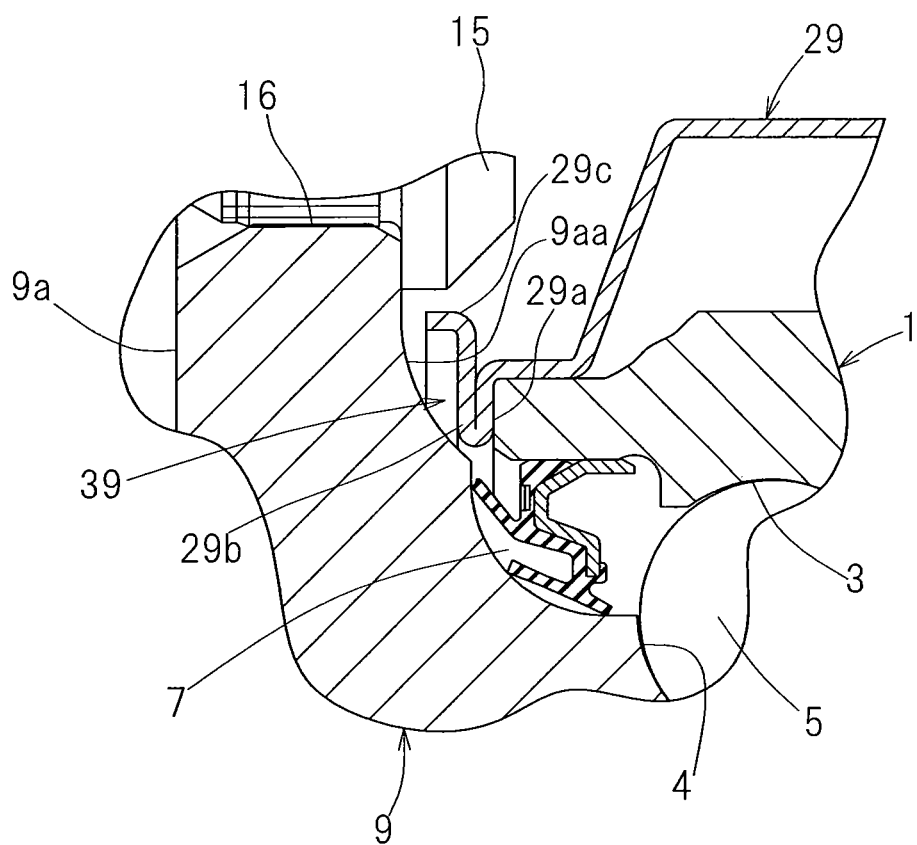
FIG. 27 is a fragmentary enlarged sectional view of the sensor equipped wheel support bearing assembly.

FIGS. 26 and 27 illustrate an eighth embodiment of the present invention. The sensor equipped wheel support bearing assembly designed according to this eighth embodiment is similar to the sensor equipped wheel support bearing assembly according to the sixth embodiment shown in and described with reference to FIGS. 22 and 23, but differs therefrom in that the outwardly bent portion 29b at the outboard end of the protective shroud 29 is further extended towards an outer diametric side beyond an outer diametric side base end of the inwardly bent portion 29a as best shown in FIG. 27 in an enlarged sectional representation. Other structural features than those described above are similar to those employed in the sixth embodiment shown in and described with reference to FIGS. 22 and 23.

When as hereinabove described the outwardly bent portion 29b at the outboard end of the protective shroud 29 is further extended towards the outer diametric side beyond the outer diametric side base end of the inwardly bent portion 29a, the radial distance of the non-contact sealing gap 39, formed between that portion, ranging from the outwardly bent portion 29b to the tubular portion 29c, and the hub flange 9a is increased. Accordingly, the sealability of the protective shroud 29 at the outboard end is further increased.

Figure 28:
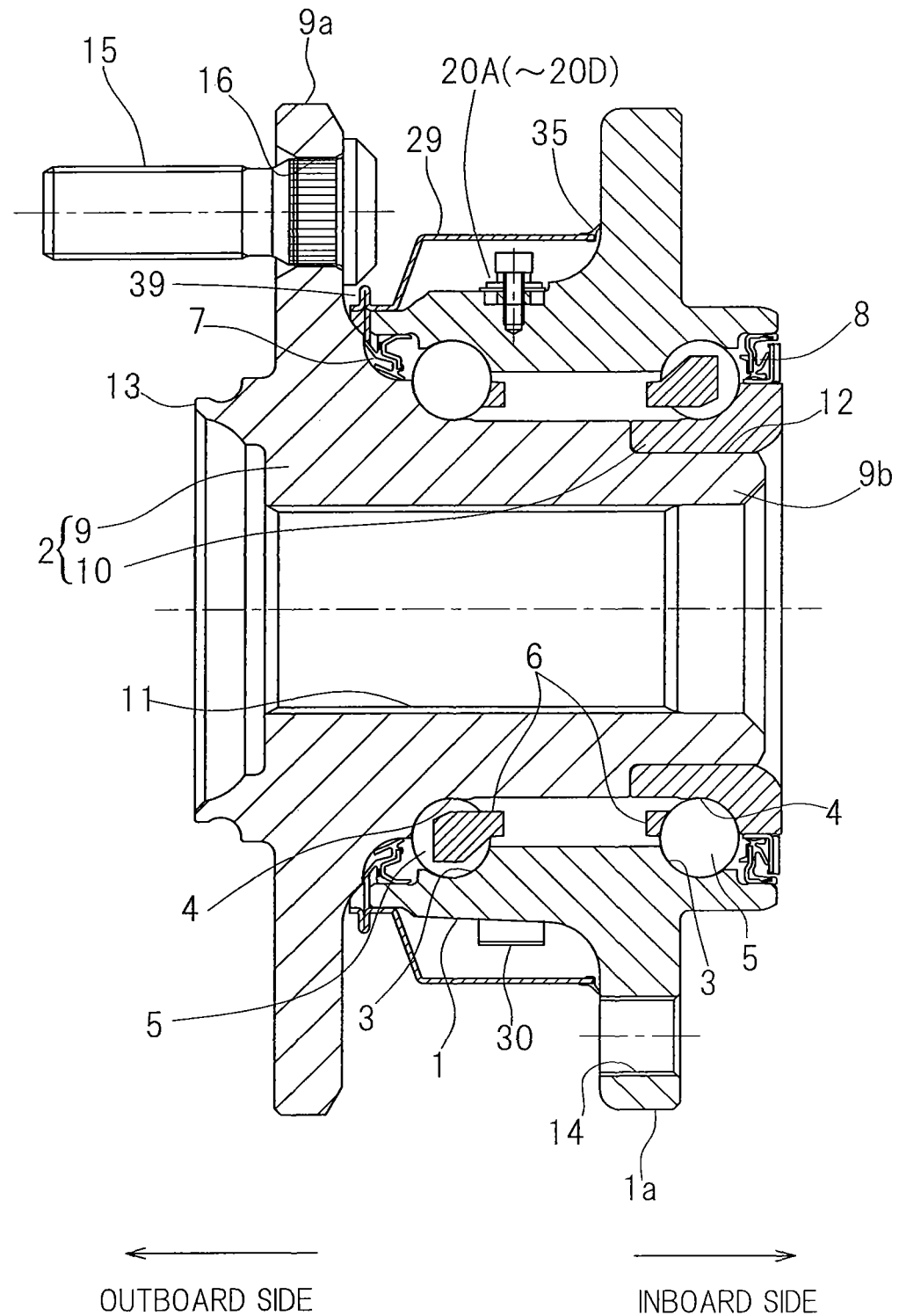
FIG. 28 is a longitudinal sectional view of the sensor equipped wheel support bearing assembly designed according to a ninth embodiment of the present invention.
Figure 29:
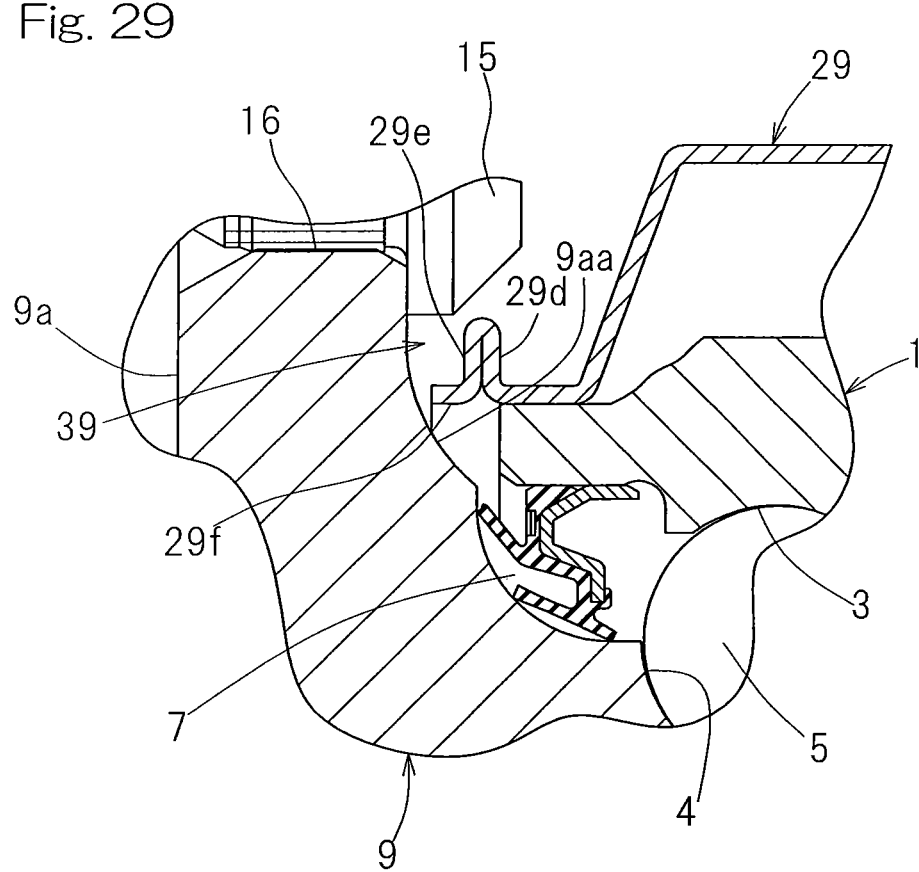
FIG. 29 is a fragmentary enlarged sectional view of the sensor equipped wheel support bearing assembly.
Figure 32:
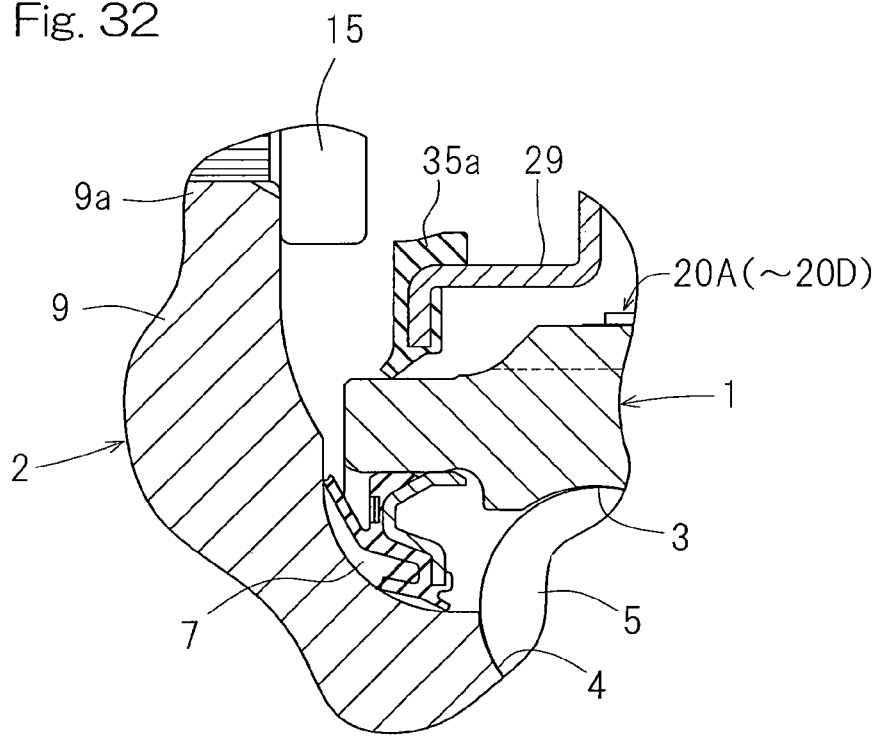
FIG. 32 is a fragmentary enlarged view of a portion of FIG. 30.
Figure 33:
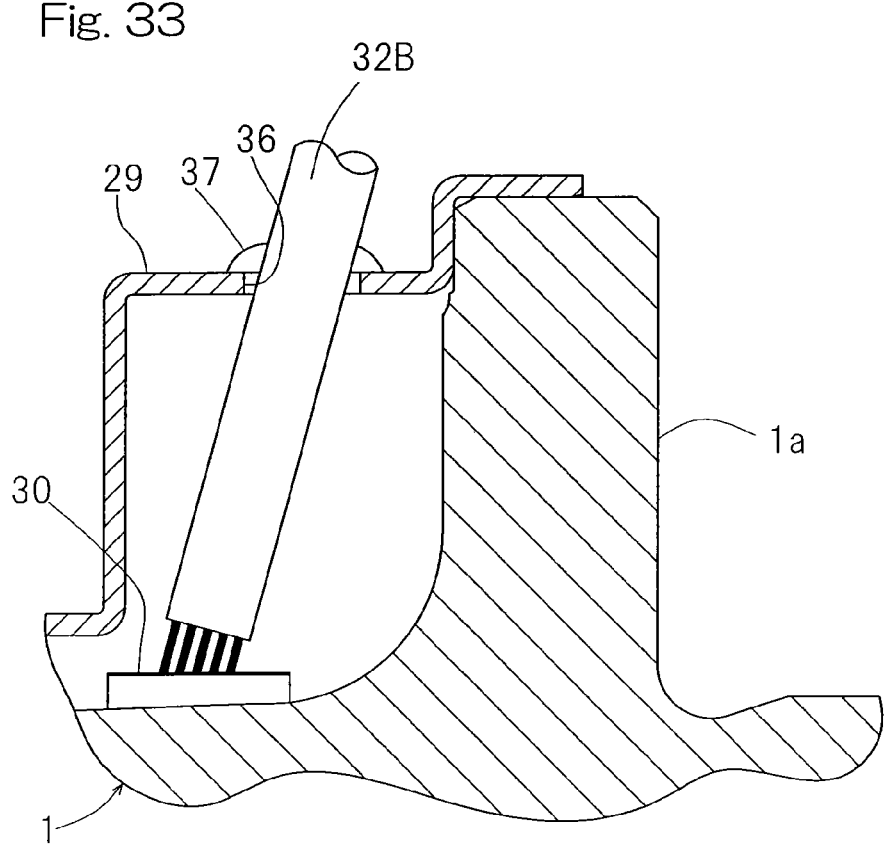
FIG. 33 is a cross sectional view taken along the line XXXIII-XXXIII in FIG. 31.

FIGS. 28 and 29 illustrate a ninth embodiment of the present invention. In the sensor equipped wheel support bearing assembly designed according to this embodiment, as best shown in FIG. 29 in an enlarged sectional representation, the outboard end of the protective shroud 29 is made to extend outwardly towards the outboard side beyond the outboard end of the protective shroud 29, an outwardly bent portion 29d, which is bend from such outboard end towards the outer diametric side is formed, an inwardly bent portion 29e is then formed by bending from a tip of the outwardly bent portion 29d in an inner diametric side so as to overlap the outwardly bent portion 29d, and a tubular portion 29f, which extends from a tip of the inwardly bent portion 29e towards a curved portion 9aa at a base portion of the hub flange 9a of the inner member 2, is finally formed. Accordingly, a non-contact sealing gap 39 of a narrow width configuration elongated in a radial direction is formed between a portion, ranging from the inwardly bent portion 29e to the tubular portion 29f. Other structural features than those described above are similar to those employed in the practice of the fourth embodiment shown in and described with reference to FIG. 10 to FIG. 20A to 20C.

Since even in this case, at the outboard end of the protective shroud 29, the non-contact sealing gap 39 of the narrow width and extending in the radial direction is formed between the portion, ranging from the inwardly bent portion 29e to the tubular portion 29f, and the base portion curved portion 9aa of the hub flange 9a, the sealability at the outboard end of the protective shroud 29 is increased to enable any trouble in the sensor, which would be caused by the influence of the external environment, to be assuredly avoided and, therefore, the load detection can be performed accurately.

A tenth embodiment of the present invention will now be described with particular reference to FIGS. 30 to 33. It is to be noted that in those figures pertaining to the tenth embodiment, component parts similar to those shown in and described with reference to FIG. 10 to FIGS. 20A to 20C in connection with the previously described fourth embodiment are designated by like reference numerals and, therefore, the details thereof are not reiterated for the sake of brevity.

FIG. 31 is a figure corresponding to FIG. 11 pertaining to the fourth embodiment and, except that it differs from FIG. 11 in respect of the position at which the sealing material 37 is applied to that portion where the signal cable drawing portion 32B is drawn, other structural features thereof are similar to those shown in FIG. 11.

In the case of this tenth embodiment, unlike the previously described fourth embodiment best shown in FIG. 10, the protective shroud 29 used to enclose the outer periphery of the outer ring 1 is so shaped as to be stepwise flared outwardly with its outer diameter increasing from the outboard side towards the inboard side. Moreover, whereas in the previously described fourth embodiment, the inboard end of the protective shroud 29 is provided with the lip member 35 made of an annular elastic element so as to extend along the open edge thereof and this lip member 35 is held in contact with the outboard oriented side face of the vehicle body fitting flange 1a of the outer ring 1, the tenth embodiment is such that the outboard end of the protective shroud 29 is provided with the lip member 35 made of the annular elastic element so as to extend along the open edge thereof and this lip member 35 is held in contact with the outer peripheral surface of the outer ring 1. Accordingly, seal is made between the outboard end of the protective shroud 29 and the outer peripheral surface of the outer ring 1 and also between the inboard end of the protective shroud 29 and the outer diametric surface of the flange 1a of the outer ring 1 and, hence, an undesirable ingress of, for example, muddy water and/or saline water from the outboard end in a direction inwardly of the protective shroud 29 can be assuredly avoided to permit the load detection to be accomplished accurately. Other structural features than those described above are similar to those employed in the fourth embodiment.

Also, the lip member 35 has a portion thereof extended to a portion of an outer peripheral surface of the protective shroud 29 to define a shroud outer peripheral surface covering portion 35a. Accordingly at the outboard end of the outer peripheral surface of the protective shroud 29, a wall formed by the shroud outer peripheral surface covering portion 35a protrudes radially outwardly and, in the presence of this wall, an undesirable flow of muddy water and/or saline water into an area, where the lip member 35 is held in contact with the outer peripheral surface of the outer ring 1, can be avoided to assuredly avoid an undesirable ingress of the muddy water and/or saline water into the protective shroud 29. The shroud outer peripheral surface covering portion 35a, when it is fitted onto the outer peripheral surface of the protective shroud 29, is provided as extending towards the inboard side beyond a region within which it is positioned in the outer peripheral surface of the protective shroud 29 in order to secure a required strength in fitting thereof.

Assemblage of this sensor equipped wheel support bearing assembly is similar to that of the sensor equipped wheel support bearing assembly designed according to the previously described fourth embodiment, but differs therefrom in respect of the feature that with the lip member 35 at the outboard end of the protective shroud 29 held in contact with the outer peripheral surface of the outer ring 1, the sensor assembly 33 comprised of the electronic component parts inclusive of the sensor units 20A and 20D are enclosed with the protective shroud 29, and, therefore, the detail of other assembling procedures than those described in connection with the fourth embodiment are not reiterated for the sake of brevity.

While since the load detecting operation performed in the sensor equipped wheel support bearing assembly according to the tenth embodiment of the present invention is basically the same as those performed in the sensor equipped wheel support bearing assembly according to the previously described fourth embodiment, the details thereof are not reiterated for the sake of brevity, in the case of this tenth embodiment, the protective shroud 29 is fitted in a fashion with the inboard end thereof mounted on the outer diametric surface of the flange 1a of the outer member 1 and, therefore, fitting of the protective shroud 29 is easy to achieve. Moreover, since the lip member 35 held in contact with the outer peripheral surface of the outer ring 1 is fitted integrally to the protective shroud 29, there is no need to fit a sealing member such as, for example, a lip member to the protective shroud 29 separately and a sealing member comprised of the lip member 35 is fitted by fitting of the protective shroud 29, thus relieving a work of fitting of the sealing member.

Also, In this tenth embodiment, since a front elevational shape of the vehicle body fitting flange 1a of the outer ring 1 is so designed as to be of a line symmetry with respect to the line segment perpendicular to the bearing axis O or of a point symmetry about the bearing axis O, the shape of the outer ring 1, which is the stationary member, is simplified and, hence, the temperature distribution, brought about by complication in shape of the outer ring 1, and the variation in expansion • contraction amount can be reduced. Accordingly, the influences brought about by the temperature distribution in the outer ring and the variation in expansion • contraction amount are sufficiently reduced to permit the sensor units 20A to 20D to detect the strain amount resulting from the load. Also, where the front elevations shape of the flange 1a of the outer member 1 is so designed as to be round as shown in FIG. 31, mounting of the protective shroud 29 onto the outer diametric surface can be accomplished easily.

Figure 34:
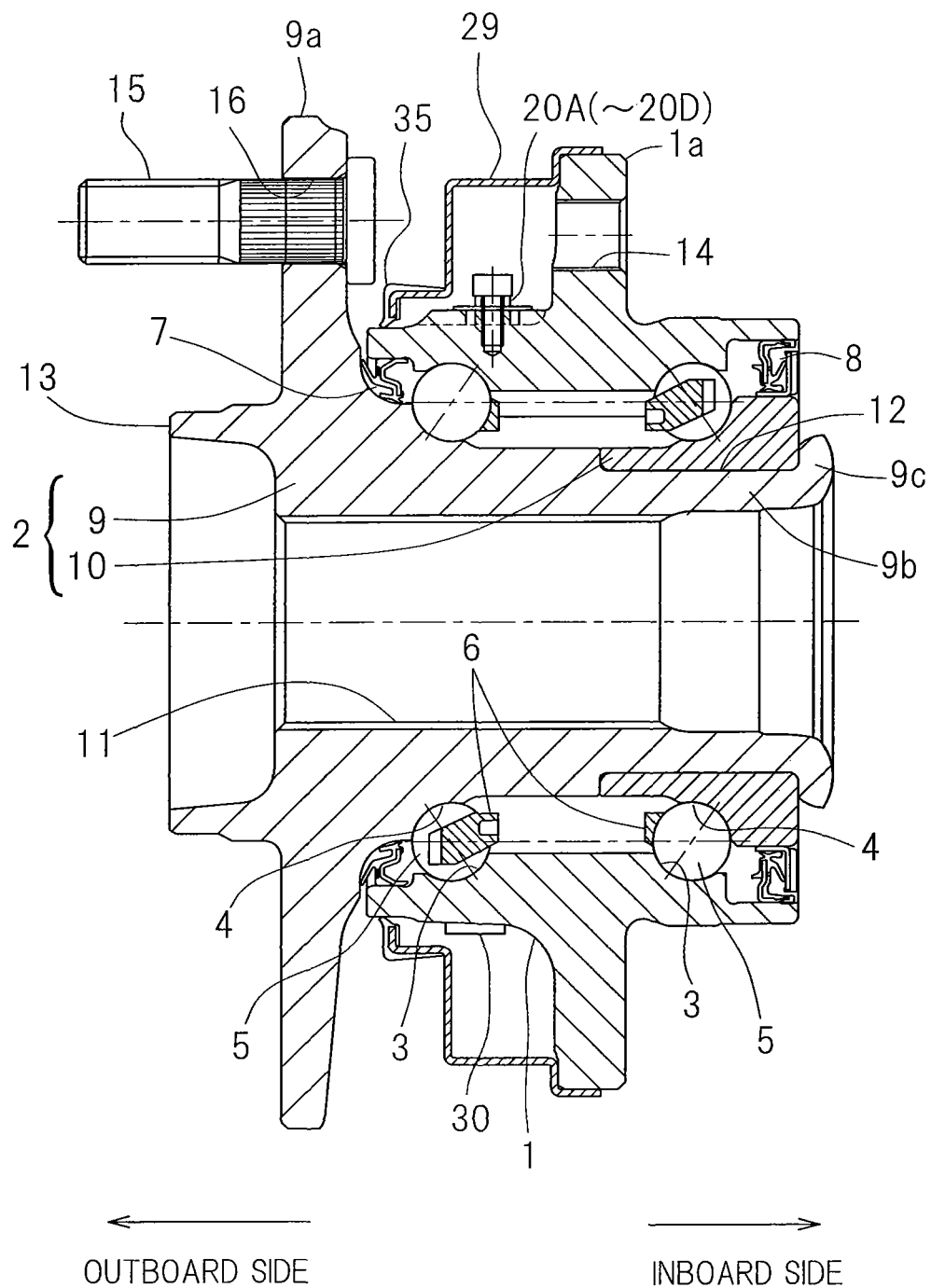
FIG. 34 is a longitudinal sectional view of the sensor equipped wheel support bearing assembly designed according to an eleventh embodiment of the present invention.
Figure 35:
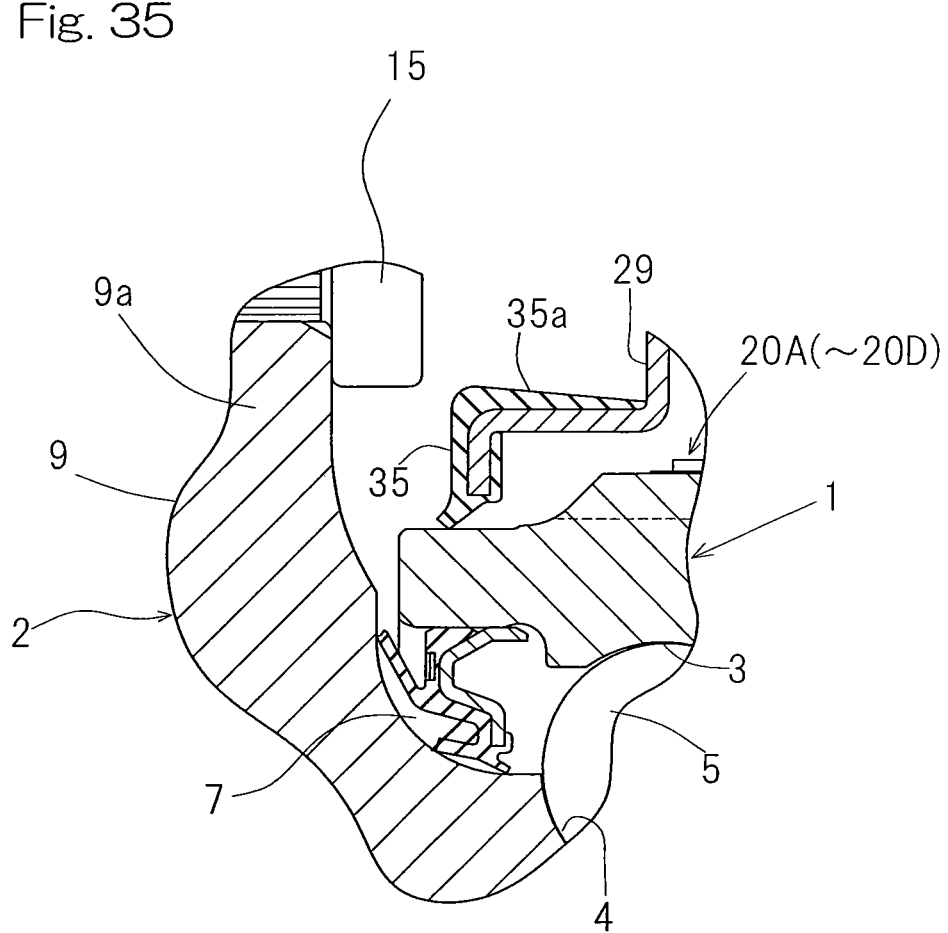
FIG. 35 is a fragmentary enlarged sectional view of the sensor equipped wheel support bearing assembly.

FIGS. 34 and 35 illustrate an eleventh embodiment of the present invention. The sensor equipped wheel support bearing assembly designed according to this eleventh embodiment is similar to that shown in and descried with reference to FIGS. 30 to 33 in connection with the previously described tenth embodiment, but differs therefrom in that the outer peripheral surface of the shroud outer peripheral surface covering portion 35a of the lip member 35 provided on the outboard end of the protective shroud 29 is rendered to be an inclined surface flaring outwardly towards the outboard side as best shown in FIG. 35 in an enlarged sectional representation. Other structural feature than that described above are similar to those employed in the practice of the previously described tenth embodiment shown in FIGS. 30 to 33.

When the outer peripheral surface of the shroud outer peripheral surface covering portion 35a of the lip member 35 is rendered to be the inclined surface flaring outwardly towards the outboard side, flow of the muddy water and/or saline water into the area, in which the lip member 35 is held in contact with the outer peripheral surface of the outer member 1, can be avoided, thereby preventing an undesirable ingress of the muddy water and/or saline water into the inside of the protective shroud 29.

Figure 36:
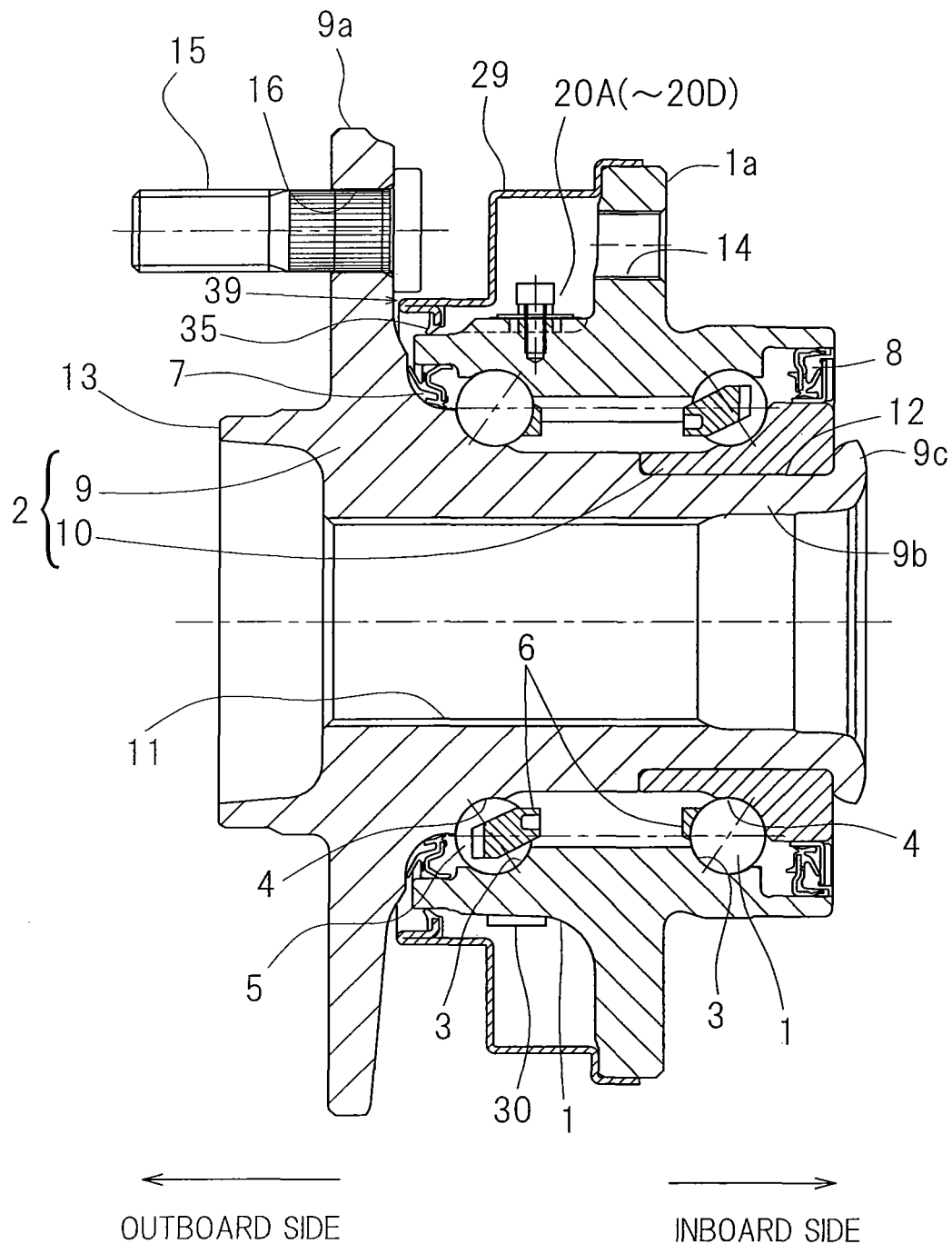
FIG. 36 is a longitudinal sectional view of the sensor equipped wheel support bearing assembly designed according to a twelfth embodiment of the present invention.
Figure 37:
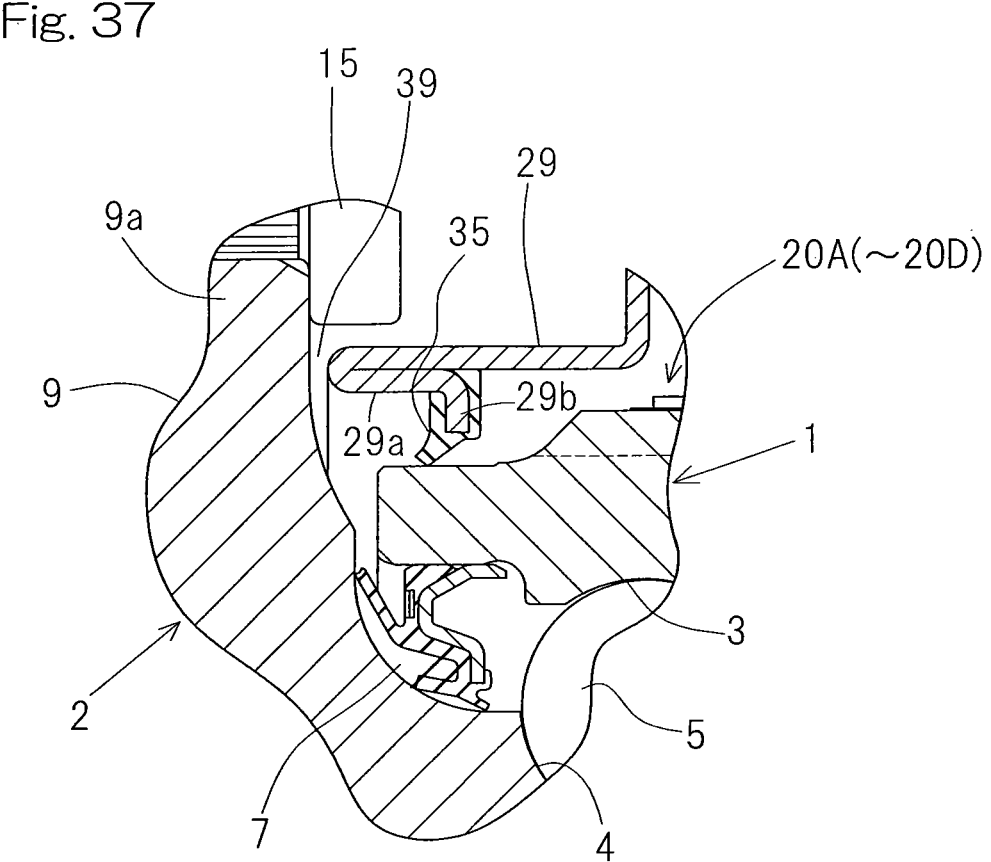
FIG. 37 is a fragmentary enlarged sectional view of the sensor equipped wheel support bearing assembly.

FIGS. 36 and 37 illustrate a twelfth embodiment of the present invention. This sensor equipped wheel support bearing assembly designed according to the twelfth embodiment is similar to that designed according to the previously described tenth embodiment shown in and described with reference to FIGS. 30 to 33, but differs therefrom in that the outboard end of the protective shroud 29 is made to extend towards the outboard side beyond the outer ring 1 and a non-contact sealing gap 39, that is, a labyrinth seal is formed between the outboard end thereof and the inner member 2, which is the rotating member. The non-contact sealing gap 39 is a gap so narrow enough to avoid an undesirable flow of water or the like when a relative rotation occurs between the inner member 2 and the outer ring 1 as hereinbefore described. In the instance as shown, as shown in FIG. 37 in an enlarged sectional representation, the outboard end of the protective shroud 29 is extended to a position in the vicinity of the side face of the hub flange 9a in the inner member 2, which faces the inboard side, and then bent radially inwardly from the outboard end of the protective shroud 29 and towards the inboard side to form a bent portion 29a, and is further bent from the tip of the bent portion 29a towards inner diametric side to form a inwardly bent portion 29b, and the lip member 35 is then integrally provided in this inwardly bent portion 29b. Other structural features than those described above are similar to those employed in the practice of the previously described tenth embodiment shown in and described with reference to FIGS. 30 to 33.

When as hereinabove described the non-contact sealing gap 39 is formed between the outboard end of the protective shroud 29 and the inner member 2, sealing between the outboard end of the protective shroud 29 and the outer member 1 is enhanced by a double sealing structure that is defined by the engagement of the lip member 35 with the outer peripheral surface of the outer ring 1 and the non-contact seal 39 formed between the outboard end of the protective shroud 29 and the hub flange 9a of the inner member 2. Therefore, the sealing at the outboard side may be assured and the load detection can be accomplished accurately while any undesirable trouble occurring in some or all of the sensors under the influences brought about by the external environment is assuredly avoided.

Figure 38:
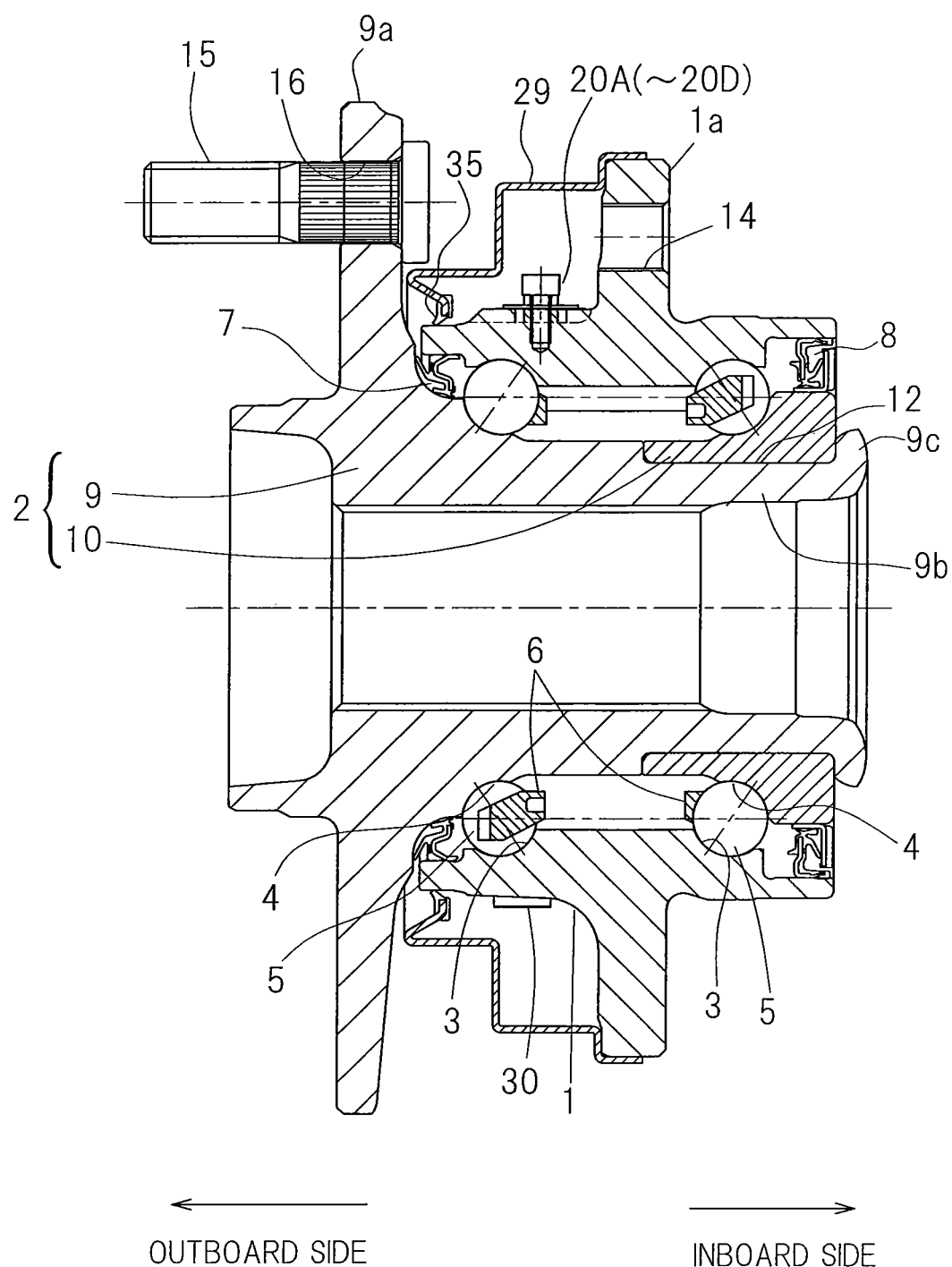
FIG. 38 is a longitudinal sectional view of the sensor equipped wheel support bearing assembly designed according to a thirteenth embodiment of the present invention.
Figure 39:
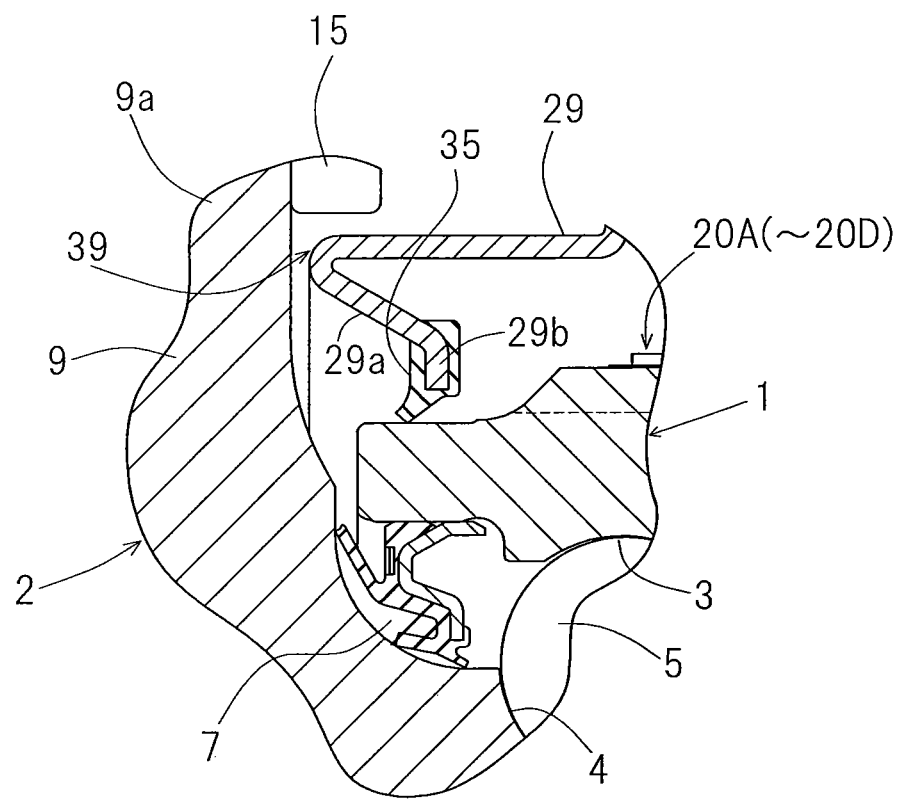
FIG. 39 is a fragmentary enlarged sectional view of the sensor equipped wheel support bearing assembly.

FIGS. 38 and 39 illustrate a thirteenth embodiment of the present invention. The sensor equipped wheel support bearing assembly designed according to the thirteenth embodiment is similar to the sensor equipped wheel support bearing assembly designed according to the previously described twelfth embodiment shown in and described with reference to FIGS. 36 and 37, but differs therefrom in that the bent portion 29a at the outboard end of the protective shroud 29 is rendered to represent a radially inwardly constricted and inclined shape. Other structural features than those described above are similar to those employed in the practice of the twelfth embodiment shown in and described with reference to FIGS. 36 and 37.

When as hereinabove described the bent portion 29a at the outboard end of the protective shroud 29 is rendered to represent the radially inwardly constricted and inclined shape, the muddy water and/or saline water entering the outboard end of the outer ring 1 through the non-contact sealing gap 39 can be easily discharged towards the outside from the non-contact sealing gap 39 along the inclined surface of the outboard oriented bent portion 29a and, therefore, the sealability at the outboard end of the protective shroud 29 can be further increased.

Figure 40:
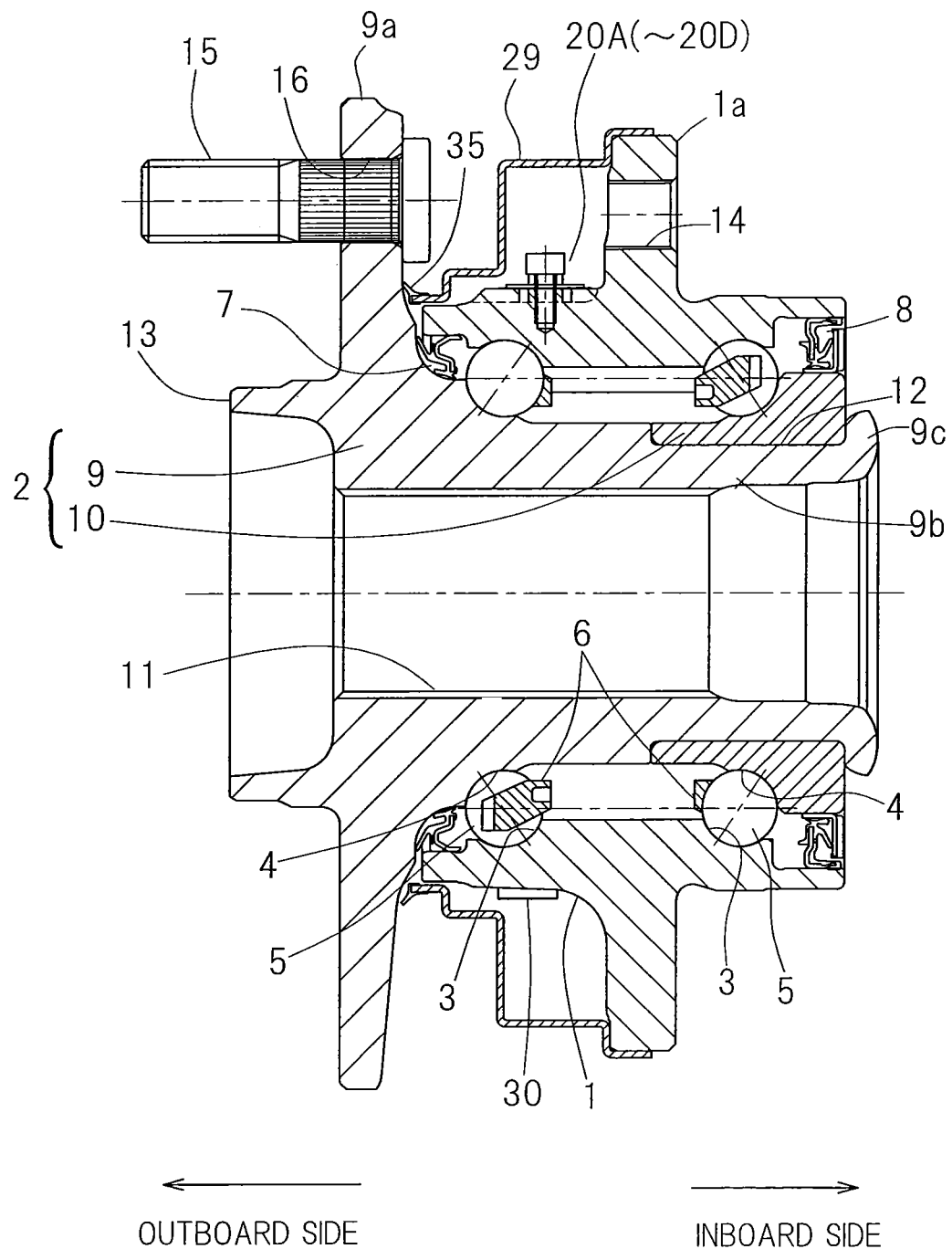
FIG. 40 is a longitudinal sectional view of the sensor equipped wheel support bearing assembly designed according to a fourteenth embodiment of the present invention.
Figure 41:
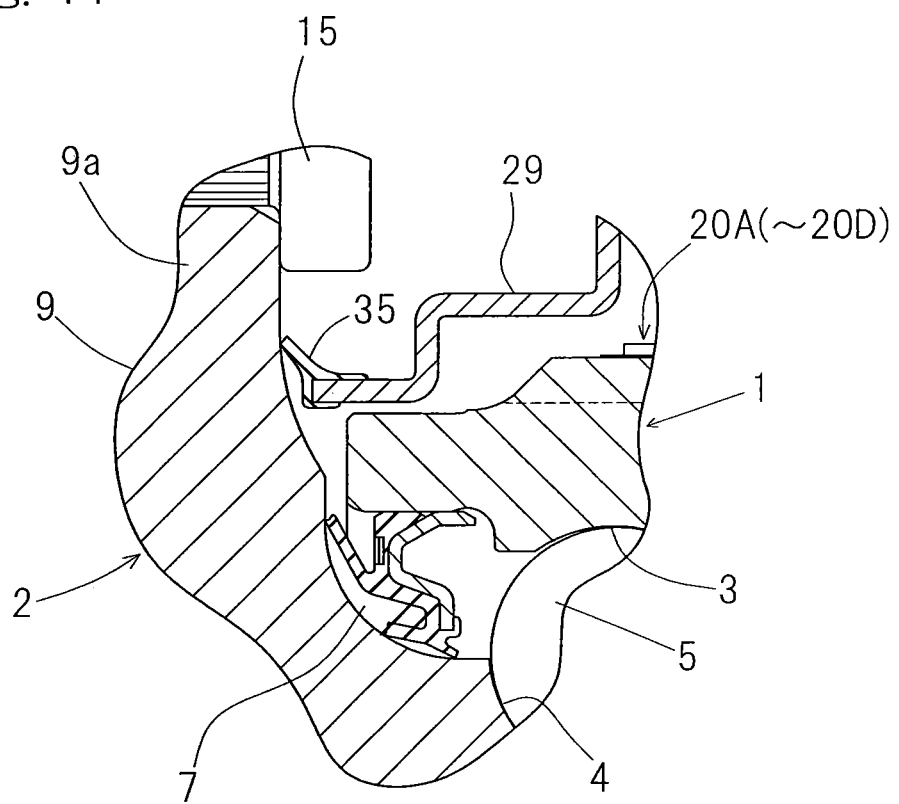
FIG. 41 is a fragmentary enlarged sectional view of the sensor equipped wheel support bearing assembly.

FIGS. 40 and 41 illustrate a fourteenth embodiment of the present invention. The sensor equipped wheel support bearing assembly designed according to the fourteenth embodiment is similar to the sensor equipped wheel support bearing assembly according to the tenth embodiment shown in and described with reference to FIGS. 30 to 33, but differs therefrom in that the lip member 35 provided on the outboard end of the protective shroud 29 is brought into contact with a surface of the inner member 2, which is the rotating member. More specifically, as shown in FIG. 41 in an enlarged sectional representation, the outboard end of the protective shroud 29 is extended towards the outboard side beyond the outer ring 1 and the lip member 35 is held in contact with an inboard oriented side face of the hub flange 9a of the hub axle 9 which forms one of component parts of the inner member 2. Other structural features than those described above are similar to those employed in the practice of the tenth embodiment shown in and described with reference to FIGS. 30 to 33.

Even when as hereinabove described the lip member 35 provided at the outboard end of the protective shroud 29 is held in contact with the hub flange 9a of the inner member 2, an undesirable ingress of, for example, the muddy water and/or saline water from the outboard end of the protective shroud 29 into the protective shroud 20 can be assuredly avoided and, therefore, any undesirable trouble in some or all of the sensors under the influences of the external environment can be assuredly avoided to permit the load detection of be accurately performed. Also, in such case, since the outboard end of the bearing space delimited between the outer ring 1 and the inner member 2 is also sealed, it is possible to dispense with the outboard sealing member 7.

Figure 42:
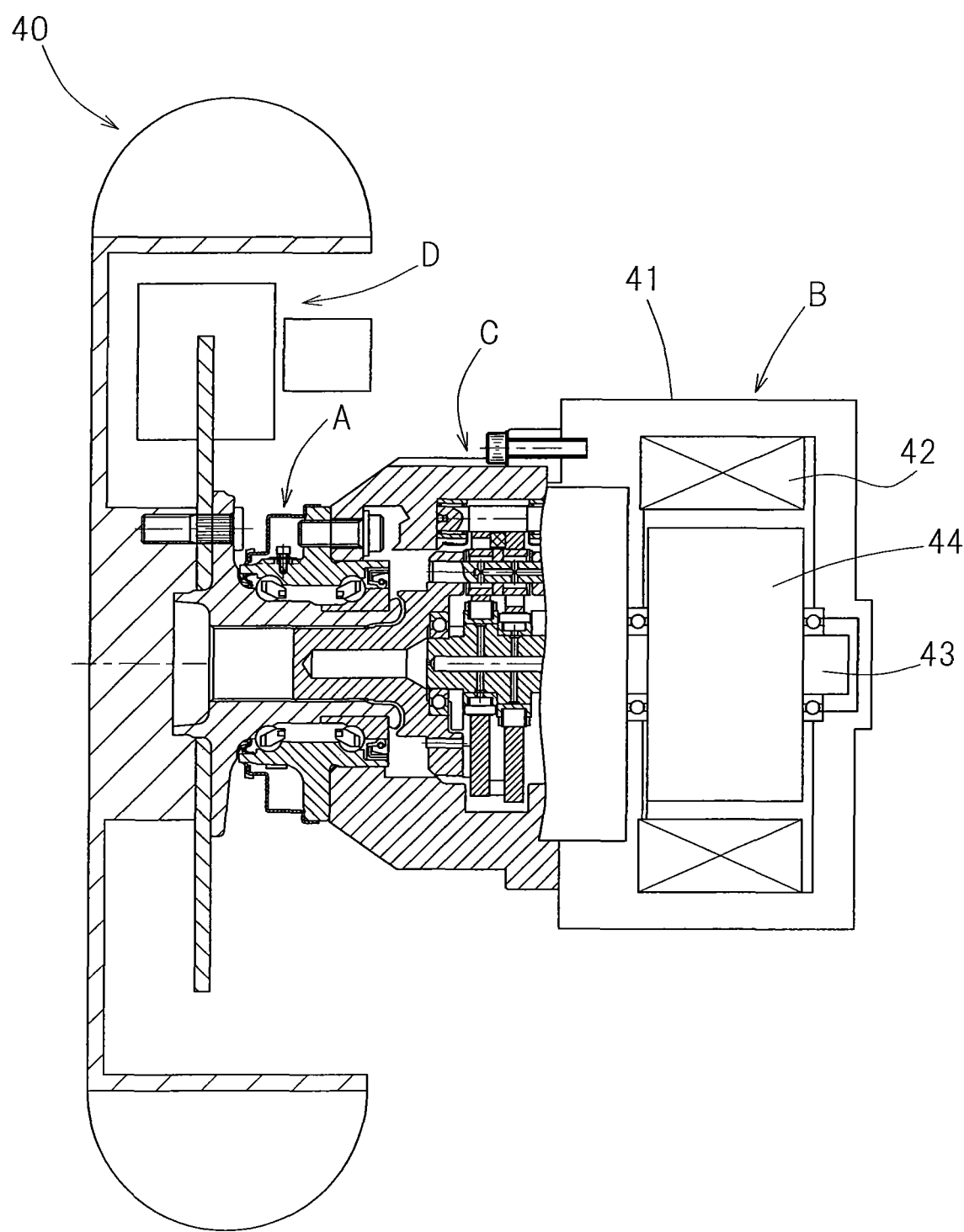
FIG. 42 is a sectional view showing a general outline of a wheel support bearing assembly having an in-wheel motor built therein, which utilizes the sensor equipped wheel support bearing assembly shown in FIG. 30.
Figure 43:
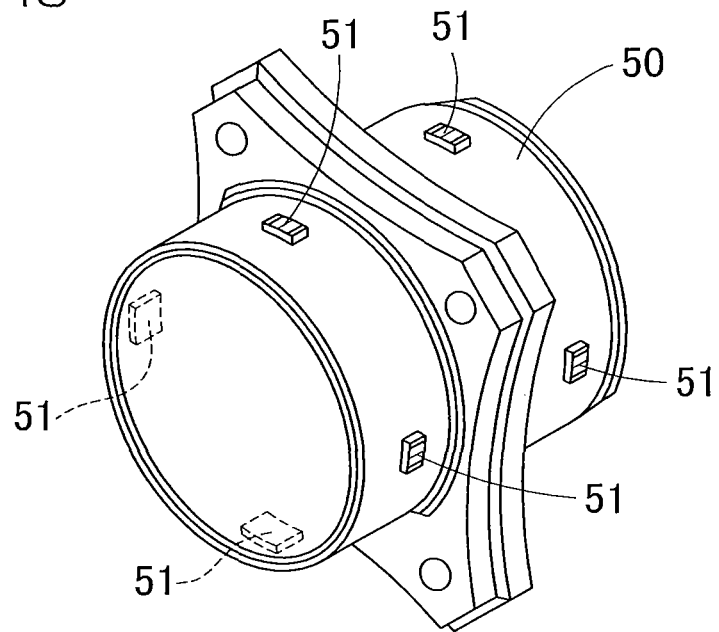
FIG. 43 is a perspective view showing one conventional example.
Figure 44:
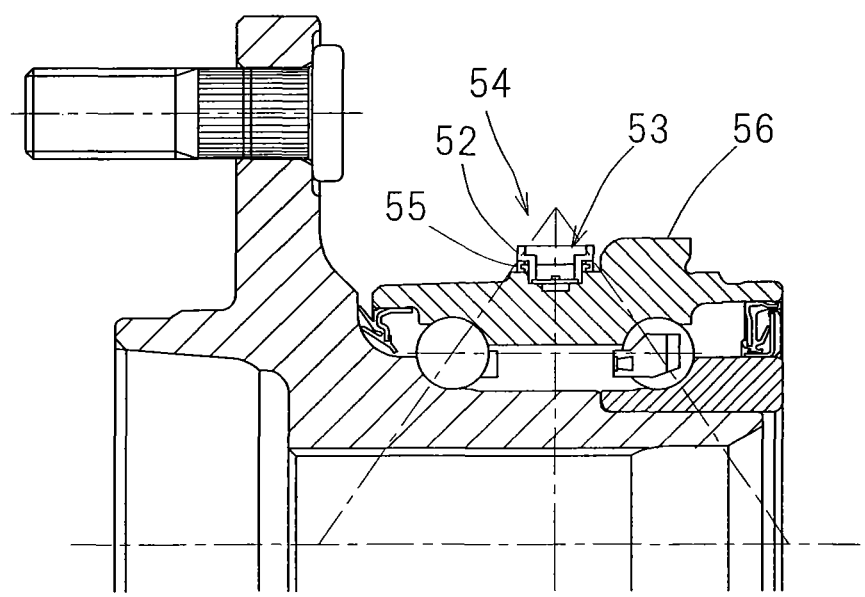
FIG. 44 is a sectional view showing the suggested example.

FIG. 42 illustrates a sectional view showing a general outline of an in-wheel motor incorporated support bearing assembly, which utilizes the sensor equipped wheel support bearing assembly shown in and described with particular reference to FIGS. 30 to 33 in connection with the tenth embodiment of the present invention. The in-wheel motor incorporated wheel support bearing assembly is of a structure, in which the sensor equipped wheel support bearing assembly A for rotatably supporting a hub for a vehicle drive wheel, an electrically driven motor B as a rotation drive source, a reduction gear unit C for reducing the rotation of the electrically driven motor B and then transmitting it to the hub, and a brake D for applying a braking force to the hub, all arranged on a center axis of the vehicle drive wheel 40. The electrically driven motor B is of a radial gap type, in which a radial gap is provided between a stator 42, fixed to a tubular casing 41, and a rotor 44, fitted to an output shaft 43. The reduction gear unit C is constructed as a cycloid reducer.

When as hereinabove described, the sensor equipped wheel support bearing assembly A designed in accordance with the teachings of the present invention is used as a wheel support bearing for the in-wheel motor incorporated wheel support bearing assembly, it is possible to render it as the in-wheel motor incorporated wheel support bearing assembly of a type, in which any undesirable trouble, which may occur in some or all of the sensors by the effect of influences of the external environment, can be avoided to enable the load, acting on the wheel support bearing assembly or the wheel tire contact ground surface, to be accurately detected for a prolonged period of time. It is to be noted that although in FIG. 42, the sensor equipped wheel support bearing assembly according to the tenth embodiment of the present invention shown in and described with reference to FIGS. 30 to 33 has been shown and described as employed, the present invention is not necessarily limited to that and can be equally applicable even when the sensor equipped wheel support bearing assembly designed according to any one of the remaining embodiments of the present invention and, even in such case, effects similar to those described hereinbefore can be obtained.

It is to be noted that although in describing any none of the foregoing embodiments of the present invention the present invention has been shown and described as applied to the wheel support bearing assembly of the third generation type, the present invention can be equally applied to the wheel support bearing assembly of the first or second generation type, in which the bearing portion and the hub are components separate from each other or to the wheel support bearing assembly of the fourth generation type, in which a portion of the inner member is constituted by an outer ring of a constant velocity universal joint. Also, the sensor equipped wheel support bearing assembly may be applied to a wheel support bearing assembly for the support of a vehicle driven wheel and also to the wheel support bearing assembly of any generation type, in which tapered rollers are employed. In such case, the sensor units are to be provided on the outer periphery of the inner member.

Hereinafter, some mode other than any of the embodiments of the present invention will be described.

[Mode 1]

The sensor equipped wheel support bearing assembly according to the first mode is a wheel support bearing assembly for rotatably supporting a vehicle wheel relative to a vehicle body, which includes an outer ring having an inner periphery formed with a plurality of rolling surfaces, an inner member having an outer periphery formed with rolling surfaces held in fact-to-face relation with the above described rolling surface, and a plurality of rows of rolling elements interposed between the rolling surface of the outer ring and the rolling surface of the inner member, in which a vehicle body fitting flange to be fitted to a knuckle is provided in an outer periphery of the outer member; one or more sensor units comprised of a strain generating member having two or more contact fixing segments adapted to be fixed to the outer periphery of the outer ring in contact therewith, and a sensor fitted to the strain generating member and operable to detect a strain induced in the strain generating member, are provided at respective positions crossing a line segment, extending across a center of each of the rolling eminent on the outer periphery of the outer ring on an outboard side in a direction required to form a rolling element contact angle, or respective positions adjoining such positions; and a front elevational shape of the flange is chosen to be of a line symmetry with respect to a line segment perpendicular to a bearing axis or of a point symmetry about the bearing axis.

[Mode 2]

The sensor equipped wheel support bearing assembly according to the second mode is a wheel support bearing assembly for rotatably supporting a vehicle wheel relative to a vehicle body, which includes an outer ring having an inner periphery formed with a plurality of rolling surfaces, an inner member having an outer periphery formed with rolling surfaces held in fact-to-face relation with the above described rolling surface, and a plurality of rows of rolling elements interposed between the rolling surface of the outer ring and the rolling surface of the inner member, in which a radially inwardly depressed portion having its outer periphery formed with a male threaded portion for securement to a knuckle is provided at an inboard end of the outer ring; one or more sensor units comprised of a strain generating member having two or more contact fixing segments adapted to be fixed to a portion of the outer periphery of the outer ring on an outboard side of the radially inwardly depressed portion of the outer ring in contact therewith, and a sensor fitted to the strain generating member and operable to detect a strain induced in the strain generating member, are provided at respective positions crossing a line segment, extending across a center of each of the rolling eminent on the outer periphery of the outer ring on an outboard side in a direction required to form a rolling element contact angle, or respective positions adjoining such positions; and the male threaded portion of the radially inwardly depressed portion is threadingly engaged with a female threaded portion, provided in an inner periphery of the knuckle, to fix the outer ring to the knuckle.

[Mode 3]

The sensor equipped wheel support bearing assembly according to the second mode is a wheel support bearing assembly for rotatably supporting a vehicle wheel relative to a vehicle body, which includes an outer member having an inner periphery formed with a plurality of rolling surfaces, an inner member having an outer periphery formed with rolling surfaces held in fact-to-face relation with the above described rolling surface, and a plurality of rows of rolling elements interposed between the rolling surface of the outer member and the rolling surface of the inner member, in which a vehicle body fitting flange adapted to be fitted to a knuckle is provided on an outer periphery of one of the outer member and the inner member, which is a stationary member; a plurality of sensor units fixed to an outer periphery of the stationary member for the detection of a load; those plural sensor units are covered with a tubular protective shroud enclosing the outer periphery of the stationary member; an outboard end of the protective shroud is mounted on an outer peripheral surface of the stationary member; and a lip member made of an annular elastic element and provided along an open edge of an inboard end of the protective shroud is held in contact with an outboard oriented side face of the flange or the outer peripheral surface of the stationary member.

[Mode 4]

The sensor equipped wheel support bearing assembly according to the second mode is a wheel support bearing assembly for rotatably supporting a vehicle wheel relative to a vehicle body, which includes an outer member having an inner periphery formed with a plurality of rolling surfaces, an inner member having an outer periphery formed with rolling surfaces held in fact-to-face relation with the above described rolling surface, and a plurality of rows of rolling elements interposed between the rolling surface of the outer member and the rolling surface of the inner member, in which in which a vehicle body fitting flange adapted to be fitted to a knuckle is provided on an outer periphery of one of the outer member and the inner member, which is a stationary member; a plurality of sensor units fixed to an outer periphery of the stationary member for the detection of a load; those plural sensor units are covered with a tubular protective shroud enclosing the outer periphery of the stationary member; an inboard end of the protective shroud is mounted on an outer diametric surface of the stationary member; and a lip member made of an annular elastic element and provided along an open edge of an outboard end of the protective shroud is held in contact with an outer peripheral surface of the stationary member or a surface of one of the outer member and the inner member, which is a rotating member.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Outer ring (Outer member)
1a . . . Vehicle body fitting flange
1aa . . . Arcuately sectioned portion
1d . . . Radially inwardly depressed area
1da . . . Male threaded portion
2 . . . Inner member
3, 4 . . . Rolling surface
5 . . . Rolling element
20, 20A to 20D . . . Sensor unit
21 . . . Strain generating member
21a . . . Contact fixing segment
22, 22A, 22B . . . Strain sensor
29 . . . Protective shroud
30 . . . Flexible substrate
31 . . . Signal processing IC
32 . . . Signal cable
33 . . . Sensor assembly
35 . . . Lip member
35a . . . Shroud outer peripheral surface covering portion
36 . . . Draw hole
37 . . . Sealing material
38 . . . Surface treated layer
39 . . . Non-contact sealing gap

What is claimed is:

1. A wheel support bearing assembly for rotatably supporting a vehicle wheel relative to a vehicle body, which comprises:
   an outer member having an inner periphery formed with a plurality of rolling surfaces;
   an inner member having an outer periphery formed with rolling surfaces held in fact-to-face relation with the above described rolling surface;
   a plurality of rows of rolling elements interposed between the rolling surface of the outer member and the rolling surface of the inner member;
   a vehicle body fitting flange to be fitted to a knuckle provided in an outer periphery of the outer member; and
   one or more sensor units including a strain generating member having two or more contact fixing segments adapted to be fixed to the outer periphery of the outer member in contact therewith, and a sensor fitted to the strain generating member and operable to detect a strain induced in the strain generating member, provided at an arcuately sectioned portion, formed to continue from a base end of an outboard oriented side face of the flange to the outer periphery of the outer member, or an outer peripheral surface portion of the outer member adjoining the articulately sectioned portion on an outboard side; the flange having a front elevational shape of a line symmetry with respect to a line segment perpendicular to a bearing axis or of a point symmetry about the bearing axis,
   wherein the one or more sensor units are enclosed with a tubular protective shroud, having a lip member made of an annular elastic element, that encloses an outer periphery of the outer member.

2. The sensor equipped wheel support bearing assembly as claimed in claim 1, wherein each of the one or more sensor units is provided at a position at which a line segment containing a center of each of the rolling elements on the outboard side and defining a rolling element contact angle intersects the outer periphery of the outer member or a position adjoining thereto.

3. The sensor equipped wheel support bearing assembly as claimed in claim 1, wherein a plurality of the sensor units are employed and those sensor units are provided equidistantly in a circumferential direction of the outer periphery of the outer member.

4. The sensor equipped wheel support bearing assembly as claimed in claim 1, wherein the sensor unit is provided in an outer peripheral surface portion of the outer member within a region spaced within 5 mm from a terminating end of the arcuately sectioned portion in the outboard oriented side face of the flange.

5. The sensor equipped wheel support bearing assembly as claimed in claim 1, wherein an outboard end of the protective shroud is mounted on the outer peripheral surface of the outer member, and the lip member provided along an open edge of an inboard end of the flange is held in contact with the outboard oriented side face of the flange or the outer peripheral surface of the outer member.

6. The sensor equipped wheel support bearing assembly as claimed in claim 5, wherein the lip member is of a shape flaring outwardly towards the inboard side.

7. The sensor equipped wheel support bearing assembly as claimed in claim 1, wherein an inboard end of the protective shroud is mounted on the outer peripheral surface of the outer member, and the lip member provided along an open edge of an outboard end of the flange is held in contact with the outer peripheral surface of the outer member or a surface of the inner member.

8. The sensor equipped wheel support bearing assembly as claimed in claim 7, wherein the lip member is of a shape diametrically decreasing towards the outboard side and is held in contact with the outer peripheral surface of the outer member.

9. The sensor equipped wheel support bearing assembly as claimed in claim 7, wherein the lip member has a portion extended to a portion of the outer peripheral surface of the protective shroud to define a shroud outer peripheral surface covering portion.

10. The sensor equipped wheel support bearing assembly as claimed in claim 7, wherein the inner member has a vehicle wheel mounting hub flange and the lip member is held in contact with the inboard oriented side face of this hub flange.

11. The sensor equipped wheel support bearing assembly as claimed in claim 1, further comprising a sensor assembly fitted to the outer peripheral surface of the outer member in a fashion coaxial with the outer member and enclosed within the protective shroud, the sensor assembly made up of electronic component parts connected in a ring form including the sensor unit, a signal processing IC for processing an output signal of the sensor unit, and a signal cable for drawing the processed output signal to the outside of a bearing unit.

12. The sensor equipped wheel support bearing assembly as claimed in claim 1, wherein the sensor unit is fitted to a flexible substrate, and further comprising a sensor assembly fitted to the outer peripheral surface of the outer member in a fashion coaxial with the outer member and enclosed within the protective shroud, the sensor assembly made up of electronic component parts connected in a ring form including the sensor unit, a signal processing IC for processing an output signal of the sensor unit, and a signal cable for drawing the processed output signal to the outside of a bearing unit, the signal processing IC and the signal cable being fitted to the flexible substrate.

13. The sensor equipped wheel support bearing assembly as claimed in claim 1, wherein the outboard end of the protective shroud is extended towards the outboard side beyond the outer member with a non-contact sealing gap being formed between the outboard end thereof and the inner member.

14. The sensor equipped wheel support bearing assembly as claimed in claim 1, wherein four of the sensor units are four employed, the four sensor units being equidistantly arranged at upper, lower, left and right surface portions of the outer peripheral surface of the outer member, which assumes top, bottom, left right position relative to a wheel tire contact ground surface, in a phase difference of 90° in a circumferential direction.

15. A sensor equipped wheel support bearing assembly as claimed in claim 1, wherein the sensor unit has three or more contact fixing segments and two sensors, the two sensors being fitted between the neighboring first and second contact fixing segments and between the neighboring second and third contact fixing segments, respectively, the interval between the neighboring contact fixing segment or the neighboring sensors in the circumferential direction of the outer member being chosen to be (1/2+n) times an arrangement pitch of the rolling elements, wherein n represents an integer, and a load is estimated with the sum of respective output signals of the two sensors being used as an average value.

\* \* \* \* \*

UNITED STATES PATENT AND TRADEMARK OFFICE
CERTIFICATE OF CORRECTION

| | |
|---|---|
| PATENT NO. | : 8,528,391 B2 |
| APPLICATION NO. | : 13/442392 |
| DATED | : September 10, 2013 |
| INVENTOR(S) | : Takayuki Norimatsu et al. |

It is certified that error appears in the above-identified patent and that said Letters Patent is hereby corrected as shown below:

In the Claims

In Column 36, Line 18, In Claim 14, after "left" insert -- and --.

Signed and Sealed this
Twenty-fourth Day of December, 2013

Margaret A. Focarino
*Commissioner for Patents of the United States Patent and Trademark Office*